(12) United States Patent
Kondo et al.

(10) Patent No.: US 8,698,956 B2
(45) Date of Patent: Apr. 15, 2014

(54) TRANSMITTING DEVICE, RECEIVING DEVICE, AND METHOD FOR TRANSMITTING OPERATIONAL INFORMATION IN RECEIVING DEVICE

(75) Inventors: Kazumoto Kondo, Tokyo (JP); Naoko Ninomiya, Tokyo (JP); Yasuhisa Nakajima, Kanagawa (JP)

(73) Assignee: Sony Corporation (JP)

(*) Notice: Subject to any disclaimer, the term of this patent is extended or adjusted under 35 U.S.C. 154(b) by 959 days.

(21) Appl. No.: 12/313,069

(22) Filed: Nov. 17, 2008

(65) Prior Publication Data
US 2009/0141180 A1  Jun. 4, 2009

(30) Foreign Application Priority Data
Nov. 30, 2007  (JP) .............................. P2007-309741

(51) Int. Cl.
*H04N 7/00*  (2011.01)
*H04N 11/00*  (2006.01)

(52) U.S. Cl.
USPC ........... 348/552; 348/723; 348/734; 348/730; 348/731; 348/333.01; 348/231.99; 348/36; 725/52; 725/81; 725/62; 725/68; 386/230; 386/231; 386/46

(58) Field of Classification Search
USPC .............. 348/552, 723, 333.01, 231.99, 734, 348/730, 731, 36; 725/52, 62, 81, 68; 386/230, 231, 46
See application file for complete search history.

(56) References Cited

U.S. PATENT DOCUMENTS

| | | | |
|---|---|---|---|
| 6,037,936 A * | 3/2000 | Ellenby et al. | 715/764 |
| 6,088,402 A * | 7/2000 | White | 375/326 |
| 6,414,696 B1 * | 7/2002 | Ellenby et al. | 715/762 |
| 6,781,635 B1 | 8/2004 | Takeda | |
| 8,037,342 B2 * | 10/2011 | Kimoto | 714/4.1 |
| 2003/0169233 A1 * | 9/2003 | Hansen | 345/158 |
| 2004/0095509 A1 | 5/2004 | Okamoto et al. | |
| 2004/0221311 A1 * | 11/2004 | Dow et al. | 725/52 |
| 2005/0027993 A1 * | 2/2005 | Yanagisawa | 713/189 |
| 2005/0152671 A1 * | 7/2005 | Shibata | 386/46 |
| 2005/0212909 A1 * | 9/2005 | Takehara et al. | 348/36 |
| 2006/0098985 A1 * | 5/2006 | Sakai et al. | 398/138 |
| 2007/0019115 A1 * | 1/2007 | Umeda | 348/730 |
| 2007/0203842 A1 * | 8/2007 | Takamori | 705/52 |

(Continued)

FOREIGN PATENT DOCUMENTS

| | | |
|---|---|---|
| JP | 9-016314 A | 1/1997 |
| JP | 9-154116 A | 6/1997 |

(Continued)

*Primary Examiner* — Jefferey Harold
*Assistant Examiner* — Mustafizur Rahman
(74) *Attorney, Agent, or Firm* — Lerner, David, Littenberg, Krumholz & Mentlik, LLP

(57) ABSTRACT

A transmitting device includes a video-signal output unit, an image displaying unit, an information receiving unit, and a controller. The video-signal output unit outputs a video signal. The image displaying unit displays an image based on the video signal outputted from the video-signal output unit, on a first image display element. The signal transmitting unit transmits the video signal outputted from the video-signal output unit, to an external apparatus via a transmission path. The information receiving unit receives operational information transmitted from the external apparatus, on a display screen of a second image display of the external apparatus. The controller controls at least an operation of the video-signal output unit on the basis of the operational information received by the information receiving unit.

20 Claims, 34 Drawing Sheets

(56) References Cited

U.S. PATENT DOCUMENTS

| | | |
|---|---|---|
| 2007/0211023 A1* | 9/2007 | Boillot .......................... 345/156 |
| 2007/0222901 A1* | 9/2007 | Tsubota et al. ............... 348/734 |
| 2007/0277216 A1* | 11/2007 | Nakajima ..................... 725/133 |
| 2008/0016528 A1* | 1/2008 | Yoshinaga ..................... 725/39 |
| 2008/0037948 A1* | 2/2008 | Yahata .......................... 386/46 |
| 2008/0086749 A1* | 4/2008 | Goldberg et al. .............. 725/68 |
| 2008/0089678 A1* | 4/2008 | Suzuki ......................... 396/439 |
| 2008/0140886 A1 | 6/2008 | Izutsu |
| 2008/0252753 A1* | 10/2008 | Ejima et al. .............. 348/231.99 |
| 2008/0282296 A1* | 11/2008 | Kawai et al. .................... 725/62 |
| 2008/0295138 A1* | 11/2008 | Emoto et al. ................... 725/81 |
| 2009/0128447 A1* | 5/2009 | Yoshikawa et al. ............ 345/1.1 |

FOREIGN PATENT DOCUMENTS

| | | |
|---|---|---|
| JP | 09-237245 A | 9/1997 |
| JP | 11-272401 A | 10/1999 |
| JP | 2000-184346 A | 6/2000 |
| JP | 2001-352373 A | 12/2001 |
| JP | 2007-036906 A | 2/2007 |
| JP | 2007-095080 A | 4/2007 |
| JP | 2007-134956 A | 5/2007 |
| JP | 2007-311927 A | 11/2007 |
| WO | WO-02/078336 A1 | 10/2002 |

* cited by examiner

FIG. 7
TMDS TRANSPORT DATA STRUCTURE
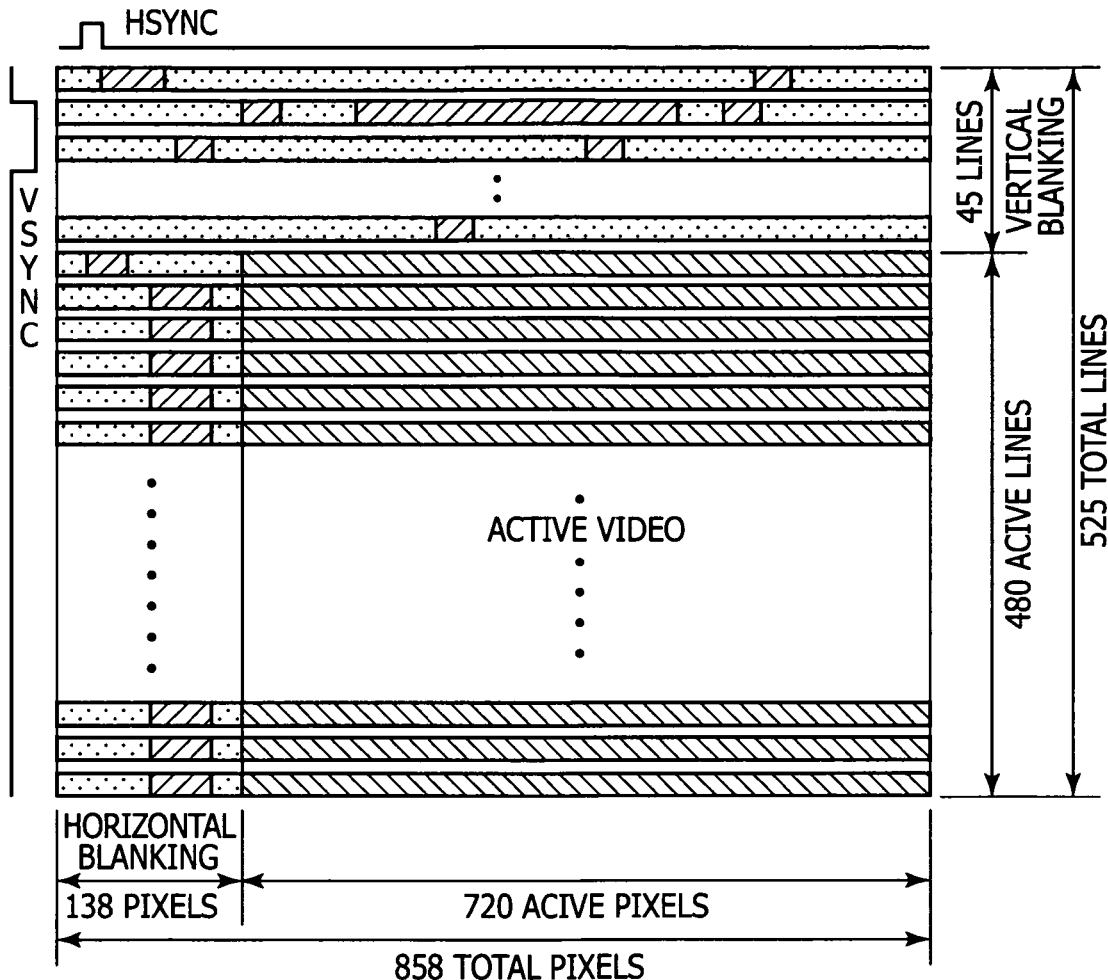
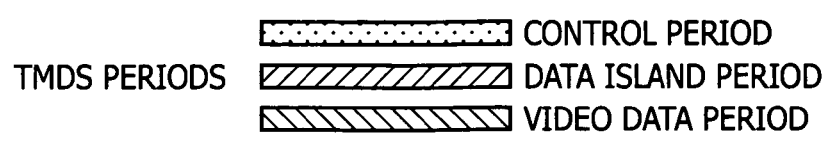

FIG. 8

HDMI PIN ARRAY (IN CASE OF TYPE-A)

| PIN | SIGNAL ASSIGNMENT | PIN | SIGNAL ASSIGNMENT |
|---|---|---|---|
| 1 | TMDS DATA2+ | 2 | TMDS DATA2 SHIELD |
| 3 | TMDS DATA2− | 4 | TMDS DATA1+ |
| 5 | TMDS DATA1 SHIELD | 6 | TMDS DATA1− |
| 7 | TMDS DATA0+ | 8 | TMDS DATA0 SHIELD |
| 9 | TMDS DATA0− | 10 | TMDS CLOCK+ |
| 11 | TMDS CLOCK SHIELD | 12 | TMDS CLOCK− |
| 13 | CEC | 14 | RESERVED (N.C. ON DEVICE) |
| 15 | SCL | 16 | SDA |
| 17 | DDC/CEC GROUND | 18 | +5V POWER |
| 19 | HOT PLUG DETECT | | |

FIG. 12

CEC EXTENSION

| OPCODE | PARAMETERS | RESPONSE |
|---|---|---|
| <REQUEST EHDMI CAPABILITY> | NONE | TRUE / FALSE |
| <REQUEST IP ADDRESS> | NONE | IP ADDRESS |
| <GET IP ADDRESS> | CEC LOGICAL ADDR. | IP ADDRESS |

FIG. 13A

CURRENT TABLE

| HDMI PORT | EXAMPLE OF CEC PHYSICAL ADDRESS |
|---|---|
| HDMI 1 | 1.0.0.0 |
| HDMI 2 | 2.0.0.0 |
| HDMI 3 | 3.0.0.0 |

FIG. 13B

TABLE EXTENDED BY EHDMI

| HDMI PORT | EXAMPLE OF CEC PHYSICAL ADDRESS | EXAMPLE OF IP ADDRESS |
|---|---|---|
| HDMI 1 | 1.0.0.0 | 192.168.10.3 |
| HDMI 2 | 2.0.0.0 | |
| HDMI 3 | 3.0.0.0 | |

FIG. 15
```
<command>
    <offset_x>1000</offset_x>
    <offset_y>300</offset_y>
    <ext_window_width>200</ext_window_width>
    <ext_window_height>300</ext_window_height>
    <pos_x>100</pos_x>
    <pos_y>150</pos_y>
    <click>true</click>
</command>
```
FIG. 16A
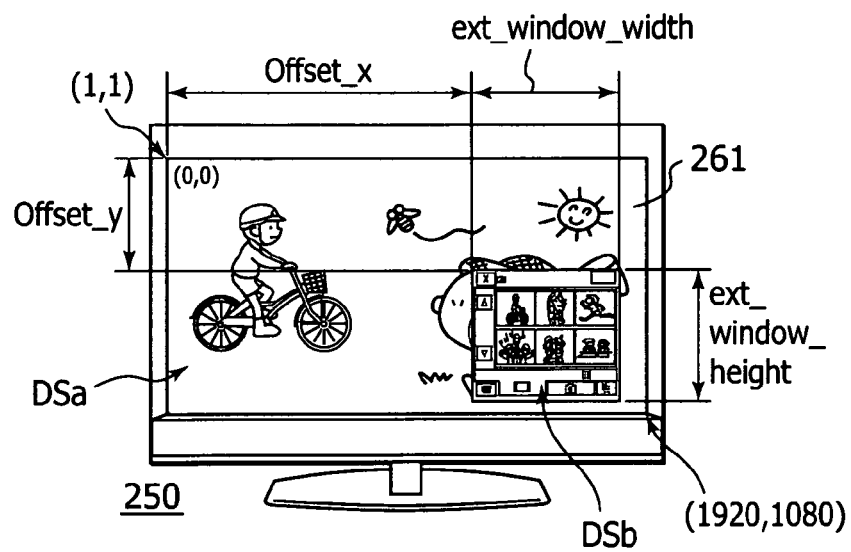
FIG. 16B
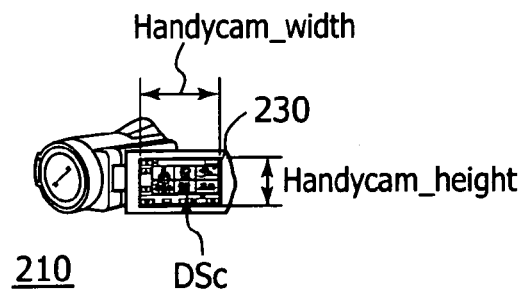

FIG. 25

STRUCTURE OF E-EDID VENDOR SPECIFIC DATA BLOCK

| BYTE# | 7 | 6 | 5 | 4 | 3 | 2 | 1 | 0 |
|---|---|---|---|---|---|---|---|---|
| 0 | VENDOR-SPECIFIC TAG CODE (=3) | | | | LENGTH (=N) | | | |
| 1...3 | 24BIT IEEE REGISTRATION IDENTIFIER (0X000C03) LBS FIRST | | | | | | | |
| 4 | A | | | | B | | | |
| 5 | C | | | | D | | | |
| 6 | SUPPORTS-AI | DC_48BIT | DC_36BIT | DC_30BIT | DC_Y444 | RESERVED (0) | RESERVED (0) | DVI-DUAL |
| 7 | MAX_TMDS_CLOCK | | | | | | | |
| 8 | LATENCY | | FULL DUPLEX | HALF DUPLEX | RESERVED (0) | | | |
| 9 | VIDEO LATENCY | | | | | | | |
| 10 | AUDIO LATENCY | | | | | | | |
| 11 | INTER LACED VIDEO LATENCY | | | | | | | |
| 12 | INTER LACED AUDIO LATENCY | | | | | | | |
| 13...N | RESERVED (0) | | | | | | | |

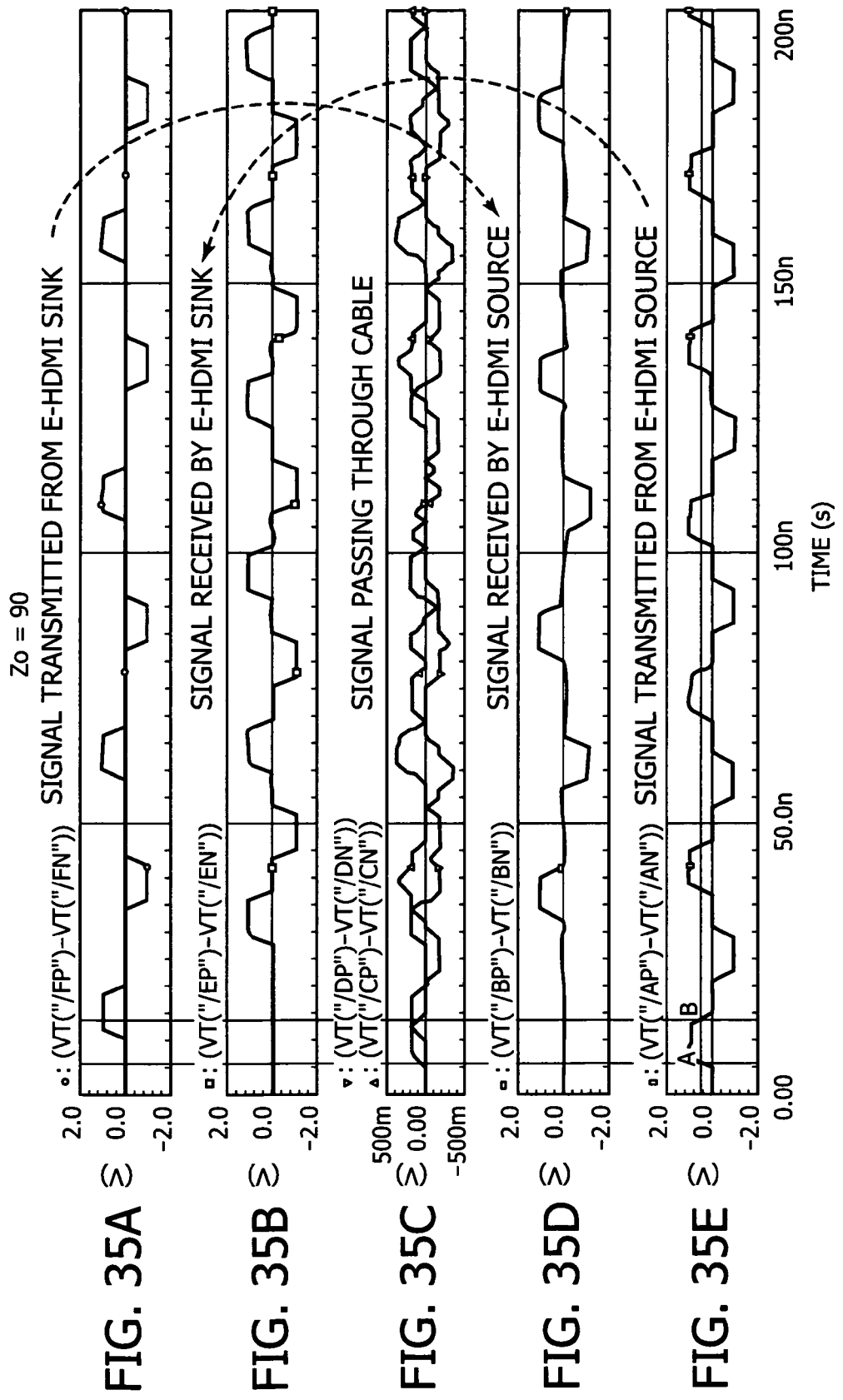

TRANSMITTING DEVICE, RECEIVING DEVICE, AND METHOD FOR TRANSMITTING OPERATIONAL INFORMATION IN RECEIVING DEVICE

CROSS-REFERENCE TO RELATED APPLICATIONS

The present application claims benefit of priority of Japanese patent Application No. 2007-309741 filed in the Japanese Patent Office on Nov. 30, 2007, the entire disclosure of which is incorporated herein by reference.

BACKGROUND OF THE INVENTION

1. Field of the Invention

The present invention relates to a transmitting device, a receiving device, and a method for transmitting operational information in the receiving device.

2. Description of Related Art

In recent years, an HDMI (High Definition Multimedia Interface) has been widely used as a communication interface for transmitting a digital video signal, i.e., a non-compressed (baseband) video signal (hereinafter referred to as "image data") and a digital audio signal (hereinafter referred to as "audio data") accompanying the video signal, at high-speed, from a DVD (Digital Versatile Disc) recorder, a set top box, and other AV (Audio Visual) sources, for example, to a television receiver, a projector, and other displays. For example, in WO publication 2002/078336, there is a detailed description of an HDMI standard.

Presently, when connecting a video camera recorder to a television receiver with an HDMI cable, input switching is performed in the television receiver, and thus, the television receiver is in a state of functioning as a monitor of the video camera recorder. As a result, to operate the video camera recorder, there is a need of direct operation of a touch panel placed on a display panel of the video camera recorder, or operation with a remote control transmitter of the video camera recorder.

When operating with the remote control transmitter of the video camera recorder, there is a need of using an unaccustomed remote control transmitter of the video camera recorder since a key arrangement or a button size is different from that of the remote control transmitter of the television receiver. In addition, in this case, not a free cursor but an Up/Down/Right/Left key operation is required, and thus it is less easier to use as compared to a touch panel operation. Herein, the "free cursor" means a cursor capable of freely moving on the screen, and is equivalent to a "mouse pointer".

When operating with the touch panel placed on the display panel of the video camera recorder, there is a need of making a distance between the television receiver and the video camera recorder the same as a viewing-or-hearing distance. As a result, a long cable for the distance becomes necessary, and the handling is troublesome. In addition, it may require operation while viewing a screen at hand, and thus a usage style differs from a normal television viewing or hearing.

For example, Japanese Unexamined Patent Application Publication No. 2007-095080 describes a mobile information communication device in which a digital display signal is transmitted to a peripheral device via a connection cable from a mobile telephone, and a high resolution image is displayed on an external display having a large screen in the peripheral device.

Further, for example, Japanese Unexamined Patent Application Publication No. 2001-352373 describes a display processing system in which a mobile terminal is connected to a television monitor via a conversion adapter, thereby displaying an image displayed on a liquid crystal screen of a mobile telephone, on a television screen.

In addition, for example, Japanese Unexamined Patent Application Publication No. H09-237245 describes a mobile information device in which a mobile telephone and a television receiver are connected via an infrared transmitting/receiving unit and text information is sent to the television receiver from the mobile telephone, thereby displaying the text information on a display of the television receiver.

SUMMARY OF THE INVENTION

As described above, in an AV system in which a video camera recorder is connected to a television receiver with an HDMI cable, for example, and an image based on a video signal transmitted from the video camera recorder is displayed on a display panel of the television receiver, the video camera recorder is operated by a remote control transmitter of the video camera recorder, or the video camera recorder is operated by a touch panel placed on the display panel of the video camera recorder. In either case, it is difficult to operate easily unlike a case of a television channel operation, etc., while viewing a large screen of the television.

Such a problem occurs also in a case of an AV system in which a personal computer is connected to the television receiver by an HDMI cable, for example, and displays an image based on a video signal transmitted from the personal computer to a display panel of the television receiver, and a user operates the personal computer.

Accordingly, it is desirable that a user is capable of facilitating an operation of a digital video camera, a personal computer, etc., connected to a television receiver, for example.

In accordance with one aspect of the present invention, there is provided a transmitting device which includes a video-signal output unit, an image displaying unit, an information receiving unit, and a controller. The video-signal output unit outputs a video signal. The image displaying unit displays an image based on the video signal outputted from the video-signal output unit, on a first image display element. The signal transmitting unit transmits the video signal outputted from the video-signal output unit, to an external apparatus via a transmission path. The information receiving unit receives operational information transmitted from the external apparatus, on a display screen of a second image display of the external apparatus. The controller controls at least an operation of the video-signal output unit on the basis of the operational information received by the information receiving unit.

In accordance with another aspect of the present invention, there is provided a receiving device which includes a signal receiving unit, an image displaying unit, a user operation unit, and an information transmitting unit. The signal receiving unit receives a video signal via a transmission path from an external apparatus. The image displaying unit displays an image based on the video signal received by the signal receiving unit, on an image display element. The user operation unit performs an operation on a display screen of the image display element. The information transmitting unit transmits operational information of the user operation unit to the external apparatus.

In the receiving device, the video signal is received via the transmission path from the external apparatus (transmitting device), and the image is displayed on the second image display element. In this case, the video signal is transmitted by the differential signal on the transmission path through a plurality of channels, for example. When the video signal is, for example, a video signal superimposed with a display signal for a graphical user interface screen, the image displayed on the second image display element is that superimposed with a graphical user interface screen.

In the receiving device, the user becomes able to operate the external apparatus (transmitting device), on the display screen of the second image display element. When the image displayed on the second image display element is that superimposed with the graphical user interface screen, as described above, the user can use the graphical user interface screen to operate the external apparatus (transmitting device).

For example, a free cursor is displayed on the display screen, and the user may use a remote control transmitter compatible with the free cursor to operate. In this case, when the click operation is performed, a display mode (a shape, a color, etc.) of the cursor is changed, for example, so that the user may be able to verify the click operation. When the click operation is performed, it may be configured to output a sound.

In the receiving device, the operational information on the display screen of the second image display element is transmitted to the external apparatus (transmitting device). For example, this operational information includes coordinate information of a position at which the operation on the display screen is performed, and information on operational content, etc. For example, when the free cursor is displayed, as described above, the coordinate information shows the coordinate indicating a position at which the free cursor exists, and the operational content shows whether the click operation is performed.

The operational information is transmitted to the external apparatus (transmitting device) via a bi-directional communication path configured by: a control data line constituting a transmission path; or predetermined lines of the transmission path. When the transmission path is an HDMI cable, the control data line is a CEC line, and the predetermined lines are a reserve line and an HPD line, for example.

In the transmitting device, the video signal is transmitted via the transmission path to the external apparatus (receiving device). In this case, the video signal is transmitted by the differential signal on the transmission path through a plurality of channels, for example. The video signal is, for example, a captured video signal obtained by an image-capturing unit or that in which this imaged video signal is once recorded in a recording medium and a reproduced vide signal reproduced from the recording medium is thereafter superimposed with a display signal for a graphical user interface screen. In this case, the graphical user interface screen is used for operating an image-capturing operation, a recording operation, a reproducing operation, etc.

Further, in the transmitting device, the operational information on the display screen of the second image display element of the external apparatus is received. This operational information is transmitted from the external apparatus (transmitting device) via a bi-directional communication path configured by: a control data line constituting a transmission path; or predetermined lines of the transmission path, for example. When the transmission path is an HDMI cable, the control data line is a CEC line, and the predetermined lines are a reserve line and an HPD line, for example.

In the transmitting device, on the basis of the operational information thus received, at least the operation of the video-signal output unit (for example, the image-capturing unit, recording and reproducing unit, etc.) is controlled. As a result of this, as in the case of the operation on the display screen of the first image display element, by the operation on the display screen of the second image display element of the external apparatus (receiving device), the operation of the video-signal output unit may be operated.

In the transmitting device, it may be configured so that the reception information received by the information receiving unit includes coordinate information on the second image display element, a coordinate-information converting unit for converting the coordinate information on the second image display element into coordinate information in the first image display element is further provided, and the controller controls by using the coordinate information converted by the coordinate-information converting unit, for example. In this case, even when the image displayed in the first image display element is displayed only a part of the second image display element of the external apparatus (receiving device), it is possible to operate on the display screen of the second image display element of the external apparatus.

According to the transmitting device of an embodiment of the present invention, on the basis of the operational information, transmitted from the external apparatus, on the display screen of the external apparatus, the operation of the video-signal output unit for outputting the video signal transmitted to the external apparatus is controlled. As a result, the operation on the display screen of the external apparatus is enabled. Further, according to the receiving device of an embodiment of the present invention, the operational information on the display screen on which the video by the video signal transmitted from the external apparatus is displayed is transmitted to the external apparatus. As a result, the operation of the external apparatus is enabled on the display screen.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 7 is a diagram showing a structure of TMDS transmission data;

FIG. 8 is a table showing a pin array (type A) of an HDMI terminal;

FIG. 12 is a table showing a list of CEC extension codes used for determining the IP address;

FIGS. 13A and 13B each show a table (CEC physical addresses and the IP address corresponding to each HDMI terminal) held by each apparatus;

FIG. 15 shows a format example of a command (operational information);

FIGS. 16A and 16B are diagrams for describing a process for converting a position (coordinate) of a free cursor on a display screen in the television receiver, into a corresponding position (coordinate) on a display screen in the video camera recorder;

FIG. 25 is a diagram showing a structure of E-EDID Vendor Specific Data Block;

FIG. 35 is a diagram showing waveforms of a bi-directional communication.

DETAILED DESCRIPTION OF EMBODIMENTS

Figure 1:
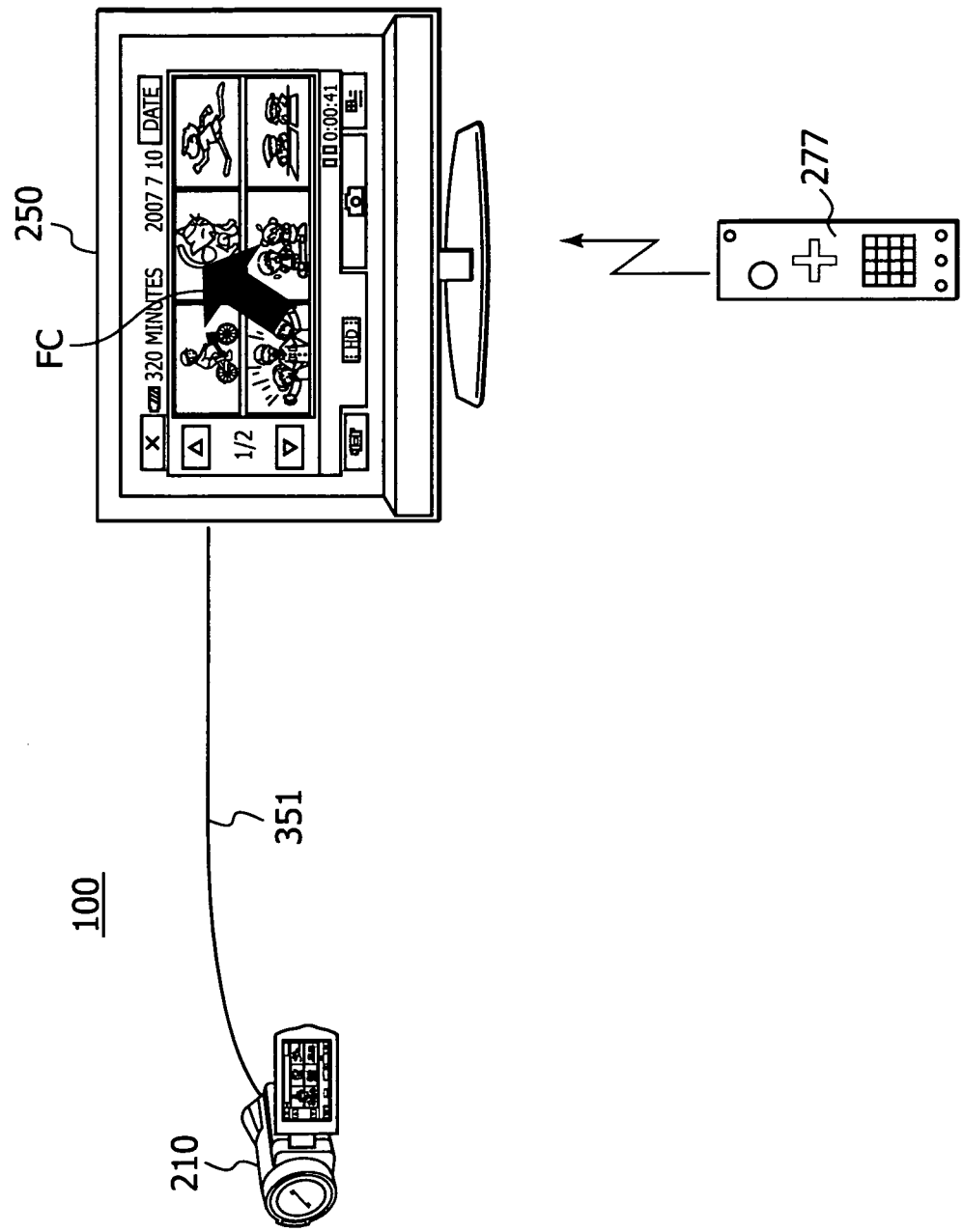
FIG. 1 is a system configuration diagram showing a configuration example of an AV system as an embodiment of the present invention.
Figure 2:
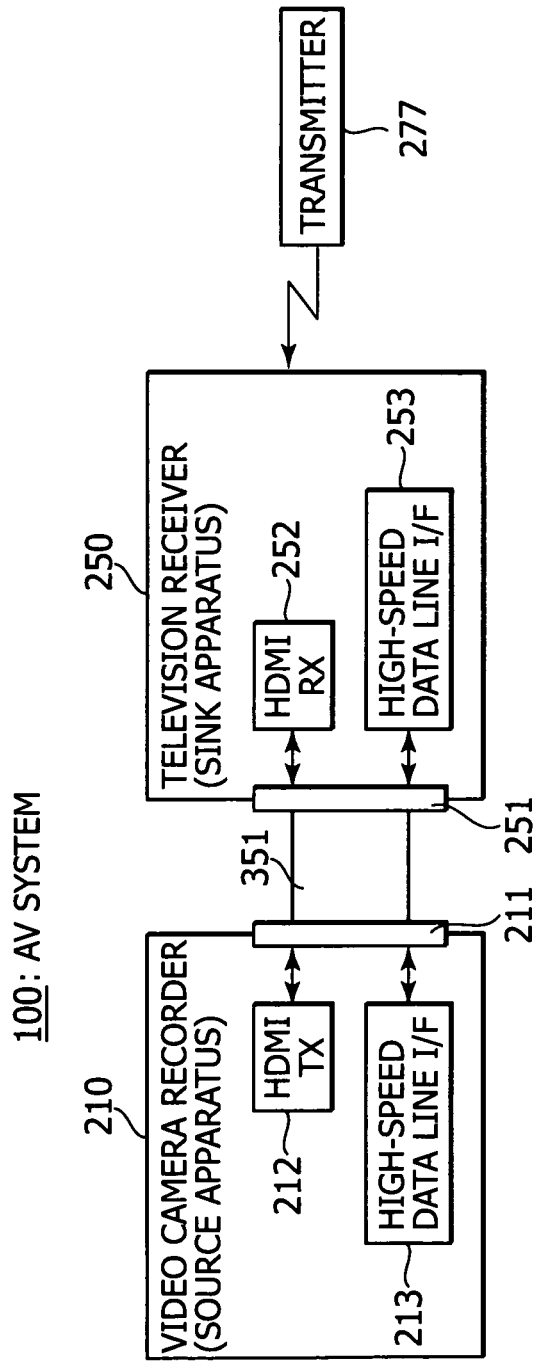
FIG. 2 is a block diagram showing a configuration example of the AV system as an embodiment of the present invention.

Hereinafter, with reference to drawings, an embodiment of the present invention will be described. FIG. 1 and FIG. 2 each show a configuration example of an AV (Audio Visual) system 100 as an embodiment.

The AV system 100 is configured so that that a video camera recorder 210 as a source apparatus and a television receiver 250 as a sink apparatus are connected via an HDMI cable 351. A remote control transmitter 277 of the television receiver 250 is compatible with a free cursor.

As shown in FIG. 2, the video camera recorder 210 and the television receiver 250 are connected via the HDMI cable 351. The video camera recorder 210 is provided with an HDMI terminal 211. The HDMI terminal 211 is connected with an HDMI transmitting unit (HDMITX) 212 and a high-speed data line interface (I/F) 213. The television receiver 250 is provided with an HDMI terminal 251. The HDMI terminal 251 is connected with an HDMI receiving unit (HDMIRX) 252 and a high-speed data line interface (I/F) 253. One end of the HDMI cable 351 is connected to the HDMI terminal 211 of the video camera recorder 210, and the other end of the HDMI cable 351 is connected to the HDMI terminal 251 of the television receiver 250.

In the AV system 100 shown in FIG. 1 and FIG. 2, a video signal reproduced or image-captured in the video camera recorder 210 is supplied to the television receiver 250 via the HDMI cable 351, and an image is displayed in the television receiver 250. At the time of reproducing, the video signal is superimposed with a display signal for a graphical user interface screen (hereinafter referred to as a "GUI screen") used for a user to operate a reproducing operation or the like. At the time of image-capturing, the video signal is superimposed with a display signal for the GUI screen used for the user to operate an image-capturing operation, a recording operation or the like. As a result, the image displayed on the television receiver 250 is superimposed with the GUI screen.

Thus, when the image superimposed with the GUI screen is displayed on the television receiver 250, a free cursor is displayed on a display screen of the television receiver 250. In this state, the user performs an operation for moving a position of the free cursor, a click operation, etc., by the remote control transmitter 277, and whereby, a reproducing operation, an image-capturing operation, a recording operation, etc., of the video camera recorder 210 may be operated on the display screen of the television receiver 250.

User operational information using the remote control transmitter 277 is transmitted to the video camera recorder 210 via a bi-directional communication path configured by a reserve line and an HPD line of the HDMI cable 351. For example, the operational information includes position information of the free cursor on the display screen of the television receiver 250, click operational information by the user, etc.

In the video camera recorder 210, on the basis of the received operational information, the reproducing operation, the image-capturing operation, the recording operation, and the like are controlled as in the case of the user performing a touch panel operation on the user's own display screen. In this case, the position information (coordinate information) of the free cursor included in the operational information is converted into the position information (coordinate information) on the user's own display screen, and then the converted information is used.

The reason for thus converting the position information is that the image based on the video signal transmitted from the video camera recorder 210 to the television receiver 250 is sometimes displayed in only a part of the display screen in the television receiver 250. A content of the operational information transmitted from the television receiver 250 to the video camera recorder 210 and a detail of the conversion process of the position information (coordinate information) in the video camera recorder 210 are described later.

As described above, in the AV system 100 shown in FIG. 1 and FIG. 2, the image based on a reproduced video signal or an image-captured video signal in the video camera recorder 210 is displayed in the television receiver 250, and the user cane operate the reproducing operation, the image-capturing operation, the recording operation, etc., in the video camera recorder 210 by operating on the display screen by using the remote control transmitter 277 of the television receiver 250.

Figure 3:
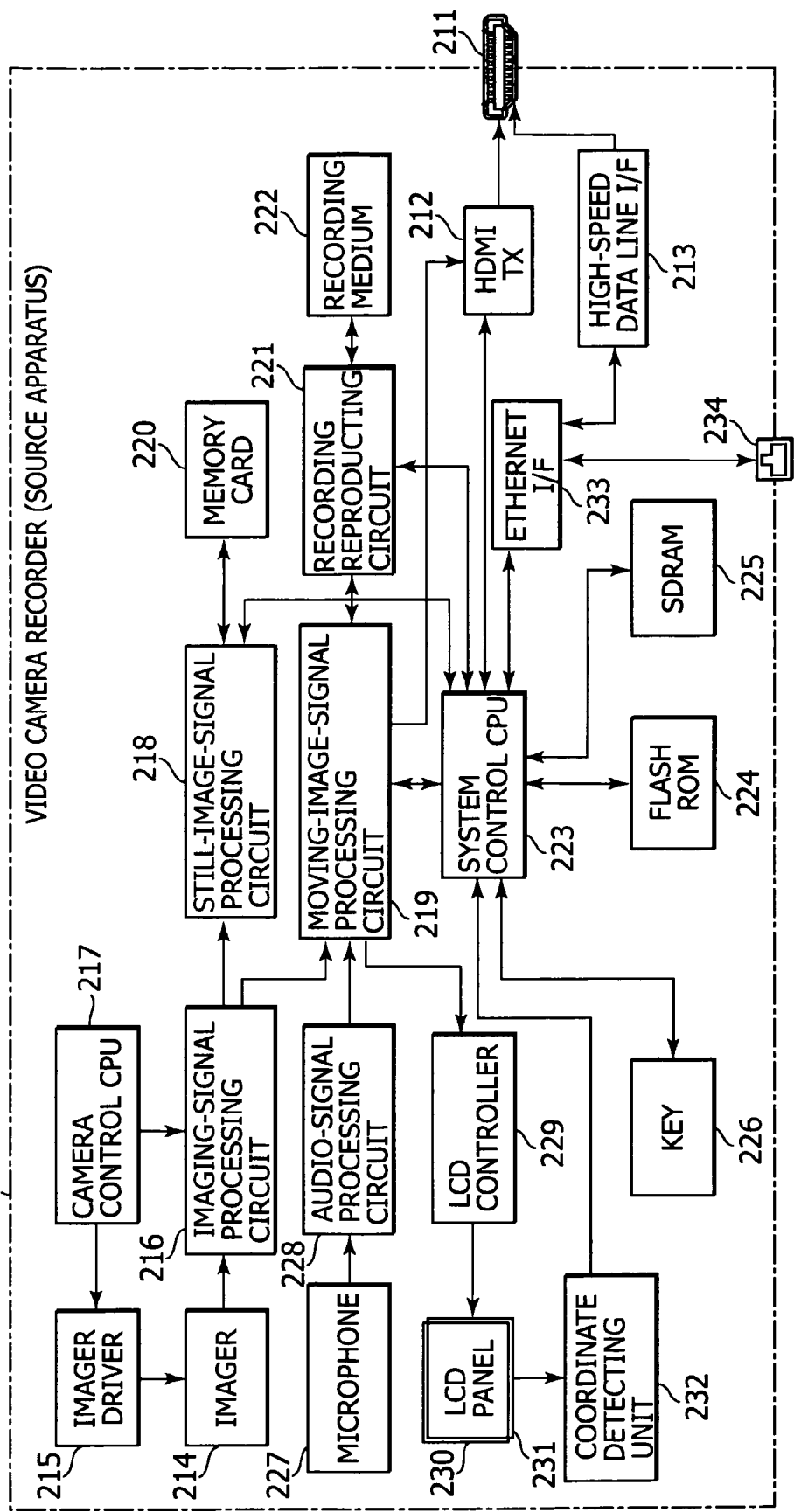
FIG. 3 is a block diagram showing a configuration example of a video camera recorder (source apparatus) constituting the AV system.

FIG. 3 shows a configuration of the video camera recorder 210. The video camera recorder 210 includes: an HDMI terminal 211; an HDMI transmitting unit 212; a high-speed data line interface 213; an imager 214; an imager driver 215; an imaging-signal processing circuit 216; a camera control CPU 217; a still-image-signal processing circuit 218; a moving-image-signal processing circuit 219; a memory card 220; a recording and reproducing circuit 221; a recording medium 222; a system control CPU 223; a flash ROM 224; an SDRAM 225; a key 226; a microphone 227; an audio-signal processing circuit 228; an LCD controller 229; an LCD panel 230; a touch panel 231; a coordinate detecting unit 232; an Ethernet interface 233; and a network terminal 234. Note that the "Ethernet" is a registered trademark.

The imager 214 is configured by a C-MOS imaging device or a CCD imaging device, for example. The imager driver 215 drives the imager 214. The imaging-signal processing circuit 216 processes an imaging signal obtained by the imager 214 to generate image data (image-captured image data) corresponding to a subject. The camera control CPU 217 controls operations of the imager driver 215 and the imaging-signal processing circuit 216.

The still-image-signal processing circuit 218 performs a compression encoding process of a JPEG (Joint Photographic Experts Group) system, for example, on the image data obtained by the imaging-signal processing circuit 216 at the time of imaging a still image to generate still image data. The still-image-signal processing circuit 218 writes the generated still image data into the memory card 220 or writes the data into the flash ROM 224 by way of the system control CPU 223.

The still-image-signal processing circuit 218 generates thumbnail data which is still image data for indexing, and records the data into the memory card 220. This thumbnail is generated corresponding to each video signal recorded in the recording medium 222, as described later. The thumbnail is used for creating, at the time of reproducing, a display signal for the GUI screen, used for allowing the user to select a video signal to be reproduced, for example.

The audio-signal processing circuit 228 performs a processing such as an A/D conversion, on the audio signal obtained by the microphone 227 to obtain audio data corresponding to the captured image data. The moving-image-signal processing circuit 219, at the time of capturing a moving image, performs a processing such as a compression encoding, etc., which complies with a recording medium format, on the image data obtained by the imaging-signal processing circuit 216 and the audio data obtained by the audio-signal processing circuit 228 as well, to generate moving image data added with the audio data.

The recording and reproducing circuit 221, at the time of capturing the moving image, records the moving image data generated by the moving-image-signal processing circuit 219 into the loaded recording medium 222, as a video signal of the moving image. The recording and reproducing circuit 221, at the time of reproducing the moving image, reads out the moving image data from the recording medium 222 and performs a decoding process, etc., to obtain reproduced image data. For example, for the recording medium 222, an optical disc, a hard disk, a magnetic tape, a semiconductor memory, etc., may be applied.

The LCD controller 229 drives the LCD (Liquid Crystal Display) panel 230 on the basis of the image data (image-captured video signal) outputted from the imaging-signal processing circuit 216 or the reproduced image data (reproduced video signal) generated by the recording and reproducing circuit 221, and displays either a captured image (moving image) or a reproduced image (moving image) on the LCD panel 230. The LCD controller 229 drives the LCD panel 230 on the basis of the reproduced image data (reproduced video signal) obtained from the memory card 220, etc., and displays the reproduced image (still image) on the LCD panel 230.

The system control CPU 223 superimposes the display signal for the GUI screen on the video signal supplied to the LCD controller 229, in the moving-image-signal processing circuit 219, for example. This display signal for the GUI screen is a display signal for a GUI screen used for allowing the user to operate a reproducing operation, etc., at the time of reproducing. The display signal for the GUI screen also is a display signal for a GUI screen used for allowing the user to operate an image-capturing operation, a recording operation, etc., at the time of image-capturing.

The video signal thus supplied to the LCD controller 229 is superimposed with the display signal for the GUI screen. As a result, the imaged image or the reproduced image displayed on the LCD panel 230 is superimposed with the GUI screen. Thus, the user may use the touch panel 231 placed on the LCD panel 230 thereby to operate the image-capturing operation, the recording operation, etc., at the time of image-capturing, and the reproducing operation, etc., at the time of reproducing.

The touch panel 231 constitutes a position designating unit for designating a position on the screen of the LCD panel 230, and is placed on the screen of the LCD panel 230. The touch panel 231 is connected to the system control CPU 223 via the coordinate detecting unit 232. The user is able to directly touch with a finger or touch with a pen the touch panel 231 to designate the position on the screen.

The system control CPU 223 controls operations of the still-image-signal processing circuit 218, the moving-image-signal processing circuit 219, the recording and reproducing circuit 221, and the like. The system control CPU 223 is connected with the flash ROM 224, the SDRAM 225, and the key 226. The flash ROM 224 stores a control program, etc., of the system control CPU 223. The SDRAM 225 is used for temporarily storing data required for a control process of the system control CPU 223, and so on. The flash ROM 224 or the SDRAM 225 stores data of a content list described later. The thumbnail image data may be stored in the flash ROM 224, the SDRAM 225, or the recording medium 222, instead of being stored in the memory card 220 as descried above.

The key 226, together with the touch panel 231, constitute a user operation unit. The system control CPU 223 determines an operation state of the key 226 or information (coordinate information) of a position on the screen designated by the touch panel 231, and controls the operation of the video camera recorder 210. The user is able to operate the image-capturing (recording) operation, the reproducing operation, etc., with the key 226.

The HDMI transmitting unit (HDMI source) 212 sends out the baseband image data (video signal) and audio data from the HDMI terminal 211 to the HDMI cable 351 (not shown in FIG. 3), according to a communication which complies with the HDMI. The video signal thus transmitted by the HDMI transmitting unit 212 is the image-captured video signal at the time of image-capturing. The image-captured video signal is, as in the case of the image-captured video signal supplied to the LCD controller 229, superimposed with the display signal for the GUI screen, used for allowing the user to operate the image-capturing operation, the recording operation, etc. The video signal transmitted by the HDMI transmitting unit 212 is the reproduced video signal at the time of reproducing. The reproduced video signal is, as in the case of the reproduced video signal supplied to the LCD controller 229, superimposed with the display signal for the GUI screen, used for allowing the user to operate the reproducing operation, etc. A detail of the HDMI transmitting unit 212 is described later.

The high-speed data line interface 213 is an interface of a bi-directional communication path, configured by predetermined lines (in this embodiment, the reserve line and the HPD line) of the HDMI cable 351. The high-speed data line interface 213 is inserted between the Ethernet interface 233 and the HDMI terminal 211. The Ethernet interface 233 is connected with the network terminal 234.

The high-speed data line interface 213 transmits the transmission data supplied via the Ethernet interface 233 from the system control CPU 223, from the HDMI terminal 211 via the HDMI cable 351 to an apparatus of a communication partner (i.e., person at the other end of the line). The high-speed data line interface 213 supplies the reception data received from the apparatus of the communication partner via the HDMI terminal 211 from the HDMI cable 351, to the system control CPU 223 via the Ethernet interface 233. A detail of the high-speed data line interface 213 is described later.

An operation of the video camera recorder 210 shown in FIG. 3 is briefly described.

The imaging signal obtained by the imager 214 is supplied to the imaging-signal processing circuit 216 for processing. From the imaging-signal processing circuit 216, the image data (captured image data) corresponding to the subject is obtained. At the time of capturing the still image, in the still-image-signal processing circuit 218, a compression encoding process, etc., are performed on the image data outputted from the imaging-signal processing circuit 216, thereby generating the still image data. The still image data is recorded in the memory card 220, etc.

Further, at the time of capturing the moving image, in the moving-image-signal processing circuit 219, a processing such as a compression encoding, etc., which complies with a recording medium format, are performed on the image data outputted from the imaging-signal processing circuit 216 and the audio data outputted from the audio-signal processing circuit 228 as well, so that the moving image data added with the audio data is generated. This moving image data is recorded in the recording medium 222 by the recording and reproducing circuit 221.

At each recording of a new video signal on the recording medium 222, the thumbnail is generated in the still-image signal processing circuit 218, and the generated thumbnail is recorded on the memory card 220, etc. This thumbnail is used, as described above, for generating the display signal for the GUI screen, used for allowing the user to select the video signal to be reproduced at the time of reproducing, for example.

At the time of the capturing the still image and moving image, the LCD controller 229 is supplied with the image-captured video signal superimposed with the display signal for the GUI screen, used for allowing the user to operate the image-capturing operation, the recording operation, etc., and a captured image superimposed with the GUI screen is displayed on the LCD panel 230. Thus, the user can use the touch panel 231 placed on the LCD panel 230 to operate the image-capturing operation, the recording operation, etc. Likewise, the user can also use the key 226 to operate the image-capturing operation, the recording operation, etc.

At the time of reproducing the still image, the still image data is read out from the memory card 220, etc., and the read still image data is subjected to a processing, such as decoding, in the still-image-signal processing circuit 218, thereby obtaining the reproduced image data. The reproduced image data is supplied to the LCD controller 229 via the system control CPU 223 and the moving-image signal processing circuit 219, and the still image is displayed on the LCD panel 230.

At the time of reproducing the moving image, the moving image data is read out from the recording medium 220 by the recording and reproducing circuit 221, and the read-out data is subjected to a processing, such as decoding, in the moving-image-signal processing circuit 219, thereby obtaining the reproduced image data. This reproduced image data is supplied to the LCD controller 229, and thus the moving image is displayed on the LCD panel 230.

At the time of reproducing the still image and moving image, the reproduced video signal superimposed with the display signal for the GUI screen, used for allowing the user to operate the reproducing operation, etc., is supplied to the LCD controller 229, and thus the captured image superimposed with the GUI screen is displayed on the LCD panel 230. Thus, the user can use the touch panel 231 placed on the LCD panel 230 to operate the reproducing operation, etc. Likewise, the user can also use the key 226 to operate the reproducing operation, etc.

At the time of the image-capturing, the HDMI transmitting unit 212 is supplied with, together with the audio data, the baseband video data (image-captured video signal) superimposed, similarly to the image-captured video signal supplied to the LCD controller 229, with the display signal for the GUI screen, used for allowing the user to operate the image-capturing operation, the recording operation, etc. The baseband video and audio data are transmitted from the HDMI transmitting unit 212 via the HDMI cable 351 connected to the HDMI terminal 211, to the television receiver 250.

Alternatively, at the time of the reproducing, the HDMI transmitting unit 212 is supplied, together with the audio data, with the baseband image data (image-captured video signal) superimposed, similarly to the reproduced video signal supplied to the LCD controller 229, with the display signal for the GUI screen, used for allowing the user to operate the reproducing operation, etc. The baseband video and audio data are transmitted from the HDMI transmitting unit 212 via the HDMI cable 351 connected to the HDMI terminal 211, to the television receiver 250.

At the time of image-capturing (recording) and reproducing, the operational information, transmitted via the bi-directional communication path from the television receiver 250, on the display screen of the television receiver 250 is supplied to the high-speed data line interface 213 from the HDMI terminal 211, and is received therein. The operational information includes position information of the free cursor on the display screen of the television receiver 250, click operational information by the user, etc.

The operational information received in the high-speed data line interface 213 is supplied via the Ethernet interface 233 to the system control CPU 223. Thereafter, by the system control CPU 223, the reproducing operation, etc., are controlled at the time of reproducing, and the image-capturing operation, the recording operation, etc., are controlled at the time of reproducing, on the basis of the operational information, similarly to a case that the user operates by the touch panel 231 placed on the LCD panel 230.

Figure 4:
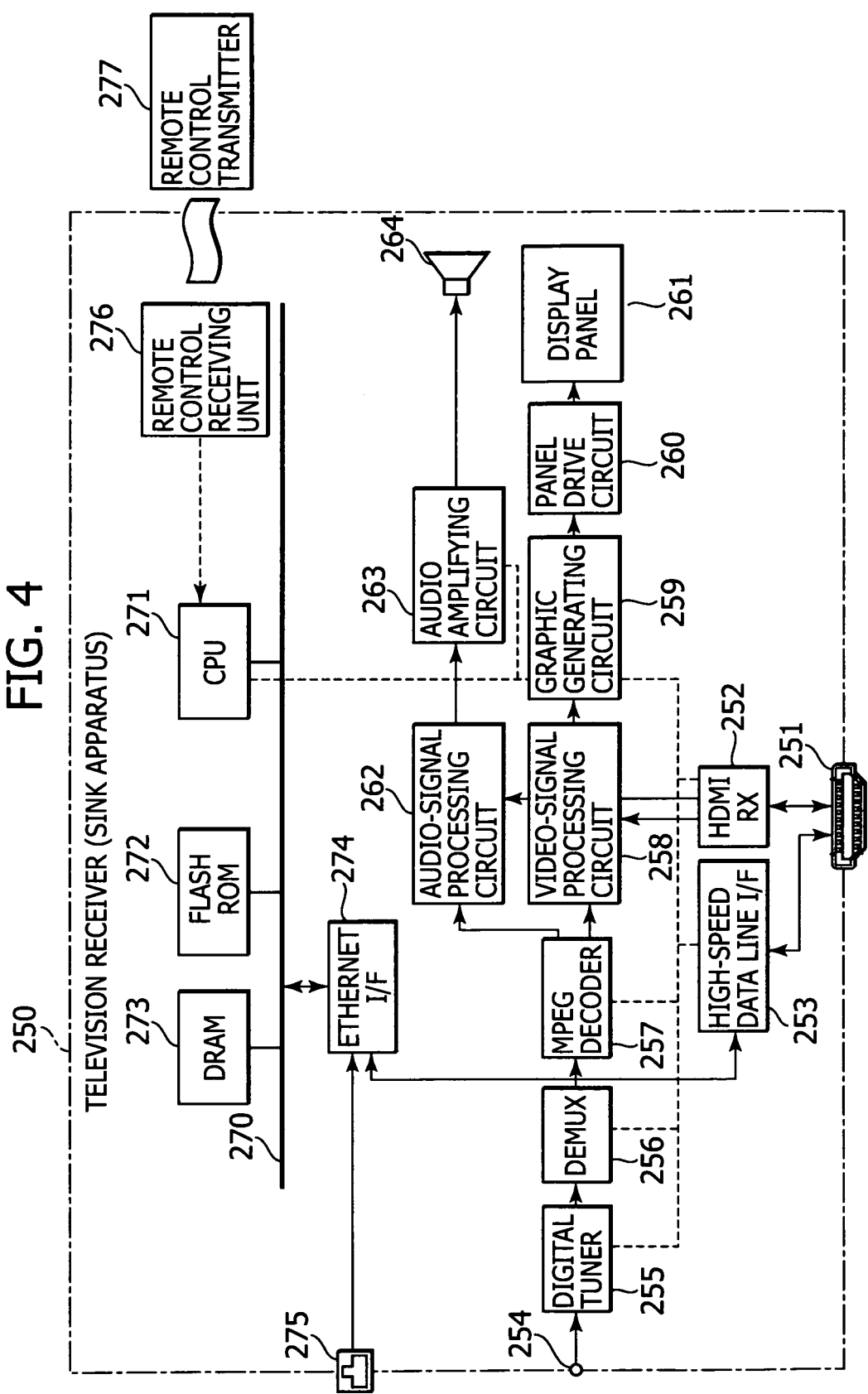
FIG. 4 is a block diagram showing a configuration example of a television receiver (sink apparatus) constituting an AV system.

FIG. 4 shows a configuration example of the television receiver 250. The television receiver 250 includes: an HDMI terminal 251; an HDMI receiving unit 252; an antenna terminal 254; a digital tuner 255; a demultiplexer 256; an MPEG (Moving Picture Expert Group) decoder 257; a video-signal processing circuit 258; a graphic generating circuit 259; a panel drive circuit 260; a display panel 261; an audio-signal processing circuit 262; an audio amplifying circuit 263; a speaker 264; an internal bus 170; a CPU (Central Processing Unit) 271; a flash ROM (Read Only Memory) 272; a DRAM (Dynamic Random Access Memory) 273; an Ethernet interface (Ethernet I/F) 274; a network terminal 275; a remote control receiving unit 276; and a remote control transmitter 277.

The antenna terminal 254 is a terminal for inputting a television broadcast signal received by a receiving antenna (not shown). The digital tuner 255 processes the television broadcast signal inputted to the antenna terminal 254, and outputs a predetermined transport stream corresponding to a user's selected channel. The demultiplexer 256 extracts from the transport stream obtained by the digital tuner 255, a partial TS (Transport stream) (a TS packet of video data and a TS packet of audio data) corresponding to the user's selected channel.

The demultiplexer 256 extracts PSI/SI (Program Specific Information/Service Information) from the transport stream obtained by the digital tuner 255, to output the PSI/SI to the CPU 271. In the transport stream obtained by the digital tuner 255, a plurality of channels are multiplexed. A processing for extracting a partial TS of an arbitrary channel from the transport stream in the demultiplexer 256 becomes enabled by obtaining information of a packet ID (PID) of the arbitrary channel from the PSI/SI (PAT/PMT).

The MPEG decoder 257 performs a decoding processing on a video PES (Packetized Elementary Stream) packet configured by the TS packet of the video data obtained by the demultiplexer 256 to obtain the video data. The MPEG decoder 257 performs a decoding processing on an audio PES packet configured by the TS packet of the audio data obtained by the demultiplexer 256 to obtain the audio data.

The video-signal processing circuit 258 and the graphic generating circuit 259 perform a multi-screen processing, a processing for superimposing graphics data, etc., where appropriate, on the video data obtained by the MPEG decoder 257. The graphic generating circuit 259 generates a display signal for displaying the free cursor upon being switched to a state of viewing or hearing the video and the audio by the video data (video signal) and the audio data transmitted via the HDMI cable 351 from the video camera recorder 210, and superimposes the display signal on the video signal.

The panel drive circuit 260 drives the display panel 261 on the basis of the video signal (image data) outputted from the graphic generating circuit 259. The display panel 261 is configured by an LCD (Liquid Crystal Display), a PDP (Plasma Display Panel), etc., for example. The audio-signal processing circuit 262 performs a necessary processing, such as a D/A conversion, etc., on the audio data obtained by the MPEG decoder 257. The audio amplifying circuit 263 amplifies the audio signal outputted from the audio-signal processing circuit 262, and supplies the amplified audio signal to the speaker 264.

The CPU 271 controls operation of each component of the television receiver 250. The flash ROM 272 stores control software and saves data. The DRAM 273 constitutes a work area of the CPU 271. The CPU 271 develops the software or the data read from the flash ROM 272 onto the DRAM 273 to cause the software to be activated, and controls each component of the television receiver 250.

The remote control receiving unit 276 receives a remote control signal (remote control code) transmitted from the remote control transmitter 277, and supplies the received signal to the CPU 271. The CPU 271 controls each component of the television receiver 250 on the basis of the remote control code. The network terminal 275 is a terminal for connecting to the network, and is connected to the Ethernet interface 274. The CPU 271, the flash ROM 272, the DRAM 273, and the Ethernet interface 274 are connected to the internal bus 270.

The HDMI receiving unit (HDMI sink) 252 receives the baseband video data (video signal) and audio data supplied to the HDMI terminal 251 via the HDMI cable 351, according to a communication that complies with the HDMI.

The video data thus received by the HDMI receiving unit 252 is the image-captured video signal at the time of image-capturing of the video camera recorder 210. The imaged video signal, as in the case of the image-captured video signal supplied to the LCD controller 229 of the video camera recorder 210, is superimposed with the display signal for the GUI screen, used for allowing the user to operate the image-capturing operation, the recording operation, etc., of the video camera recorder 210.

Further, the video data received by the HDMI receiving unit 252 is the reproduced video signal at the time of reproducing of the video camera recorder 210. The reproduced video signal, as in the case of the reproduced video signal supplied to the LCD controller 229 of the video camera recorder 210, is superimposed with the display signal for the GUI screen, used for allowing the user to operate the reproducing operation, etc.

The high-speed data line interface 253, as in the case of the high-speed data line interface 213 of the aforementioned video camera recorder 210, is an interface of a bi-directional communication path, configured by predetermined lines (in this embodiment, a reserve line and an HPD line) of the HDMI cable 351. The high-speed data line interface 253 is inserted between the Ethernet interface 274 and the HDMI terminal 251.

The high-speed data line interface 253 transmits the transmission data supplied via the Ethernet interface 274 from the CPU 271, to the apparatus of the communication partner (video camera recorder 210) via the HDMI cable 351 from the HDMI terminal 251.

For example, the CPU 271 allows the operational information on the display screen of the display panel the transmission data, when being switched to a state of viewing or hearing the video and the audio by the video data (video signal) and the audio data thus transmitted via the HDMI cable 351 from the video camera recorder 210, and the display signal for displaying the free cursor is superimposed on the video data in the graphic generating circuit 259. In this operational information, the position information (coordinate information) of the free cursor on the display screen of the display panel 261, the click operational information by the user, etc., are included.

Further, the high-speed data line interface 253 supplies the reception data received from the apparatus of the communication partner via the HDMI terminal 251 from the HDMI cable 351, to the CPU 271 via the Ethernet interface 274. A detail of the high-speed data line interface 253 is described later.

An operation of the television receiver 250 shown in FIG. 4 is briefly described.

At first, an operation at the time of viewing or hearing a television broadcast is described.

The television broadcast signal inputted to the antenna terminal 254 is supplied to the digital tuner 255. In the digital tuner 255, the television broadcast signal is processed, a predetermined transport stream corresponding to the user's selected channel is outputted, and the predetermined transport stream is supplied to the demultiplexer 256. In the demultiplexer 256, a partial TS (a TS packet of the video data, and a TS packet of the audio data) corresponding to the user's selected channel is extracted from the transport stream, and the partial TS is supplied to the MPEG decoder 257.

In the MPEG decoder 257, a decoding processing is performed on the video PES packet configured by the TS packet of the video data, whereby the video data is obtained. This video data is subjected to a multi-screen processing, a processing for superimposing graphics data, etc., where appropriate, in the video-signal processing circuit 258 and the graphic generating circuit 259, and thereafter, the resultant data is supplied to the panel drive circuit 260. As a result, an image corresponding to the user's selected channel is displayed on the display panel 261.

In the MPEG decoder 257, a decoding processing is performed on the audio PES packet configured by the TS packet of the audio data, whereby the audio data is obtained. This audio data is subjected to a necessary processing, such as a D/A conversion, in the audio-signal processing circuit 262, and further, amplified in the audio amplifying circuit 263, and then, supplied to the speaker 264. Thus, the audio corresponding to the user's selected channel is outputted from the speaker 264.

Subsequently, a case of being switched to an external input of the HDMI terminal 251 is described.

In the HDMI receiving unit 252, the video data (video signal) and the audio data, transmitted from the video camera recorder 210 connected via the HDMI cable 351 to the HDMI terminal 251, are obtained. The video data and the audio data are supplied to the video-signal processing circuit 258 and the audio-signal processing circuit 262, respectively.

The video data thus received in the HDMI receiving unit 252 is superimposed with the display signal for the GUI screen, used for allowing the user to operate the image-capturing operation, the recording operation, etc., of the video camera recorder 210 at the time of image-capturing of the video camera recorder 210. On the other hand, the video signal received in the HDMI receiving unit 252 is superimposed with the display signal for the GUI screen, used for allowing the user to operate the reproducing operation, etc., of the video camera recorder 210 at the time of reproducing of the video camera recorder 210.

The video data (video signal) supplied to the video-signal processing circuit 258 is superimposed with the display signal for displaying the free cursor, in the graphic generating circuit 259. The video data thus superimposed with the display signal is supplied to the panel drive circuit 260. Thus, the captured image of the video camera recorder 210 or the reproduced image thereof is displayed on the display panel 261.

On the captured image displayed on the display panel 261, the GUI screen used for allowing the user to operate the image-capturing operation, the recording operation, etc., is superimposed, and the free cursor is displayed as well. Likewise, on the reproduced image displayed on the display panel 261, the GUI screen used for allowing the user to operate the reproducing operation, etc., is superimposed, and the free cursor is displayed as well.

Thus, the user can move the free cursor to an arbitrary position on the GUI screen by the remote control transmitter 277 compatible with the free cursor to perform a click operation, and thus the user can operate similarly to a case of using the touch panel 231 placed on the LCD panel 230 of the video camera recorder 210.

In the audio-signal processing circuit 262, a necessary processing, such as a D/A conversion, is performed on the audio data supplied from the HDMI receiving unit 252. Thereafter, the audio signal outputted from the audio-signal processing circuit 262 is amplified in the audio amplifying circuit 263, and then, supplied to the speaker 264. As a result, an image-capturing audio or a reproducing audio is outputted from the video camera recorder 210 from the speaker 264.

The operational information (including the position information (coordinate information) of the free cursor, the click operational information by the user, etc.) obtained by the moving operation and the click operation of the free cursor by the remote control transmitter 277 of the user is supplied, as the transmission data, from the CPU 271 via the Ethernet interface 274 to the high-speed data line interface 253. Thereafter, the operational information is transmitted from the high-speed data line interface 253 via the HDMI cable 351 to the video camera recorder 210.

Thus, in the video camera recorder 210, by the system control CPU 223, on the basis of the operational information, as described above, the reproducing operation, etc., are controlled at the time of reproducing while the image-capturing operation, the recording operation, etc., are controlled at the time of image-capturing, as in the case of the user operating by the touch panel 231 placed on the LCD panel 230.

Figure 5:
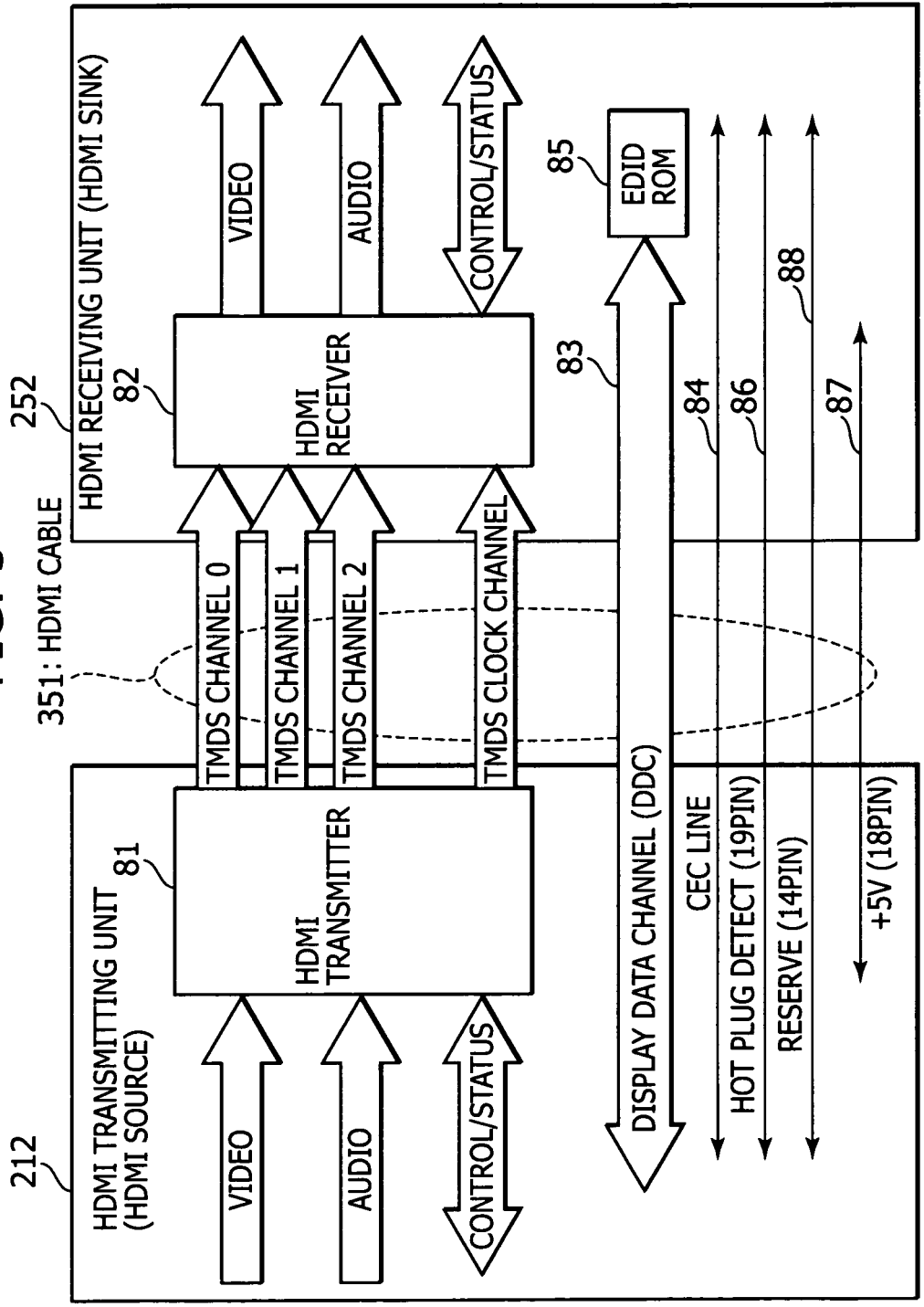
FIG. 5 is a block diagram showing a configuration example of an HDMI transmitting unit (HDMI source) and an HDMI receiving unit (HDMI sink)

FIG. 5 shows a configuration example of the HDMI transmitting unit (HDMI source) 212 of the video camera recorder 210 and the HDMI receiving unit (HDMI sink) 252 of the television receiver 250.

The HDMI source 212 transmits a differential signal corresponding to pixel data of a non-compressed 1-screen image unidirectionally to the HDMI sink 252 through a plurality of channels in an effective image period (hereinafter, appropriately referred to as an active video period), i.e., a period obtained by removing a horizontal blanking period and a vertical blanking period from a period between one vertical synchronizing signal and a subsequent vertical synchronizing signal. The HDMI source 212 further transmits differential signals corresponding to the audio data and the control data which accompany at least the image, other auxiliary data, etc., in one direction to the HDMI sink 252 through a plurality of channels in either the horizontal blanking period or the vertical blanking period.

That is, the HDMI source 212 includes an HDMI transmitter 81. The transmitter 81 converts, for example, the pixel data of the non-compressed image into a corresponding differential signal, and performs a serial transmission in one direction the converted signal to the HDMI sink 252 connected via the HDMI cable 351 through a plurality of channels, i.e., three TMDS channels #0, #1, and #2.

The transmitter 81 further converts the audio data that accompanies the non-compressed image, the necessary control data, other auxiliary data, etc., into a corresponding differential signal, and performs a serial transmission in one direction the converted signal to the HDMI sink 252 connected via the HDMI cable 351 through the three TMDS channels #0, #1, and #2.

The transmitter 81 also transmits a pixel clock synchronized with the pixel data transmitted through the three TMDS channels #0, #1, and #2, to the HDMI sink 252 connected via the HDMI cable 351 through a TMDS clock channel. In this case, through one TMDS channel #i (i=0, 1, 2), during one clock of the pixel clock, 10-bit pixel data is transmitted.

In the active video period, the HDMI sink 252 receives the differential signal which is transmitted unidirectionally from the HDMI source 212 through a plurality of channels and which corresponds to the pixel data, and in either the horizontal blanking period or the vertical blanking period, receives the differential signal which is transmitted unidirectionally from the HDMI source 212 through a plurality of channels and which corresponds to the audio data and the control data.

That is, the HDMI sink 252 includes an HDMI receiver 82. The receiver 82 receives the differential signal corresponding to the pixel data and the differential signal corresponding to the audio data or the control data, transmitted unidirectionally from the HDMI source 212 connected via the HDMI cable 351 through the TMDS channels #0, #1, and #2, in synchronization with the pixel clock transmitted through the TMDS clock channel from the same HDMI source 212.

A transmission path of the HDMI system formed of the HDMI source 212 and the HDMI sink 252 includes: the three TMDS channels #0 to #2 which are transmission paths for performing a serial transmission in one direction the pixel data and the audio data in synchronization with the pixel clock from the HDMI source 212 to the HDMI sink 252; the TMDS clock channel which is a transmission path for transmitting the pixel clock; and a transmission path called a DDC (Display Data Channel) 83 and a CEC line 84.

The DDC 83 is composed of two signal lines (not shown) included in the HDMI cable 351, and is used by the HDMI source 212 to read E-EDID (Enhanced Extended Display Identification Data) from the HDMI sink 252 connected via the HDMI cable 351.

That is, the HDMI sink 252 includes, in addition to the receiver 82, an EDID ROM (Read Only Memory) 85 stored therein with the E-EDID which is capability information on its own capability (configuration/capability). The HDMI source 212 reads out the E-EDID of the HDMI sink 252 via the DDC 83 from the HDMI sink 252 connected via the HDMI cable 351, and on the basis of the E-EDID, recognizes a setting of a capability of the HDMI sink 212, i.e., an image format (profile), e.g., RGB, YCbCr 4:4:4, YCbCr 4:2:2, etc., with which an electronic apparatus having the HDMI sink 252 is compatible.

The CEC line 84 is composed of one signal line (not shown) included in the HDMI cable 351, and is used for performing a bi-directional communication of data for control between the HDMI source 212 and the HDMI sink 252.

The HDMI cable 351 also includes a line 86 connected to a pin called an HPD (Hot Plug Detect). The source apparatus may utilize the line 86 to detect a connection of the sink apparatus. The HDMI cable 351 further includes a line 87 used for providing a power supply to the sink apparatus from the source apparatus. The HDMI cable 351 also includes a reserve line 88.

Figure 6:
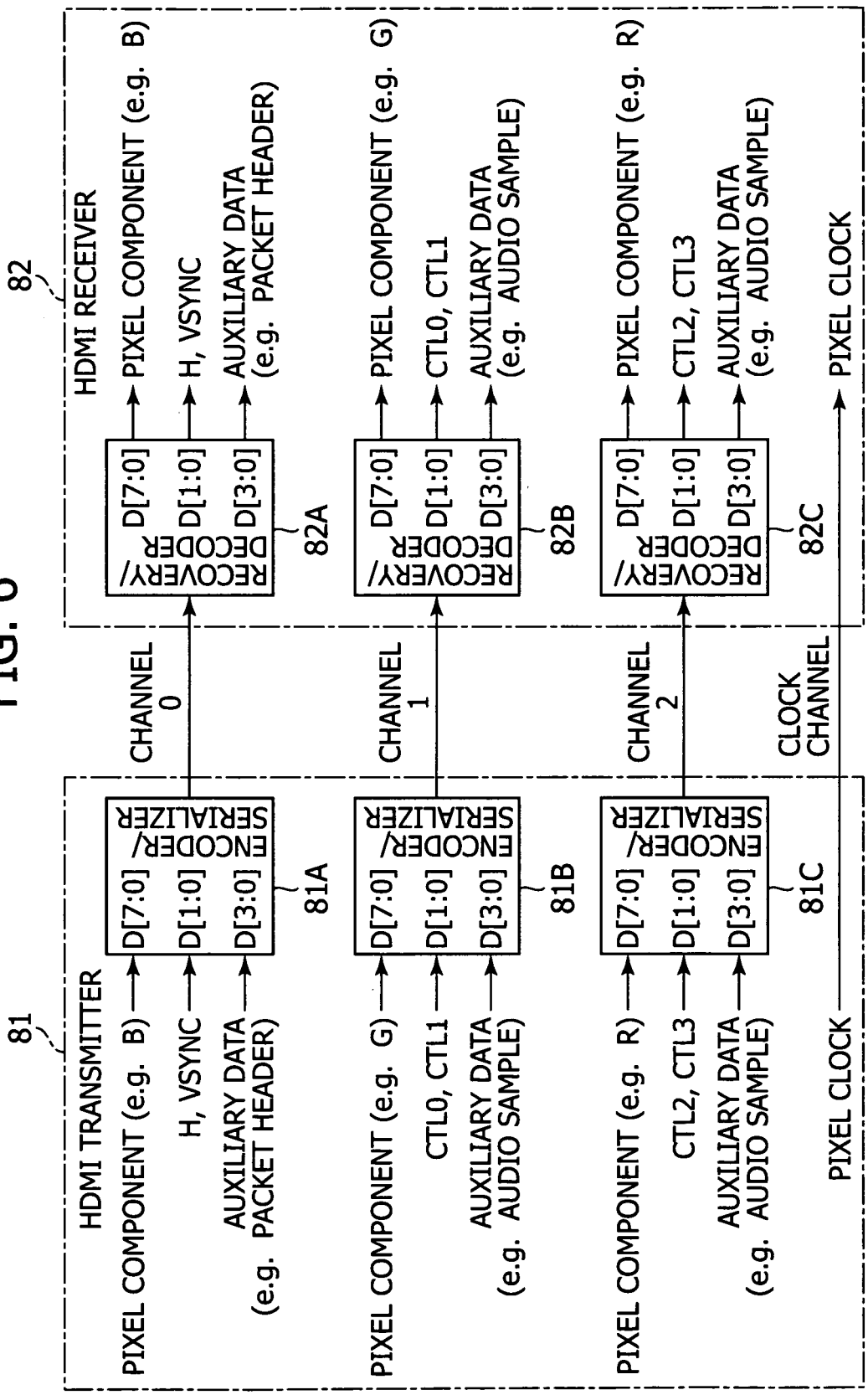
FIG. 6 is a block diagram showing a configuration example of an HDMI transmitter and an HDMI receiver.

FIG. 6 shows a configuration example of the HDMI transmitter 81 and the HDMI receiver 82 in FIG. 5.

The transmitter 81 includes three encoders/serializers 81A, 81B, and 81C, each of which corresponds to the three TMDS channels #0, #1, and #2. Each of the encoders/serializers 81A, 81B, and 81C encodes the image data, the auxiliary data, and the control data supplied thereto, converts the encoded data from parallel data to serial data, and transmits the converted data by the differential signal. When the image data has three components, for example, R(red), G(green), and B(blue), a B component is supplied to the encoder/serializer 81A, a G component is supplied to the encoder/serializer 81B, and an R component is supplied to the encoder/serializer 81C.

Examples of the auxiliary data include audio data and a control packet. The control packet is supplied to the encoder/serializer 81A, and the audio data is supplied to the encoders/serializers 81B and 81C, for example.

Examples of the control data include a 1-bit vertical synchronizing signal (VSYNC), a 1-bit horizontal synchronizing signal (HSYNC), and control bits CTL0, CTL1, CTL2, and CTL3, each of which is one bit. The vertical synchronizing signal and the horizontal synchronizing signal are supplied to the encoder/serializer 81A. The control bits CTL0 and CTL1 are supplied to the encoder/serializer 81B, and the control bits CTL2 and CTL3 are supplied to the encoder/serializer 81C.

The encoder/serializer 81A transmits in a time division manner the B component of the image data, the vertical synchronizing signal and the horizontal synchronizing signal, and the auxiliary data, each of which is supplied to the encoder/serializer 81A. That is, the encoder/serializer 81A converts the B component of the image data supplied to the encoder/serializer 81A into parallel data of an 8-bit unit which is a fixed bit number. The encoder/serializer 81A encodes the parallel data, converts the encoded data into serial data, and transmits the converted data through the TMDS channel #0.

The encoder/serializer 81A encodes 2-bit parallel data of the vertical synchronizing signal and the horizontal synchronizing signal supplied to the encoder/serializer 81A, converts the encoded data into serial data, and transmits the converted data through the TMDS channel #0. The encoder/serializer 81A further converts the auxiliary data supplied thereto into 4-bit-unit parallel data. The encoder/serializer 81A encodes the parallel data, converts the encoded data into serial data, and transmits the converted data through the TMDS channel #0.

The encoder/serializer 81B transmits in a time division manner the G component of the image data, the control bits CTL0 and CTL1, and the auxiliary data, each of which is supplied to the encoder/serializer 81B. That is, the encoder/serializer 81B converts the G component of the image data supplied to the encoder/serializer 81B into parallel data of an 8-bit unit which is a fixed bit number. The encoder/serializer 81B further encodes the parallel data, converts the encoded data into serial data, and transmits the converted data through the TMDS channel #1.

The encoder/serializer 81B encodes the 2-bit parallel data of the control bits CTL0 and CTL1 supplied to the encoder/serializer 81B, converts the encoded data into serial data, and transmits the serial data through the TMDS channel #1. The encoder/serializer 81B further converts the auxiliary data supplied thereto into 4-bit-unit parallel data. The encoder/serializer 81B encodes the parallel data, converts the encoded data into serial data, and transmits the converted data through the TMDS channel #1.

The encoder/serializer 81C transmits in a time division manner the R component of the image data, the control bits CTL2 and CTL3, and the auxiliary data, each of which is supplied to the encoder/serializer 81C. That is, the encoder/serializer 81C converts the R component of the image data supplied to the encoder/serializer 81C into parallel data of an 8-bit unit which is a fixed bit number. The encoder/serializer 81C encodes the parallel data, converts the encoded data into serial data, and transmits the converted data through the TMDS channel #2.

The encoder/serializer 81C encodes the 2-bit parallel data of the control bits CTL2 and CTL3 supplied to the encoder/serializer 81C, converts the encoded data into serial data, and transmits the serial data through the TMDS channel #2. The encoder/serializer 81C converts the auxiliary data supplied thereto into 4-bit-unit parallel data. The encoder/serializer 81C encodes the parallel data, converts the encoded data into serial data, and transmits the serial data through the TMDS channel #2.

The receiver 82 includes three recovery/decoders 82A, 82B, and 82C, which correspond to the three TMDS channels #0, #1, and #2, respectively. Each of the recovery/decoders 82A, 82B, and 82C receives the image data, the auxiliary data, and the control data, transmitted by the differential signal through the TMDS channels #0, #1, and #2. Each of the recovery/decoders 82A, 82B, and 82C converts the image data, the auxiliary data, and the control data, from the serial data into the parallel data, decodes the converted data, and outputs the decoded data.

That is, the recovery/decoder 82A receives the B component of the image data, the vertical synchronizing signal and horizontal synchronizing signal, and the auxiliary data transmitted by the differential signal through the TMDS channel #0. The recovery/decoder 82A converts the B component of the image data, the vertical synchronizing signal and the horizontal synchronizing signal, and the auxiliary data from the serial data into the parallel data, decodes the converted data, and outputs the decoded data.

The recovery/decoder 82B receives the G component of the image data, the control bits CTL0 and CTL1, and the auxiliary data transmitted by the differential signal through the TMDS channel #1. The recovery/decoder 82B converts the G component of the image data, the control bits CTL0 and CTL1, and the auxiliary data, from the serial data into the parallel data, decodes the converted data, and outputs the decoded data.

The recovery/decoder 82C receives the R component of the image data, the control bits CTL2 and CTL3, and the auxiliary data, transmitted by the differential signal through the TMDS channel #2. The recovery/decoder 82C converts the R component of the image data, the control bits CTL2 and CTL3, and the auxiliary data, from the serial data into the parallel data, decodes the converted data, and outputs the decoded data.

FIG. 7 shows an example of a transmission period in which various transmission data are transmitted through the three TMDS channels #0, #1, and #2 of the HDMI. FIG. 7 shows periods of the various transmission data when a progressive image which is composed of 720 pixels horizontally and 480 pixels vertically is transmitted through the TMDS channels #0, #1, and #2.

In video field in which the transmission data are transmitted through the three TMDS channels #0, #1, and #2 of the HDMI, there exist three types of periods, i.e., a video data period, a data island period, and a control period, depending on types of the transmission data.

In this case, the video field period is that which lasts from an active edge of a certain vertical synchronizing signal to an active edge of a subsequent vertical synchronizing signal, and is divided into: a horizontal blanking period; a vertical blanking period; and an active video period obtained by removing the horizontal blanking period and the vertical blanking period from the video field period.

The video data period is allocated to the active video period. In this video data period, data of an active pixel which is composed of 720 pixels×480 lines which configures non-compressed 1-screen image data is transmitted.

The data island period and the control period are allocated to the horizontal blanking period and the vertical blanking period. In the data island period and the control period, the auxiliary data is transmitted.

That is, the data island period is allocated to a part of the horizontal blanking period and the vertical blanking period. In the data island period, a packet, etc., of data which is not related to control, out of the auxiliary data, such as the audio data, for example, is transmitted.

The control period is allocated to other parts of the horizontal blanking period and the vertical blanking period. In this control period, data which forms part of the auxiliary data and which is related to control, for example, the vertical synchronizing signal and horizontal synchronizing signal, the control packet, etc., are transmitted.

Herein, according to the current HDMI, a frequency of the pixel clock transmitted through a TMDS clock channel is 165 MHz, for example, and in this case, a transmission rate of the data island period is about 500 Mbps.

FIG. 8 shows a pin array of the HDMI terminals 211 and 251. This pin array is called a type-A.

Two lines of differential lines through which TMDS Data#i+ and TMDS Data#i−, which are differential signals of a TMDS channel #i, are transmitted are connected to pins (of which the pin numbers are 1, 4, and 7) to which the TMDS Data#i+ is allocated and to pins (of which the pin numbers are 3, 6, and 9) to which the TMDS Data#i− is allocated.

The CEC line 84 through which the CEC signal, i.e., the data for control, is transmitted is connected to the pin of which the pin number is 13, and the pin of which the pin number is 14 is a reserve pin. A line through which an SDA (Serial Data) signal such as the E-EDID is transmitted is connected to the pin of which the pin number is 16, and a line through which an SCL (Serial Clock) signal, i.e., a clock signal used for synchronizing at the time of transmitting and receiving the SDA signal, is transmitted is connected to the pin of which the pin number is 15. The DDC 83 is configured by the line through which the SDA signal is transmitted and that through which the SCL signal is transmitted.

As described above, the line 86 used by the source apparatus 110 to detect the connection of the sink apparatus 120 is connected to the pin of which the pin number is 19. As described above, the line 87 for providing the power supply is connected to the pin of which the pin number is 18.

Figure 9:
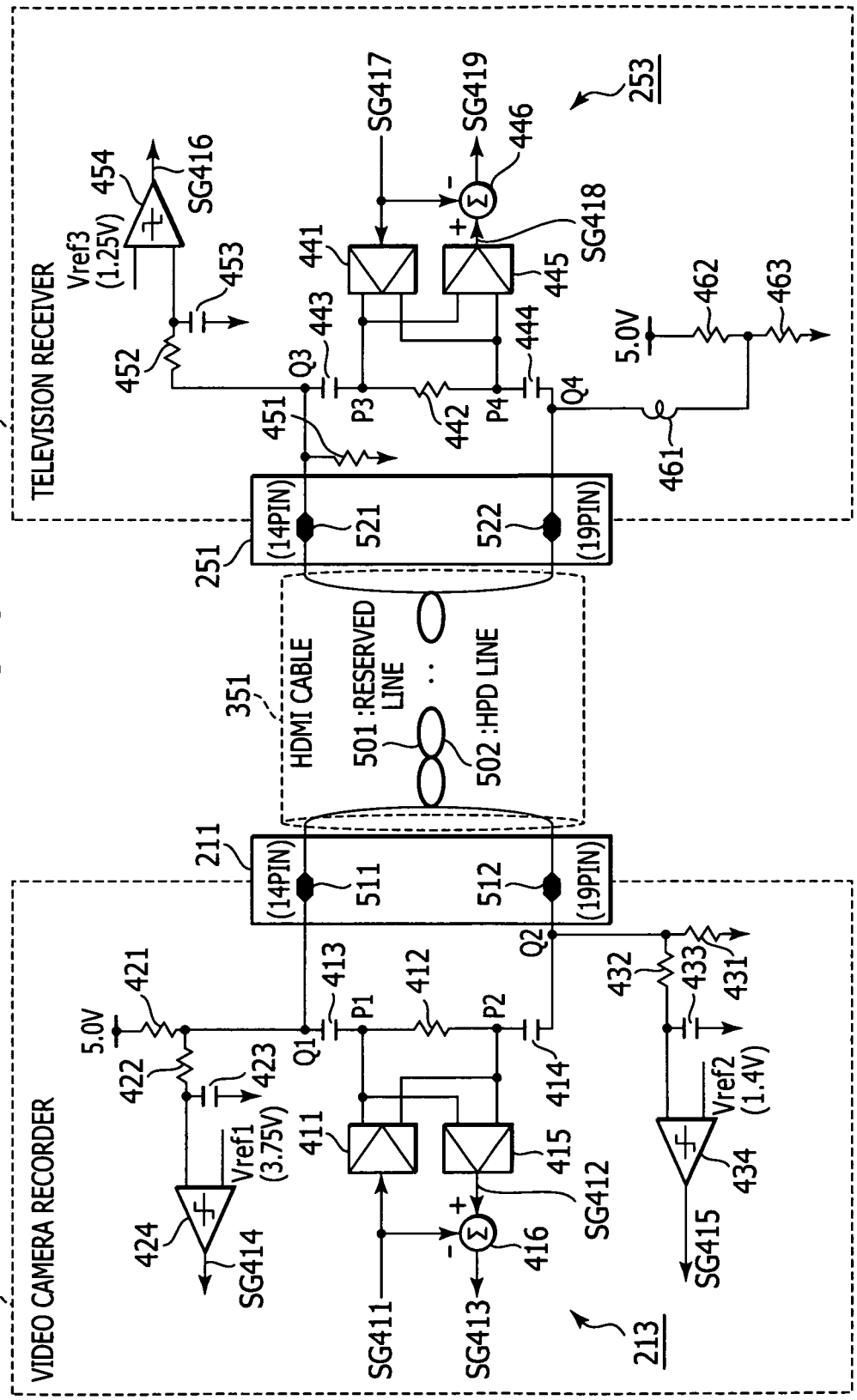
FIG. 9 is a connection diagram showing a configuration example of a high-speed data line interface between a video camera recorder and a television receiver.

FIG. 9 shows a configuration example of the high-speed data line interface 213 of the video camera recorder 210 and the high-speed data line interface 253 of the television receiver 250. These interfaces 213 and 253 constitute a communicating unit for performing a LAN (Local Area Network) communication. The communicating unit uses, out of a plurality of lines constituting the HDMI cable 351, a pair of differential lines, i.e., in this embodiment, the reserve line (Ether-line) corresponding to the reserve pin (14th pin) and the HPD line (Ether+line) corresponding to the HPD pin (19th pin) line, in order to perform the communication.

The video camera recorder 210 includes: a LAN signal transmitting circuit 411; an end-terminal resistance 412; AC-coupling capacitances 413 and 414; a LAN signal receiving circuit 415; a subtracting circuit 416; a pull-up resistance 421; a resistance 422 and a capacitance 423 which constitute a low-pass filter; a comparator 424; a pull-down resistance 431; a resistance 432 and a capacitance 433 which constitute a low-pass filter; and a comparator 434. Herein, the high-speed data line interface 213 is configured by: the LAN signal transmitting circuit 411; the end-terminal resistance 412; the AC-coupling capacitances 413 and 414; the LAN signal receiving circuit 415; and the subtracting circuit 416.

Between a power supply line (+5.0V) and a grounding line, a series circuit formed of: the pull-up resistance 421; the AC-coupling capacitance 413; the end-terminal resistance 412; the AC-coupling capacitance 414; and the pull-down resistance 431 is connected. A connection point P1 shared by the AC-coupling capacitance 413 and the end-terminal resistance 412 is connected to a positive output side of the LAN signal transmitting circuit 411, and connected to a positive input side of the LAN signal receiving circuit 415. A connection point P2 shared by the AC-coupling capacitance 414 and the end-terminal resistance 412 is connected to a negative output side of the LAN signal transmitting circuit 411, and is connected to a negative input side of the LAN signal receiving circuit 415. An input side of the LAN signal transmitting circuit 411 is supplied with a transmission signal (transmission data) SG411.

A positive-side terminal of the subtracting circuit 416 is supplied with an output signal SG412 of the LAN signal receiving circuit 415, and a negative-side terminal of the subtracting circuit 416 is supplied with the transmission signal (transmission data) SG411. The subtracting circuit 416 subtracts the transmission signal SG411 from the output signal SG412 of the LAN signal receiving circuit 415, so that a reception signal (reception data) SG413 is obtained.

A connection point Q1 shared by the pull-up resistance 421 and the AC-coupling capacitance 413 is connected to a grounding line via the series circuit of the resistance 422 and the capacitance 423. An output signal of the low-pass filter obtained at the connection point shared by the resistance 422 and the capacitance 423 is supplied to one input terminal of the comparator 424. In the comparator 424, the output signal of the low-pass filter is compared with a reference voltage Vref1 (+3.75 V) supplied to the other input terminal. An output signal SG414 of the comparator 424 is supplied to the CPU 223.

A connection point Q2 shared by the AC-coupling capacitance 414 and the pull-down resistance 431 is connected to a grounding line via the series circuit of the resistance 432 and the capacitance 433. An output signal of the low-pass filter obtained at the connection point shared by the resistance 432 and the capacitance 433 is supplied to one input terminal of the comparator 434. In the comparator 434, the output signal of the low-pass filter is compared with a reference voltage Vref2 (+1.4 V) supplied to the other input terminal. An output signal SG415 of the comparator 434 is supplied to the CPU 223.

The television receiver 250 includes: a LAN signal transmitting circuit 441; a end-terminal resistance 442; AC-coupling capacitances 443 and 444; a LAN signal receiving circuit 445; a subtracting circuit 446; a pull-down resistance 451; a resistance 452 and a capacitance 453 which constitute a low-pass filter; a comparator 454; a choke coil 461; a resistance 462; and a resistance 463. Herein, the high-speed data line interface 253 is configured by: the LAN signal transmitting circuit 441; the end-terminal resistance 442; the AC-coupling capacitances 443 and 444; the LAN signal receiving circuit 445; and the subtracting circuit 446.

Between a power supply line (+5.0 V) and a grounding line, a series circuit of the resistance 462 and the resistance 463 is connected. Between a connection point shared by the resistance 462 and the resistance 463, and the grounding line, there is connected a series circuit formed of the choke coil 461; the AC-coupling capacitance 444; the end-terminal resistance 442; the AC-coupling capacitance 443; and the pull-down resistance 451.

A connection point P3 shared by the AC-coupling capacitance 443 and the end-terminal resistance 442 is connected to a positive output side of the LAN signal transmitting circuit 441, and is connected to a positive input side of the LAN signal receiving circuit 445. A connection point P4 shared by the AC-coupling capacitance 444 and the end-terminal resistance 442 is connected to a negative output side of the LAN signal transmitting circuit 441, and is connected to a negative input side of the LAN signal receiving circuit 445. An input side of the LAN signal transmitting circuit 441 is supplied with a transmission signal (transmission data) SG417.

A positive-side terminal of the subtracting circuit 446 is supplied with an output signal SG418 of the LAN signal receiving circuit 445, and a negative-side terminal of the subtracting circuit 446 is supplied with the transmission signal SG417. The subtracting circuit 446 subtracts the transmission signal SG417 from the output signal SG418 of the LAN signal receiving circuit 445, so that a reception signal (reception data) SG419 is obtained.

A connection point Q3 shared by the pull-down resistance 451 and the AC-coupling capacitance 443 is connected to a grounding line via the series circuit of the resistance 452 and the capacitance 453. An output signal of the low-pass filter obtained at the connection point shared by the resistance 452 and the capacitance 453 is supplied to one input terminal of the comparator 454. In the comparator 454, the output signal of the low-pass filter is compared with a reference voltage Vref3 (+1.25 V) supplied to the other input terminal. An output signal SG416 of the comparator 454 is supplied to the CPU 271.

A reserve line 501 and an HPD line 502 included in the HDMI cable 351 constitute a differential twisted pair. A source-side end 511 of the reserve line 501 is connected to the 14th pin of the HDMI terminal 211, and a sink-side end 521 of the reserve line 501 is connected to the 14th pin of the HDMI terminal 251. A source-side end 512 of the HPD line 502 is connected to the 19th pin of the HDMI terminal 211, and a sink-side end 522 of the HPD line 502 is connected to the 19th pin of the HDMI terminal 251.

In the video camera recorder 210, the connection point Q1 shared by the pull-up resistance 421 and the AC-coupling capacitance 413 is connected to the 14th pin of the HDMI terminal 211, and the connection point Q2 shared by the pull-down resistance 431 and the AC-coupling capacitance 414 is connected to the 19th pin of the HDMI terminal 211. On the other hand, in the television receiver 250, the connection point Q3 shared by the pull-down resistance 451 and the AC-coupling capacitance 443 is connected to the 14th pin of the HDMI terminal 251, and the connection point Q4 shared by the choke coil 461 and the AC-coupling capacitance 444 is connected to the 19th pin of the HDMI terminal 251.

Subsequently, an operation of the LAN communication by the high-speed data line interfaces 213 and 253 thus configured is described.

In the video camera recorder 210, the transmission signal (transmission data) SG411 outputted from the CPU 223 is supplied to the input side of the LAN signal transmitting circuit 411, and from the LAN signal transmitting circuit 411, differential signals (a positive-output signal and a negative-output signal) corresponding to the transmission signal SG411 are outputted. The differential signals outputted from the LAN signal transmitting circuit 411 are supplied to the connection points P1 and P2, and transmitted to the television receiver 250, through a pair of lines (the reserve line 501 and the HPD line 502) of the HDMI cable 351.

In the television receiver 250, the transmission signal (transmission data) SG417 outputted from the CPU 271 is supplied to the input side of the LAN signal transmitting circuit 441, and from the LAN signal transmitting circuit 441, differential signals (a positive-output signal and a negative-output signal) corresponding to the transmission signal SG417 are outputted. The differential signals outputted from the LAN signal transmitting circuit 441 are supplied to the connection points P3 and P4, and transmitted to the video camera recorder 210, through a pair of lines (the reserve line 501 and the HPD line 502) of the HDMI cable 351.

In the video camera recorder 210, since the input side of the LAN signal receiving circuit 415 is connected to the connection points P1 and P2, as the output signal SG412 of the LAN signal receiving circuit 415, an added signal in which the transmission signal corresponding to the differential signal (a current signal) outputted from the LAN signal transmitting circuit 411 and the reception signal corresponding to the differential signal thus transmitted from the television receiver 250 are added is obtained. The subtracting circuit 416 subtracts the transmission signal SG411 from the output signal SG412 of the LAN signal receiving circuit 415. Thus, the output signal SG413 of the subtracting circuit 416 becomes to correspond to the transmission signal (transmission data) SG417 of the television receiver 250.

In the television receiver 250, since the input side of the LAN signal receiving circuit 445 is connected to the connection points P3 and P4, as the output signal SG418 of the LAN signal receiving circuit 445, an added signal in which the transmission signal corresponding to the differential signal (a current signal) outputted from the LAN signal transmitting circuit 441 and the reception signal corresponding to the differential signal thus transmitted from the video camera recorder 210 are added is obtained. The subtracting circuit 446 subtracts the transmission signal SG417 from the output signal SG418 of the LAN signal receiving circuit 445. Thus, the output signal SG419 of the subtracting circuit 446 becomes to correspond to the transmission signal (transmission data) SG411 of the video camera recorder 210.

Thus, between the high-speed data line interface 213 of the video camera recorder 210 and the high-speed data line interface 253 of the television receiver 250, a two-way LAN communication can be performed.

According to a configuration example shown in FIG. 9, in the interface for performing by one HDMI cable 351 a video-and-audio data transmission, an exchange and a verification of connection-apparatus information, a communication of apparatus control data, and a LAN communication, the LAN communication is performed by the bi-directional communication via a pair of differential transmission paths and a connection state of the interface is notified by a DC bias potential of at least one of the transmission paths. Thus, a spatial separation in which the SCL line and the SDA line are not physically used for the LAN communication can be enabled. As a result, this separation can make it possible to form a circuit for the LAN communication irrespective of an electrical specification regulated regarding DDC, and thus, a stable and ensured LAN communication can be achieved at low cost.

In FIG. 9, the HPD line 502 notifies the video camera recorder 210 of a connection of the HDMI cable 351 to the television receiver 250 at a DC bias level, in addition to the LAN communication. That is, the resistances 462 and 463 and the choke coil 461 within the television receiver 250 bias the HPD line 502 at about 4V via the 19th pin of the HDMI terminal 251 when the HDMI cable 351 is connected to the television receiver 250. The video camera recorder 210 extracts the DC bias of the HPD line 502 by the low-pass filter formed of the resistance 432 and the capacitance 433, and causes the comparator 434 to compare the extracted DC bias with the reference voltage Vref2 (for example, 1.4 V).

Voltage of the 19th pin of the HDMI terminal 211 is lower than the reference voltage Vref2 because of the existence of the pull-down resistance 431 when the HDMI cable 351 is not connected to the television receiver 250. In contrast, when the HDMI cable 351 is connected to the television receiver 250, the voltage of the 19th pin is higher than the reference voltage Vref2. Therefore, the output signal SG415 of the comparator 434 is at a high level when the HDMI cable 351 is connected to the television receiver 250, and otherwise, at a low level. Thus, the CPU 223 of the video camera recorder 210 can recognize whether the HDMI cable 351 is connected to the television receiver 250 on the basis of the output signal SG415 of the comparator 434.

In FIG. 9, there are provided functions of mutually recognizing by the DC bias potential of the reserve line 501 whether apparatuses connected to both ends of the HDMI cable 351 are those capable of performing the LAN communication (hereinafter, called an "e-HDMI compatible apparatus") or those not capable of performing the LAN communication (hereinafter, called an "e-HDMI non-compatible apparatus").

As described above, the video camera recorder 210 pulls up (+5V) the reserve line 501 with the resistance 421, and the television receiver 250 pulls down the reserve line 501 with the resistance 451. The resistances 421 and 451 do not exist in the e-HDMI non-compatible apparatus.

The video camera recorder 210 uses the comparator 424 to compare the DC potential of the reserve line 501, passing through the low-pass filter formed of the resistance 422 and the capacitance 423, with the reference voltage Vref1, as described above. When the television receiver 250 is the e-HDMI compatible apparatus and the pull-down resistance 451 exists, the voltage of the reserve line 501 becomes 2.5V. However, when the television receiver 250 is the e-HDMI non-compatible apparatus and the pull-down resistance 451 does not exist, the voltage of the reserve line 501 becomes 5V because of the existence of the pull-up resistance 421.

Thus, when the reference voltage Vref1 is rendered 3.75V, for example, the output signal SG414 of the comparator 424 is at a low level when the television receiver 250 is the e-HDMI compatible apparatus, and otherwise, at a high level. Thus, on the basis of the output signal SG414 of the comparator 424, the CPU 223 of the video camera recorder 210 recognizes whether the television receiver 250 is the e-HDMI compatible apparatus.

Similarly, the television receiver 250 uses the comparator 454 to compare the DC potential of the reserve line 501, passing through the low-pass filter composed of the resistance 452 and the capacitance 453, with the reference voltage Vref3, as described above. When the video camera recorder 210 is the e-HDMI compatible apparatus and the pull-up resistance 421 exists, the voltage of the reserve line 501 becomes 2.5V. However, when the video camera recorder 210 is the e-HDMI non-compatible apparatus and the pull-up resistance 421 does not exist, the voltage of the reserve line 501 becomes 0V because of the existence of the pull-down resistance 451.

Thus, when the reference voltage Vref3 is rendered 1.25V, for example, the output signal SG416 of the comparator 454 is at a high level when the video camera recorder 210 is the e-HDMI compatible apparatus, and otherwise, at a low level. Thus, on the basis of the output signal SG416 of the comparator 454, the CPU 271 of the television receiver 250 recognizes whether the video camera recorder 210 is the e-HDMI compatible apparatus.

It is noted that the pull-up resistance 421 shown in FIG. 9 may not be arranged within the video camera recorder 210 but may be arranged within the HDMI cable 351. In such a case, the terminals of the pull-up resistance 421 are connected to, out of the lines arranged within the HDMI cable 351, the reserve line 501 and the line (signal line) connected to the power supply (power supply potential), respectively.

Further, the pull-down resistance 451 and the resistance 463 shown in FIG. 9 may not be arranged within the television receiver 250 but may be arranged within the HDMI cable 351. In such a case, the terminals of the pull-down resistance 451 are connected to, out of the lines arranged within the HDMI cable 351, the reserve line 501 and the line (grounding line) connected to a ground (reference potential), respectively. Further, the terminals of the resistance 463 are connected to, out of the lines arranged within the HDMI cable 351, the HPD line 502 and the line (grounding line) connected to a ground (reference potential), respectively.

Figure 10:
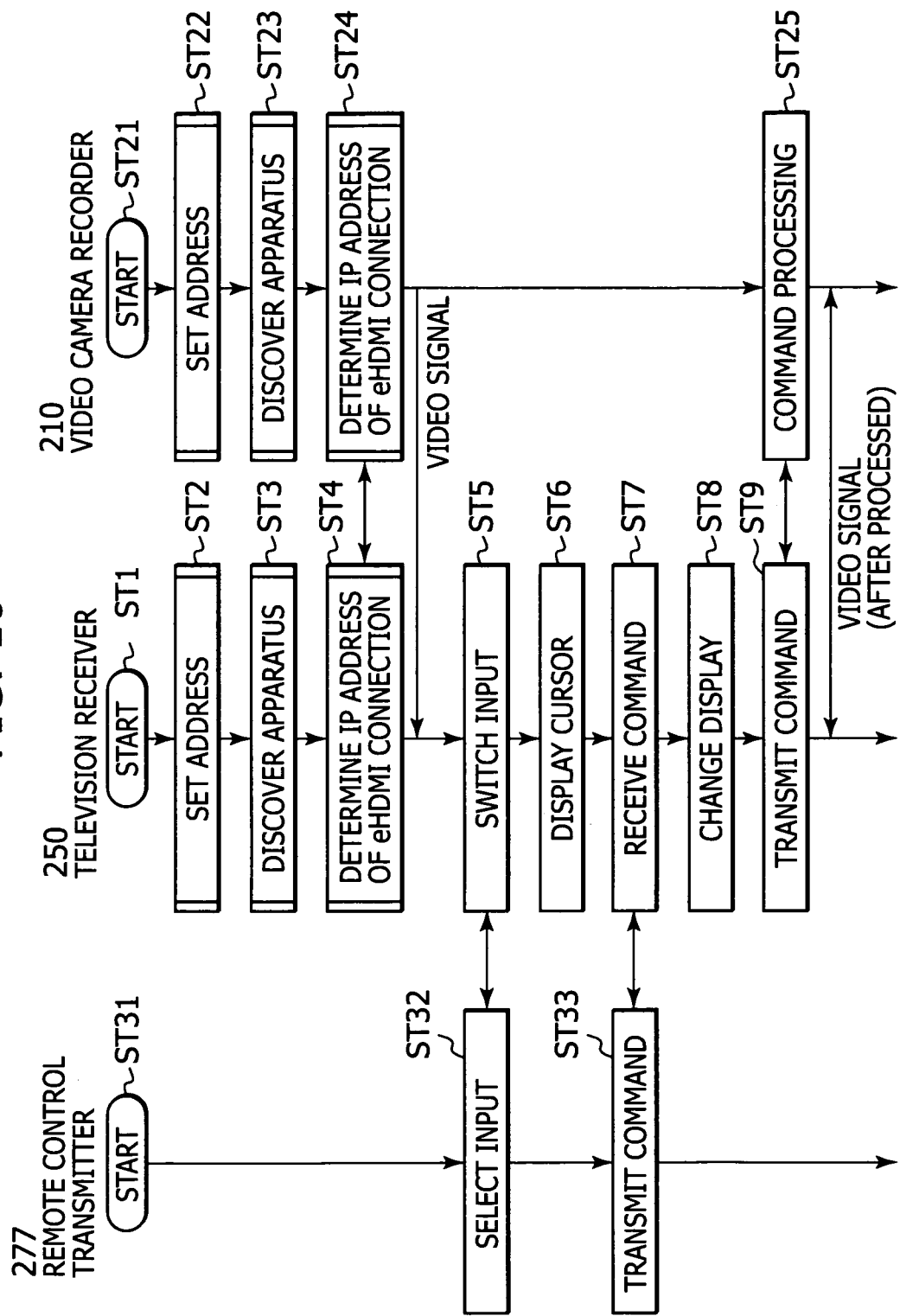
FIG. 10 a diagram showing one example of a processing flow in an AV system.

FIG. 10 shows one example of a processing procedure in the AV system 100 shown in FIG. 1 and FIG. 2.

The television receiver 250 starts a processing in step S1, and performs an address setting in step S2. In this address setting, a fixed IP address may be allocated manually, or the address may be allocated by Auto IP or DHCP client according to a regulation of DLNA (Digital Living Network Alliance). Thereafter, the television receiver 250 finds an apparatus of UPnp (Universal Plug and Play), for example, at step ST3, thereby to find a DLNA-compatible apparatus connected to a network. Note that UPnP is a protocol for achieving coordination between the apparatuses on a TCP/IP network. In this UPnP, SSDP (Simple Service Discovery Protocol) is utilized to a method for finding an apparatus.

Similarly, the video camera recorder 210 starts a processing in step ST21, performs an address setting in step ST22, and finds an apparatus in step ST23.

Subsequently, the television receiver 250 determines in step ST4 whether the apparatus found in step ST3 is an apparatus directly connected by the HDMI. In the case of the apparatus directly connected by the HDMI in step ST4, the television receiver 250 obtains and holds an IP address of the connected apparatus for each terminal (port) of the HDMI.

Similarly, the video camera recorder 210 determines in step ST24 whether the apparatus found in step ST23 is an apparatus directly connected by the HDMI. In the case of the apparatus directly connected by the HDMI in step ST24, the video camera recorder 210 obtains and holds an IP address of the connected apparatus for each terminal (port) of the HDMI.

Figure 11:
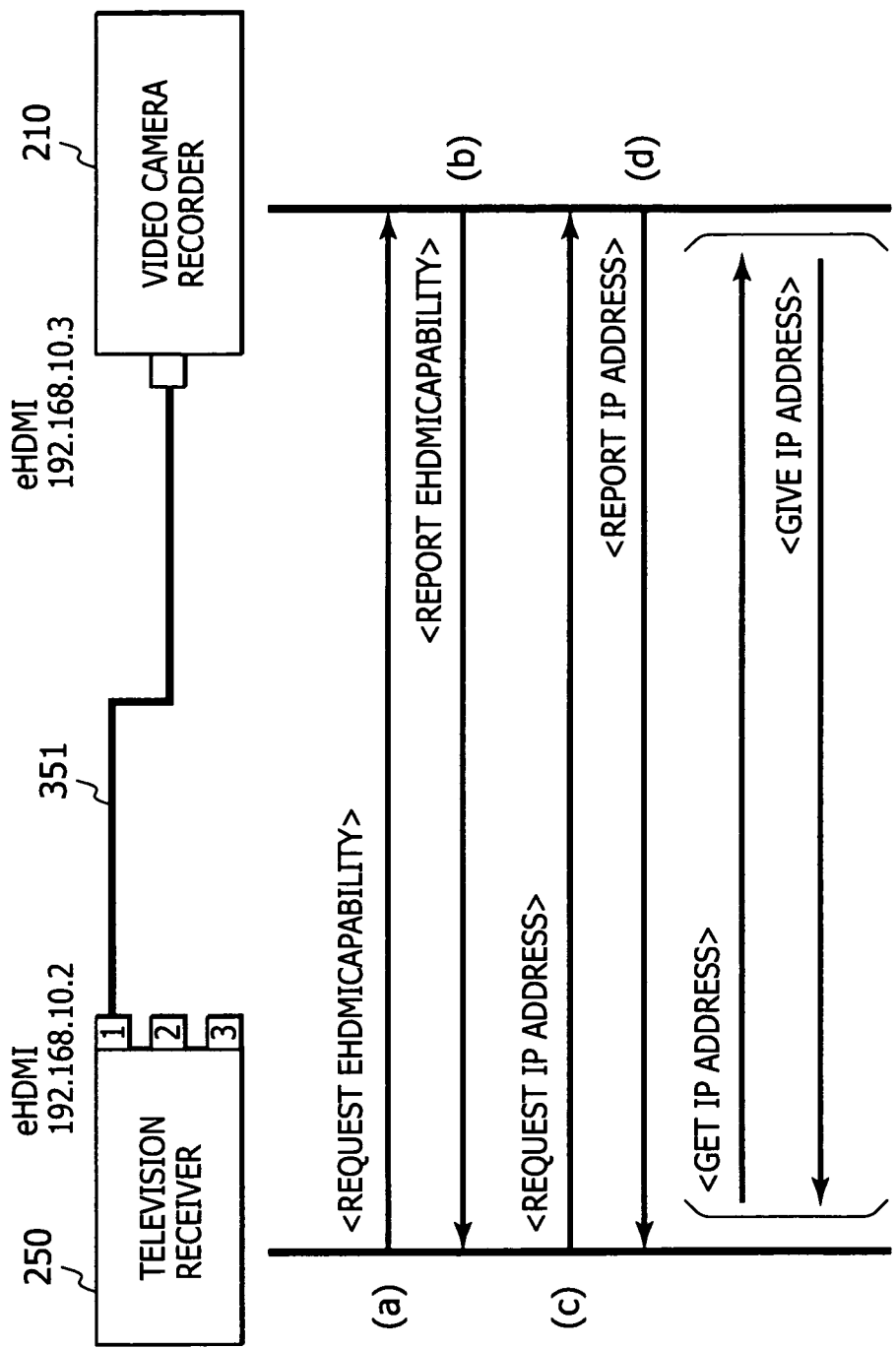
FIG. 11 is a diagram for describing a determining sequence of an IP address.

FIG. 11 shows a process sequence in step ST4 of the television receiver 250. It is noted that FIG. 11 is an example of a case where a first HDMI terminal of the television receiver 250 is connected with the video camera recorder 210 via the HDMI cable 351.

(a) At first, the television receiver 250 uses the CEC line to inquire the video camera recorder 210 of whether the video camera recorder 210 is compatible with the eHDMI by a command <Request EHDMI Capability>. (b) In response thereto, the video camera recorder 210 uses the CEC line to respond to the television receiver 250 that the video camera recorder 210 is compatible with the eHDMI (true) or not compatible with the eHDMI (false) by a response command of <Report EHDMI Capability>.

Thereafter, when the video camera recorder 210 is compatible with the eHDMI (true), (c) the television receiver 250 uses the CEC line to request to the video camera recorder 210 the IP address by a command <Request IP Address> (or <Get IP Address>). (d) In response thereto, the video camera recorder 210 uses the CEC line to transmit the IP address to the television receiver 250 by a command of <Report IP Address> (or <Give IP Address>).

FIG. 12 shows a list of CEC extension codes used in the processing. Conventionally, the television receiver 250 holds a CEC physical address corresponding to each HDMI terminal as shown in a table in FIG. 13A. However, in this embodiment, as shown in a table in FIG. 13B, the television receiver 250 holds and manages the CEC physical address and the IP address corresponding to each HDMI terminal. Thus, the reason for obtaining and managing the IP address by the television receiver 250 is to determine whether a content is that provided in an apparatus (DLNA server) directly connected by the HDMI when the content of the DLNA is designated by a user, for example.

Returning to FIG. 10, after the processing in step ST24, the video camera recorder 210 starts transmitting the baseband video data (video signal) and audio data through the TMDS channel to the television receiver 250. In an example of this processing procedure, it is provided that the video camera recorder 210 is in a reproducing mode, and after the processing in step ST24, the video camera recorder 210 transmits to the television receiver 250 through the TMDS channel initial video data in the reproducing mode, i.e., video data superimposed with the display signal for selecting a video signal to be reproduced, for example.

Figure 14A:
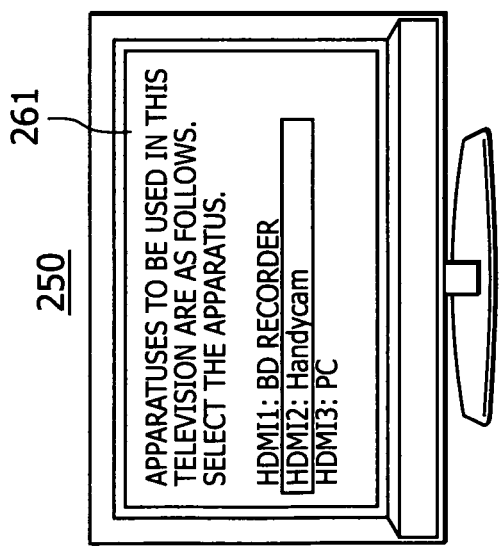
FIGS. 14A, 14B, 14C, and 14D are diagrams each showing a display example of the television receiver in one example of the processing flow of the AV system.

Further, after the processing in step ST4, the television receiver 250 displays the apparatus connected to each HDMI terminal on the display panel 261, which results in a state that the user may easily perform an apparatus selection. FIG. 14A shows a display example, in which an HDMI 1 is connected with a BD recorder, an HDMI 2 is connected with a Handycam(registered trademark of Sony Corporation), i.e., a video camera recorder, an HDMI terminal 3 is connected with a personal computer (PC), thereby encouraging the user to perform an input selection (apparatus selection).

Figure 14B:
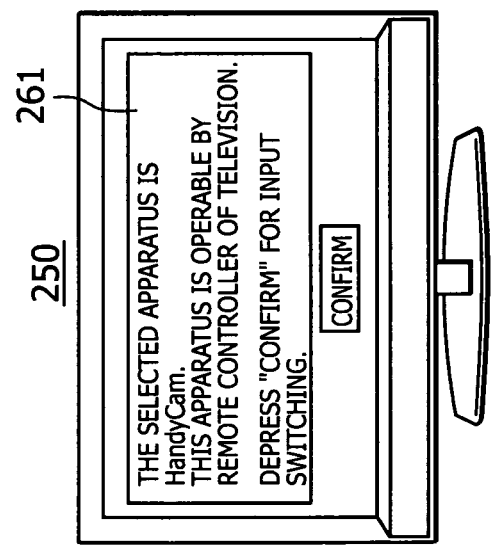

The remote control transmitter 277 starts a processing in step ST31, and when the user operates the input selection in step ST32, the television receiver 250 performs input switching in step ST5. In this case, on the display panel 261, a verification screen as shown in FIG. 14B is displayed at a stage at which the user operates the input selection. FIG. 14B is an example of a case where the Handycam (digital video camera) is selected.

Figure 14C:
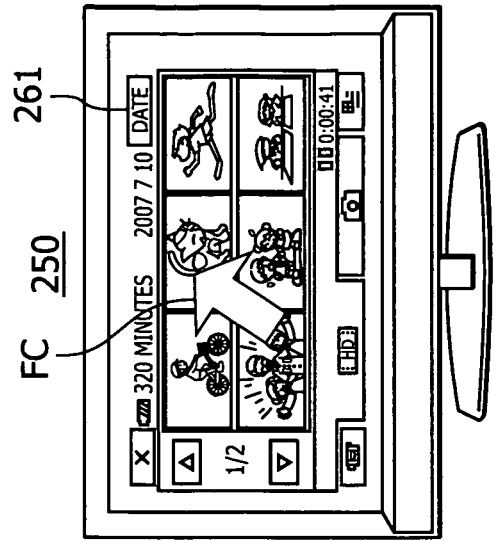

The television receiver 250 actually performs the input switching after the user performs the verification operation with the remote control transmitter 277. Thereafter, the television receiver 250 displays the free cursor in step ST6. FIG. 14C shows a display example of the display panel 261 after performing the processing in step ST6, in which a GUI screen for selecting the video signal to be reproduced is displayed and a free cursor FC is also displayed.

In this state, the user can operate the remote control transmitter 277 to move a position of the free cursor FC or to perform a click operation. When there is a user operation, the remote control transmitter 277 transmits a command corresponding to the user operation to the television receiver 250 in step ST33.

In response thereto, the television receiver 250 receives the command from the remote control transmitter 277 in step ST7, and performs a display change in step ST8. For example, when a position moving operation of the free cursor FC is performed by the user, a display position of the free cursor FC on the display screen is changed. Further, for example, when the click operation is performed by the user, a display mode of the free cursor FC is temporarily changed. Thus, the user can verify that the click operation is recognized by the television receiver 250.

Figure 14D:
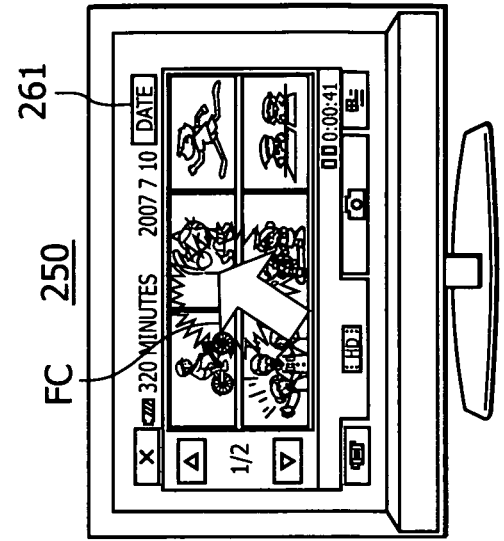

FIG. 14D shows an example of changing the display mode of the free cursor FC when the click operation is performed. Instead of changing a shape of the free cursor FC or simultaneously of changing the shape, a color of the free cursor FC may be changed. Further, when the click operation is thus performed, instead of changing the display mode of the free cursor FC or simultaneously of changing the display mode, a sound may be outputted.

The television receiver 250 transmits a command (operational information) in step ST9. The television receiver 250 displays the free cursor FC in step ST6, and thereafter, is in a state of periodically performing a command transmission. In this case, as in the step ST7, the command related to the position moving operation of the free cursor FC or the click operation is received from the remote control transmitter 277, a command (operational information) on which such an operation is reflected is transmitted. Instead of periodically performing the command transmission, the command may be transmitted only when there is the click operation.

FIG. 15 shows a format example of the command (operational information). As shown in FIG. 16A, "offset_x" indicates a size in a horizontal-direction from an upper left (1, 1) of a display screen DSa of the display panel 261 to an upper left of a display region DSb of a video by the video data (video signal) transmitted from the video camera recorder 210. As shown in FIG. 16A, "offsety" indicates a size in a vertical direction from the upper left (1, 1) of the display screen DSa to the upper left of the display region DSb.

Further, as shown in FIG. 16A, "ext_window_width" indicates a horizontal-direction size of the display region DSb. As shown in FIG. 16A, "ext_window_height" indicates a size in a vertical direction of the display region DSb. Further, "pos_x" indicates a position (x coordinate) in a horizontal direction of the free cursor FC on the display screen DSa of the display panel 261. "pos_y" indicates a position (y coordinate) in a vertical direction of the free cursor FC on the display screen DSa of the display panel 261. Further, "true" indicates that the click operation is performed. When the click operation is not performed, "false" is displayed instead of "true".

Returning to FIG. 10, when the command (operational information) is transmitted from the television receiver 250, the video camera recorder 210 performs a processing on the basis of the command (operational information) in step ST25. In this case, the video camera recorder 210 transmits the processed video data (video signal) and audio data through the TMDS channel, to the television receiver 250.

In this case, the video camera recorder 210 converts the position (coordinate) on the display screen DSa of the free cursor FC at the time of performing the click operation, into a corresponding position (coordinate) on a display screen DSc of the LCD panel 230, and on the basis of the converted position information (coordinate information), performs a processing similar to that when the appropriate position of the touch panel 231 placed on the LCD panel 230 is depressed.

In this case, a position (x coordinate) in the horizontal direction after the conversion may be evaluated according to Equation (1). In this equation, "handycam_width" indicates a size in the horizontal direction of the display screen DSc of the LCD panel 230, as shown in FIG. 16B.

$$x=(pos\_x\text{-}offset\_x)/(handycam\_width/ext\_window\_width) \quad (1)$$

Further, a position (y coordinate) in the vertical direction after the conversion is obtained according to Equation (2). In this equation, "handycam_height" indicates a size in the vertical direction of the display screen DSc of the LCD panel 230, as shown in FIG. 16B.

$$y=(pos\_y\text{-}offset\_y)/(handycam\_height/ext\_window\_height) \quad (2)$$

When coordinate converting processes according to the Equation (1) and Equation (2) are performed, if there exists the display region DSb of the image based on the video data from the video camera recorder 210, in a part of the display screen DSa of the display panel 261 of the television receiver 250, even when a vertical-to-horizontal ratio of the display region DSb to the display screen DSc of the LCD panel 230 of the video camera recorder 210 differs, for example, the position (coordinate) on the display screen DSa of the free cursor FC, therefore, a position (conversion) on the display screen DSc of the LCD panel 230, corresponding to the position (coordinate) on the display region DSb of the free cursor FC, can be correctly evaluated.

Figure 17A:
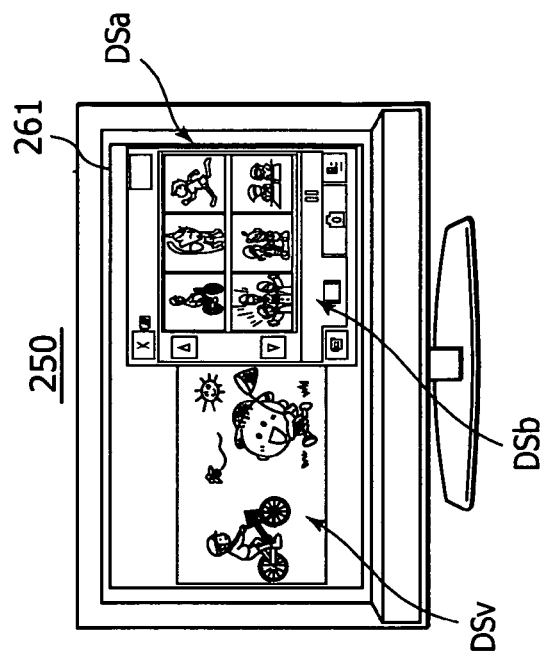
FIGS. 17A, 17B, and 17C are diagrams each showing an example of a display region of a video by video data from the video camera recorder, on the display screen in the television receiver.
Figure 17B:
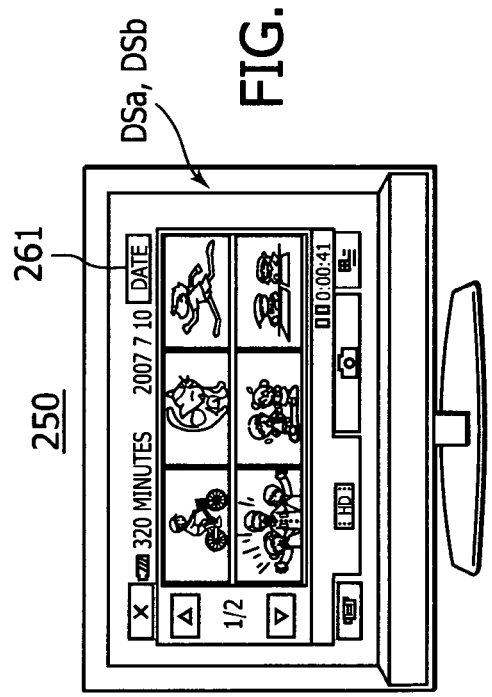
Figure 17C:
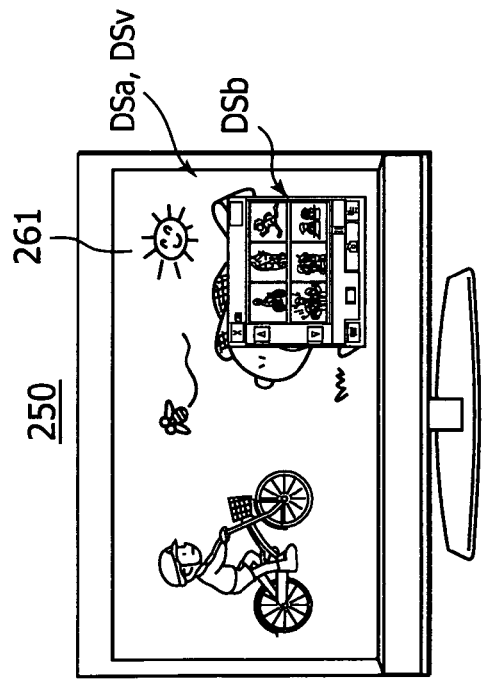

FIG. 17 shows an example of the display region DSb of the image based on the video data from the video camera recorder 210, on the display screen DSa of the display panel 261 of the television receiver 250. FIG. 17A is an example in which the entire display screen DSa is the display region DSb. FIG. 17B is an example in which a left half of the display screen DSa is a display region DSv of a television broadcast, and a right half of the display screen DSa is the display region DSb. FIG. 17C is an example in which the entire display screen DSa is the display region DSv of the television broadcast, and a part of the display region DSv is the display region DSb.

As described above, in the AV system 100 shown in FIG. 1 and FIG. 2, on the display panel 261 of the television receiver 250, the image based on the reproduced video signal or the imaged video signal in the video camera recorder 210 is displayed in a state of being superimposed on the GUI screen. Further, on the display screen, the free cursor FC is displayed. The user may use the remote control transmitter 277 to perform the moving operation of the free cursor FC, the click operation, etc., and the operational information is transmitted from the television receiver 250 to the video camera recorder 210.

The operational information includes the position information of the free cursor FC on the display screen of the television receiver 250, the click operational information by the user, etc. In the video camera recorder 210, on the basis of the operational information transmitted from the television receiver 250, as in the case of the user operating by the touch panel 231 placed on the LCD panel 230, the reproducing operation, etc., are controlled at the time of reproducing while the image-capturing operation, the recording operation, etc., are controlled at the time of image-capturing.

Therefore, in the AV system 100 shown in FIG. 1 and FIG. 2, by the operation on the display screen of the display panel 261 of the television receiver 250, the operation of the video camera recorder 210 can be controlled favorably. That is, the user uses the remote control transmitter 277 of the accustomed television receiver 250 to easily operate the operation of the video camera recorder 210 while viewing the video displayed on the display panel 261 of the television receiver 250.

Figure 18:
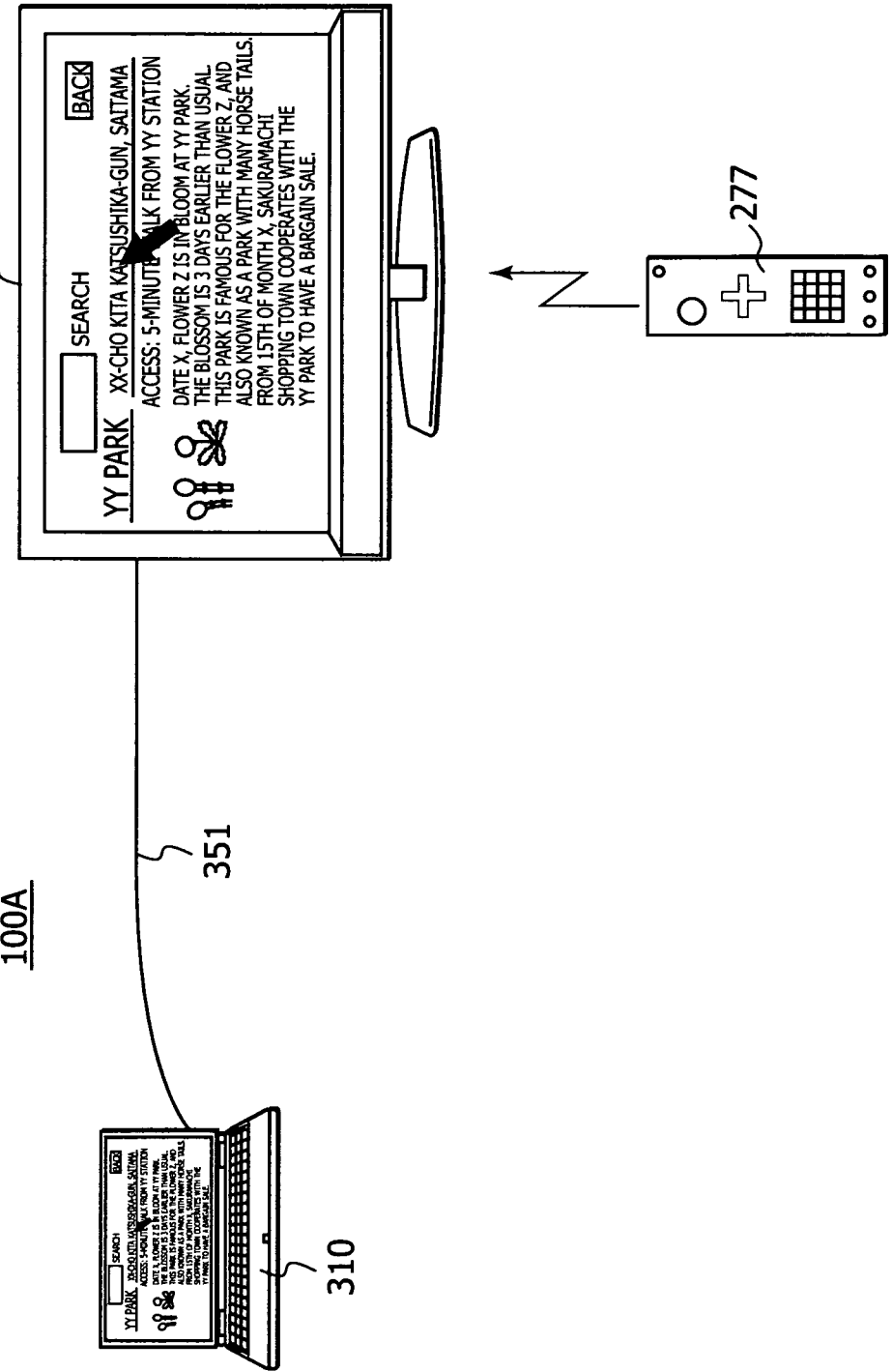
FIG. 18 is a system configuration diagram showing a configuration example of an AV system as another embodiment of the present invention.
Figure 19:
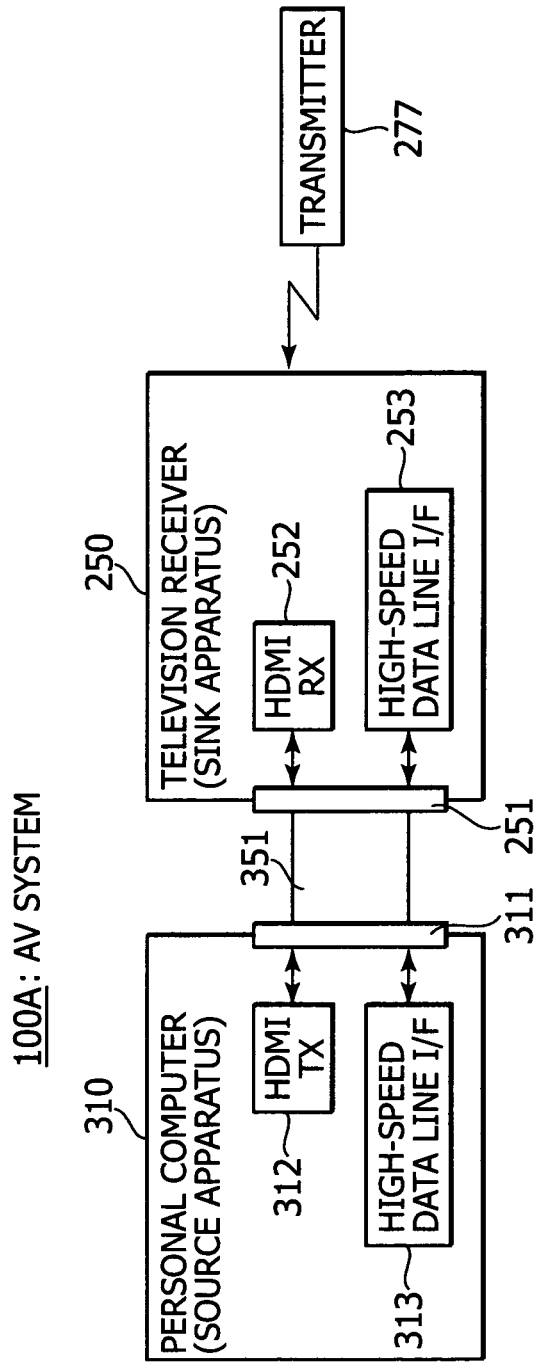
FIG. 19 is a block diagram showing a configuration example of the AV system as the other embodiment of the present invention.

Subsequently, another embodiment of the present invention is described. FIG. 18 and FIG. 19 each show a configuration example of an AV (Audio Visual) system 100A as an embodiment. In FIG. 18 and FIG. 19, portions corresponding to those in FIG. 1 and FIG. 2 are assigned the same reference numerals, and the description is appropriately omitted.

The AV system 100A is configured so that a personal computer 310 as a source apparatus and a television receiver 250 as a sink apparatus are connected via an HDMI cable 351.

As shown in FIG. 19, the personal computer 310 and the television receiver 250 are connected via the HDMI cable 351. The personal computer 310 is provided with an HDMI terminal 311. The HDMI terminal 311 is connected with an HDMI transmitting unit (HDMITX) 312 and a high-speed data line interface (I/F) 313. The television receiver 250 is provided with an HDMI terminal 251. The HDMI terminal 251 is connected with an HDMI receiving unit (HDMIRX) 252 and a high-speed data line interface (I/F) 253. One end of the HDMI cable 351 is connected to the HDMI terminal 311 of the personal computer 310, and the other end of the HDMI cable 351 is connected to the HDMI terminal 251 of the television receiver 250.

Figure 20:
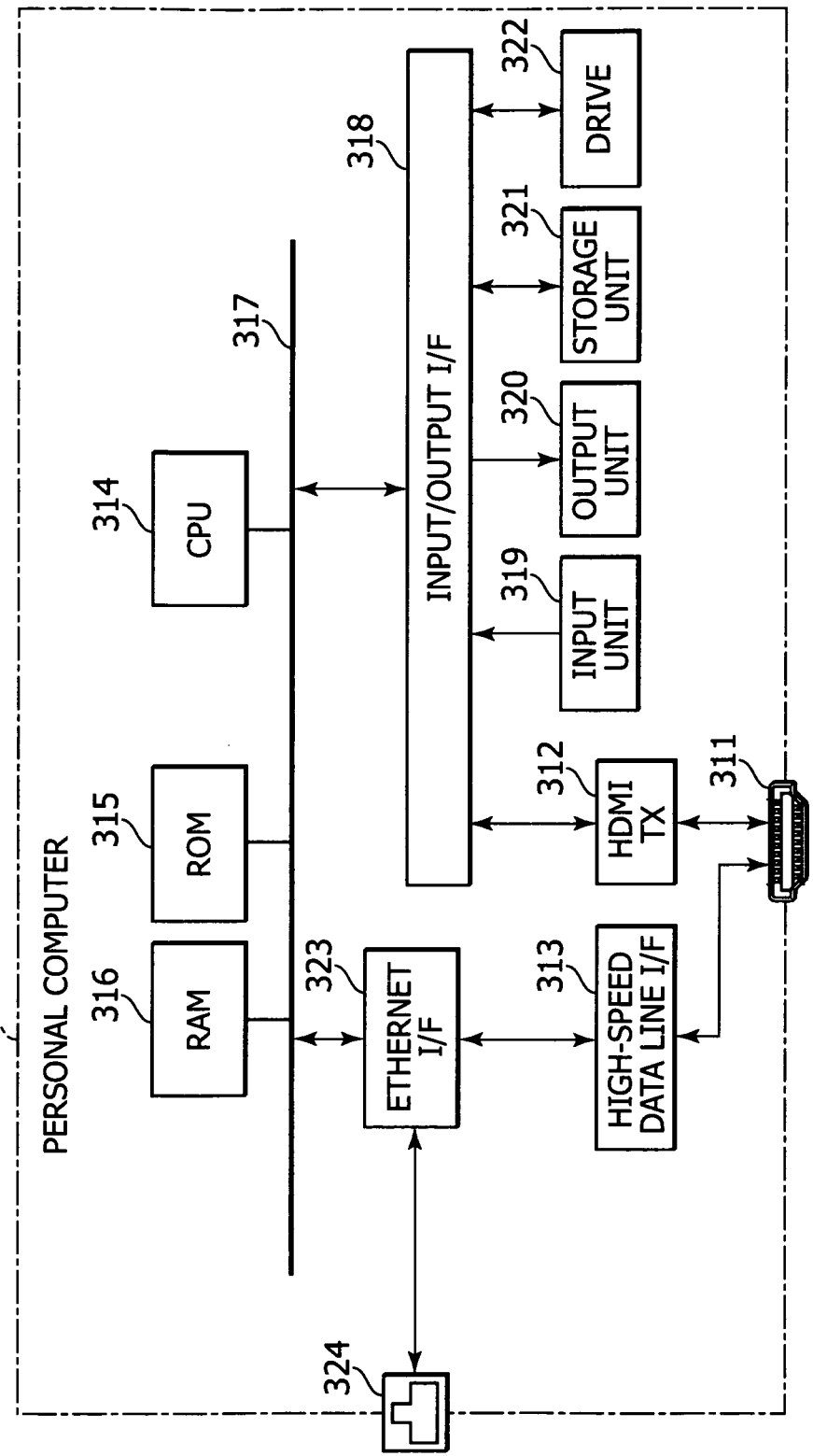
FIG. 20 is a block diagram showing a configuration example of a personal computer (source apparatus) constituting the AV system.

FIG. 20 shows a configuration example of the personal computer 310.

The personal computer 310 includes: an HDMI terminal 311; an HDMI transmitting unit 312; a high-speed data line interface 313; a CPU (Central Processing Unit) 314; a ROM (Read Only Memory) 315; a RAM (Random Access Memory) 316; a bus 317; an input/output interface 318; an input unit 319; an output unit 320; a storage unit 321; a drive 322; an Ethernet interface (Ethernet I/F) 323; and a network terminal 324.

In the personal computer 310, the CPU 314, the ROM 315, and the RAM 316 are connected to each other by the bus 317. The bus 317 is further connected with the input/output interface 318. The input/output interface 318 is connected with the input unit 319, the output unit 320, the storage unit 321, the drive 322, and the HDMI transmitting unit (HDMI TX) 312. The HDMI transmitting unit 312 is configured similarly to the HDMI transmitting unit 212 of the video camera recorder 210 shown in FIG. 2 (see FIG. 5).

The input unit 319 is configured by a keyboard, a mouse, a microphone, etc. The output unit 320 is configured by a display, a speaker, etc. The storage unit 321 is configured by an HDD (Hard Disk Drive), a non-volatile memory, etc. The drive 322 drives a removable medium such as a magnetic disk, an optical disc, a magneto-optical disc, a memory card, etc.

The bus 317 is further connected with the Ethernet interface 323. The Ethernet interface 323 is connected with the network terminal 324 and the high-speed data line interface 313. The high-speed data line interface 313 is an interface of a bi-directional communication path, configured by predetermined lines (in this embodiment, the reserve line and the HPD line) of the HDMI cable 351. The high-speed data line interface 313 is configured similarly to the high-speed data line interface 213 of the video camera recorder 210 shown in FIG. 2 (see FIG. 9).

In the personal computer 310 configured as shown in FIG. 20, for example, the CPU 314 loads a program stored in the storage unit 321 into the RAM 316 via the input/output interface 318 and the bus 317, and executes the program.

In the AV system 100A shown in FIG. 18 and FIG. 19, when the input switching into the personal computer 310 is performed by the television receiver 250, the image based on the video data (video signal) outputted from the personal computer 310 is displayed on the display panel 261 of the television receiver 250.

Figure 21A:
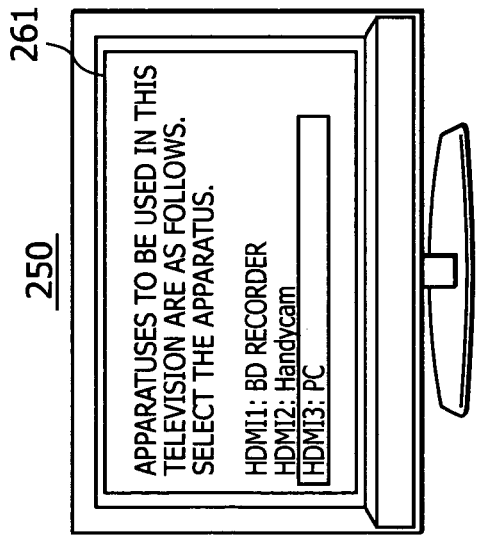
FIGS. 21A, 21B, 21C, and 21D are diagrams each showing a display example of a television receiver.

For example, when the user selects the personal computer (PC) by the remote control transmitter 277 in a state of a display as shown in FIG. 21A on the display panel 261 of the television receiver 250, the input switching into the personal computer 310 is performed. In an example in FIG. 21A, the HDMI 1 is connected with a BD recorder, the HDMI 2 is connected with a Handycam, i.e., a digital video camera, and the HDMI terminal 3 is connected with a personal computer (PC), thereby encouraging the user to perform the input selection (apparatus selection).

Figure 21B:
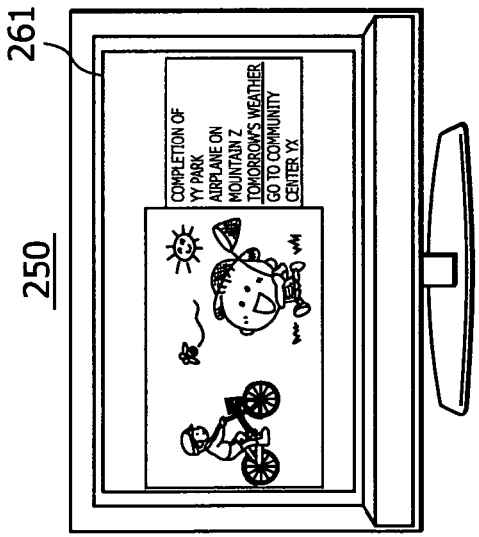

Further, for example, in a state that on the display panel 261 of the television receiver 250, as shown in FIG. 21B, together with a video from television broadcast, a widget by a Web browser provided in the television receiver 250 is displayed, when the user performs an item selection operation of the widget, the input switching into the personal computer 310 is performed.

Figure 21C:
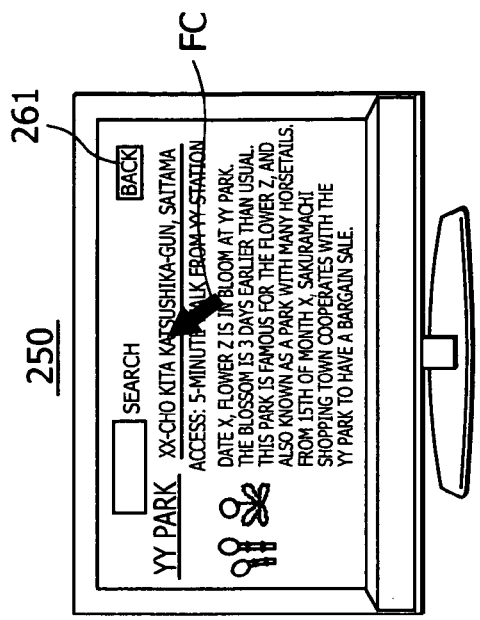

FIG. 21C shows a display example of the display panel 261 of the television receiver 250 after the input switching into the personal computer 310 is performed. In this case, on the display panel 261, the same screen (PC screen) as that displayed on the display panel of the personal computer 310 is displayed.

Figure 21D:
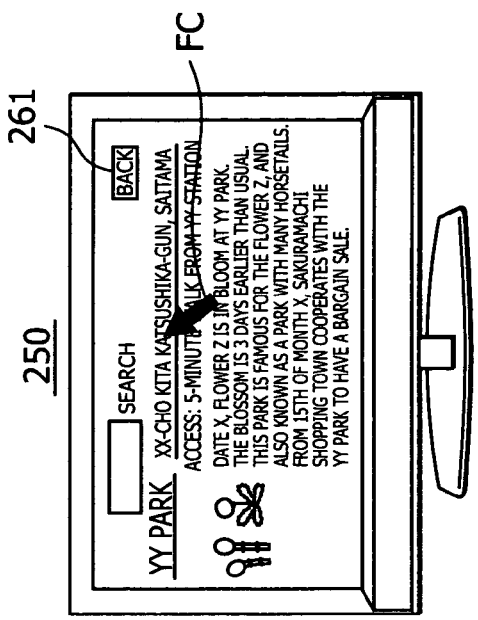

On this screen, the free cursor FC is displayed. This free cursor FC is displayed by a cursor display function in the personal computer 310. Therefore, in the AV system 100A shown in FIG. 18 and FIG. 19, there is no need of providing the cursor display function on a side of the television receiver 250. When the personal computer 310 is selected by the input selection of the television receiver 250, coordination in which by a setting of the personal computer 310, the free cursor FC is displayed largely toward a direction of the television receiver 250 may be performed. FIG. 21D is an example in which the free cursor FC is displayed in an enlarged manner.

In a state that the PC screen is thus displayed on the display panel 261 of the television receiver 250, and when the user performs the operation for moving the cursor position and the click operation by the remote control transmitter 277, the operational information of the user is transmitted to the video camera recorder 210 via the bi-directional communication path configured by the reserve line and the HPD line of the HDMI cable 351.

In the personal computer 310, on the basis of the operational information received by the high-speed data line interface 313, the control is performed by the CPU 314. That is, when the operational information of the cursor moving is received, the moving of the free cursor FC is performed. When the click operational information is received, a predetermined operation control is performed, assuming that the click operation is performed at a position of the free cursor FC at that time.

Thus, in the AV system 100A shown in FIG. 18 and FIG. 19, the same screen (PC screen) as that displayed on the display panel on the personal computer 310 is displayed on the display panel 261 of the television receiver 250. Further, on the display screen, the free cursor FC is displayed by the cursor display function of the personal computer 310.

The user may be able to perform the cursor moving operation, the click operation, etc., by the remote control transmitter 277, and the operational information is transmitted from the television receiver 250 to the personal computer 310. In the personal computer 310, on the basis of the operational information transmitted from the television receiver 250, a control as in the case of the user performing the cursor moving operation, the click operation, etc., by using a mouse, for example, on a side of the personal computer 310, is performed.

Therefore, in the AV system 100A shown in FIG. 18 and FIG. 19, by the operation on the display screen of the display panel 261 of the television receiver 250, the operation of the personal computer 310 may be controlled favorably. That is, the user can use the remote control transmitter 277 of the accustomed television receiver 250 to easily perform an operation in the personal computer 310, for example a Web browsing, while viewing the image displayed on the display panel 261 of the television receiver 250.

The embodiments described above show a case where the transmission of the operational information from the television receiver 250 to the video camera recorder 210 or the personal computer 310 is performed by using the bi-directional communication path (high-speed data line) configured by the predetermined lines (for example, the reserve line and the HPD line) of the HDMI cable 351. However, the embodiment is not restricted thereto. The transmission of the operational information may be performed via the CEC line which is a control data line constituting the HDMI cable 351, or via Ethernet from a network terminal, for example.

Further, in the embodiments described above, there is shown the bi-directional communication path that is configured by the reserve line (Ether−line) and the HPD line (Ether+ line) of the HDMI cable. However, the configuration of the bi-directional communication path is not restricted thereto. Hereinafter, another configuration example is described. In the example below, a description is made such that the video camera recorder 210 is a source apparatus and the television receiver 250 is a sink apparatus.

Figure 22:
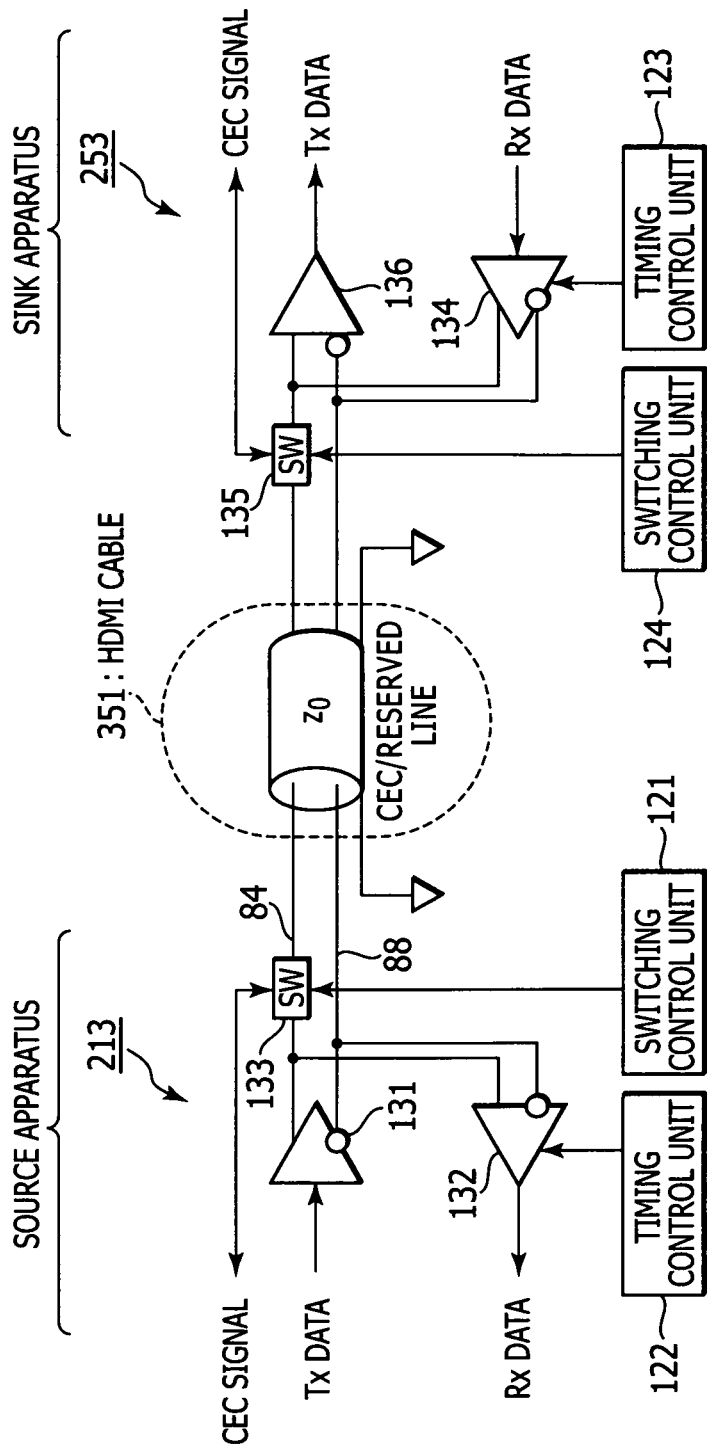
FIG. 22 is a connection diagram showing another configuration example of a high-speed data line interface between a video camera recorder and a television receiver.

FIG. 22 shows an example in which the CEC line 84 and the reserve line 88 are used to perform an IP communication according to a half duplex communication mode. Portions in FIG. 22 corresponding to those in FIG. 5 are assigned with the same numerals, and the description is omitted, where appropriate.

The high-speed data line interface 213 in the source apparatus includes: a converting unit 131; a decoding unit 132; a switch 133; a switching control unit 121; and a timing control unit 122. The converting unit 131 is supplied with Tx data, i.e., data transmitted from the source apparatus to the sink apparatus, by a two-way IP communication between the source apparatus and the sink apparatus.

The converting unit 131 is configured by a differential amplifier, for example, and converts the supplied Tx data into a differential signal composed of two partial signals. The converting unit 131 transmits the differential signal obtained by the conversion to the sink apparatus via the CEC line 84 and the reserve line 88. That is, the converting unit 131 supplies one partial signal constituting the differential signal obtained by the conversion to the switch 133 via the CEC line 84, more specifically, a signal line provided in the source apparatus, the signal line being connected to the CEC line 84 of the HDMI cable 351, and supplies the other partial signal constituting the differential signal to the sink apparatus via the reserve line 88, more specifically, a signal line provided in the source apparatus, the signal line being connected to the reserve line 88 of the HDMI cable 351, and the reserve line 88.

The decoding unit 132 is configured by a differential amplifier, for example, and input terminals of the decoding unit 132 are connected to the CEC line 84 and the reserve line 88. On the basis of control of the timing control unit 122, the decoding unit 132 receives the differential signal transmitted from the sink apparatus via the CEC line 84 and the reserve line 88, i.e., the differential signal composed of the partial signal on the CEC line 84 and the partial signal on the reserve line 88, decodes the received differential signal into Rx data which is the original data, and outputs the resultant data. Herein, the Rx data is data transmitted from the sink apparatus to the source apparatus by the two-way IP communication between the source apparatus and the sink apparatus.

At a timing of data transmission, the switch 133 is supplied with a CEC signal from the control unit (CPU) of the source apparatus or the partial signal constituting the differential signal corresponding to the TX data from the converting unit 131, and at a timing of data reception, the switch 133 is supplied with a CEC signal from the sink apparatus or the partial signal constituting the differential signal corresponding to the Rx data from the sink apparatus. On the basis of control from the switching control unit 121, the switch 133 selects either the CEC signal from the control unit (CPU) or the CEC signal from the sink apparatus, or the partial signal constituting the differential signal corresponding to the Tx data or the partial signal constituting the differential signal corresponding to the Rx data, and outputs the selected signal.

That is, at a timing at which the source apparatus transmits the data to the sink apparatus, the switch 133 selects either the CEC signal supplied from the control unit (CPU) or the partial signal supplied from the converting unit 131. The switch 133 transmits either the selected CEC signal or the partial signal to the sink apparatus via the CEC line 84.

At a timing at which the source apparatus receives the data transmitted from the sink apparatus, the switch 133 receives either the CEC signal transmitted from the sink apparatus via the CEC line 84 or the partial signal of the differential signal corresponding to the Rx data, and supplies either the received CEC signal or the partial signal, to either the control unit (CPU) or the decoding unit 132.

The switching control unit 121 controls the switch 133 so that any one of the signals supplied to the switch 133 is selected. The timing control unit 122 controls the timing of reception of the differential signal by the decoding unit 132.

The high-speed data line interface 253 in the sink apparatus includes: a converting unit 134; a decoding unit 136; a switch 135; a switching control unit 124; and a timing control unit 123. The converting unit 134 is configured by a differential amplifier, for example, and the converting unit 134 is supplied with the Rx data. On the basis of control of the timing control unit 123, the converting unit 134 converts the supplied Rx data into a differential signal composed of two partial signals, and transmits the differential signal obtained by the conversion to the source apparatus via the CEC line 84 and the reserve line 88.

That is, the converting unit 134 supplies one partial signal constituting the differential signal obtained by the conversion to the switch 135 via the CEC line 84, more specifically, a signal line provided in the sink apparatus, the signal line being connected to the CEC line 84 of the HDMI cable 351, and supplies the other partial signal constituting the differential signal to the source apparatus via the reserve line 88, more specifically, a signal line provided in the sink apparatus, the signal line being connected to the reserve line 88 of the HDMI cable 351, and the reserve line 88.

At a timing of data reception, the switch 135 is supplied with either a CEC signal from the source apparatus or the partial signal constituting the differential signal corresponding to the TX data from the source apparatus, and at a timing of data transmission, the switch 135 is supplied with either the partial signal constituting the differential signal corresponding to the Rx data from the converting unit 134 or a CEC signal from the control unit (CPU) of the sink apparatus. On the basis of control from the switching control unit 124, the switch 135 selects either the CEC signal from the source apparatus or the CEC signal from the control unit (CPU), or the partial signal constituting the differential signal corresponding to the Tx data or the partial signal constituting the differential signal corresponding to the Rx data, and outputs the selected signal.

That is, at a timing at which the sink apparatus transmits the data to the source apparatus, the switch 135 selects either the CEC signal supplied from the control unit (CPU) of the sink apparatus or the partial signal supplied from the converting unit 134, and transmits either the selected CEC signal or the partial signal to the source apparatus via the CEC line 84.

At a timing at which the sink apparatus receives the data transmitted from the source apparatus, the switch 135 receives either the CEC signal transmitted from the source apparatus via the CEC line 84 or the partial signal of the differential signal corresponding to the Tx data, and supplies either the received CEC signal or partial signal to either the control unit (CPU) or the decoding unit 136.

The decoding unit 136 is configured by a differential amplifier, for example, and input terminals of the decoding unit 136 are connected to the CEC line 84 and the reserve line 88. The decoding unit 136 receives the differential signal transmitted from the source apparatus via the CEC line 84 and the reserve line 88, i.e., the differential signal composed of the partial signal on the CEC line 84 and the partial signal on the reserve line 88, decodes the received differential signal into the Tx data which is the original data, and outputs the resultant data.

The switching control unit 124 controls the switch 135 so that any one of the signals supplied to the switch 135 is selected. The timing control unit 123 controls a transmitting timing of the differential signal by the converting unit 134.

Figure 23:
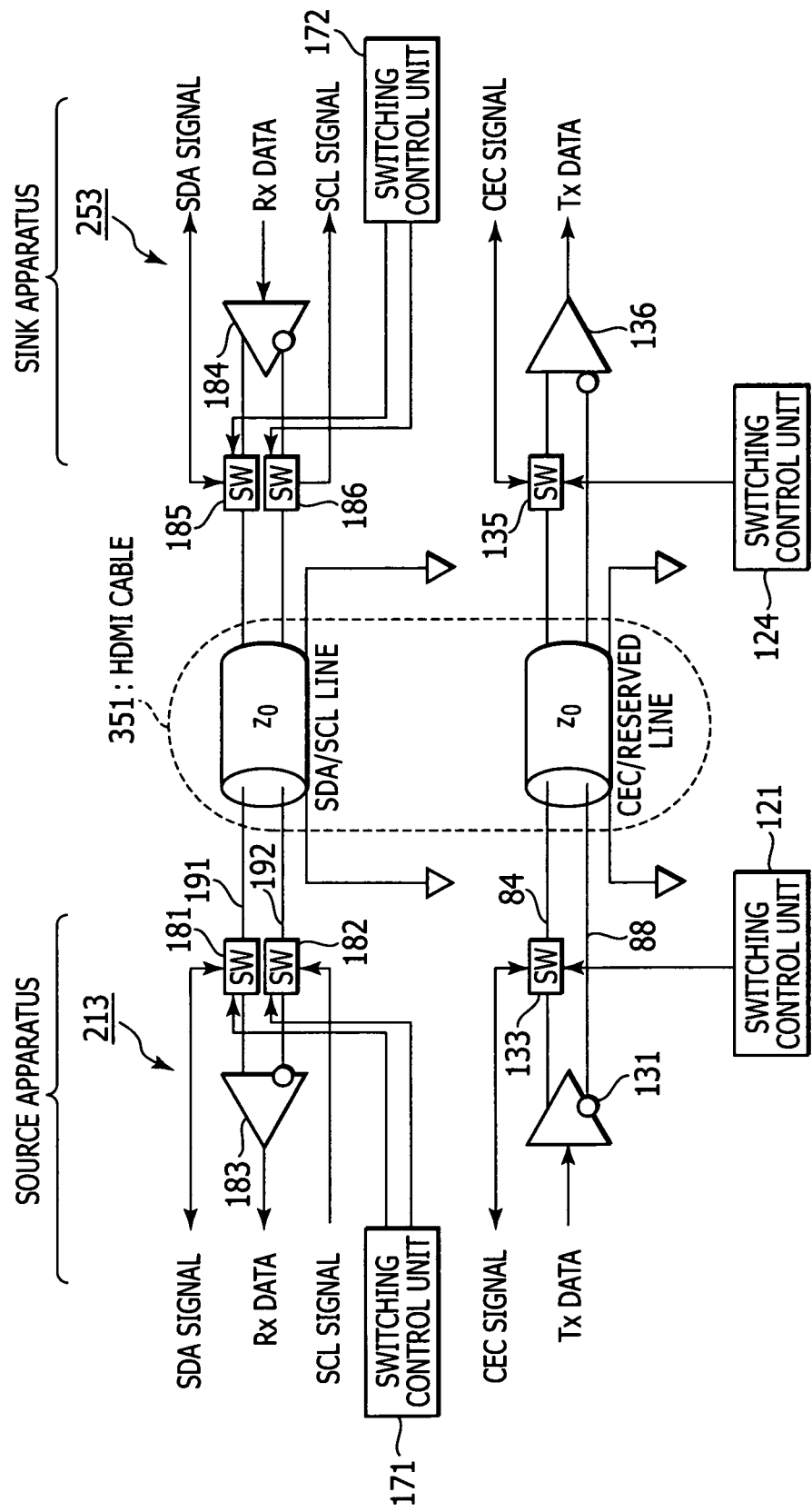
FIG. 23 is a connection diagram showing still another configuration example of a high-speed data line interface between a video camera recorder and a television receiver.

FIG. 23 is an example in which the CEC line 84 and the reserve line 88, together with a signal line through which an SDA signal is transmitted (SDA line) and a signal line through which an SCL signal is transmitted (SCL line), are used to perform an IP communication according to a full duplex communication mode. Portions in FIG. 23 corresponding to those in FIG. 22 are assigned with the same numerals, and the description is omitted, where appropriate.

The high-speed data line interface 213 of the source apparatus includes: the converting unit 131; the switch 133; a switch 181; a switch 182; a decoding unit 183; the switching control unit 121; and a switching control unit 171.

At a timing of data transmission, the switch 181 is supplied with the SDA signal from the control unit (CPU) of the source apparatus, and at a timing of data reception, the switch 181 is supplied with either the SDA signal from the sink apparatus or the partial signal constituting the differential signal corresponding to the Rx data from the sink apparatus. On the basis of control from the switching control unit 171, the switch 181 selects either the SDA signal from the control unit (CPU) or the SDA signal from the sink apparatus, or the partial signal constituting the differential signal corresponding to the Rx data, and outputs the selected signal.

That is, at a timing at which the source apparatus receives the data transmitted from the sink apparatus, the switch 181 receives either the SDA signal transmitted from the sink apparatus via the SDA line 191 which is the signal line through which the SDA signal is transmitted, or the partial signal of the differential signal corresponding to the Rx data, and supplies either the received SDA signal or the partial signal to either the control unit (CPU) or the decoding unit 183.

At a timing at which the source apparatus transmits the data to the sink apparatus, the switch 181 transmits the SDA signal supplied from the control unit (CPU) to the sink apparatus via the SDA line 191 or transmits no signal to the sink apparatus.

At a timing of data transmission, the switch 182 is supplied with the SCL signal from the control unit (CPU) of the source apparatus. At a timing of data reception, the switch 182 is supplied with the partial signal constituting the differential signal corresponding to the Rx data from the sink apparatus. On the basis of control from the switching control unit 171, the switch 182 selects either the SCL signal or the partial signal constituting the differential signal corresponding to the Rx data, and outputs the selected signal.

That is, at a timing at which the source apparatus receives the data transmitted from the sink apparatus, the switch 182 receives the partial signal of the differential signal which is transmitted from the sink apparatus via the SCL line 192 or signal line through which the SCL signal is transmitted and which corresponds to the Rx data, and supplies the receives the partial signal to the decoding unit 183. Alternatively, the switch 182 receives no signal.

At a timing at which the source apparatus transmits the data to the sink apparatus, the switch 182 transmits to the sink apparatus via the SCL line 192 the SCL signal supplied from the control unit (CPU) of the source apparatus, or transmits no signal to the sink apparatus.

The decoding unit 183 is configured by a differential amplifier, for example, and input terminals of the decoding unit 183 are connected to the SDA line 191 and the SCL line 192. The decoding unit 183 receives the differential signal transmitted from the sink apparatus via the SDA line 191 and the SCL line 192, i.e., the differential signal composed of the partial signal on the SDA line 191 and the partial signal on the SCL line 192, decodes the received differential signal into Rx data which is the original data, and outputs the resultant data.

The switching control unit 171 controls the switch 181 and the switch 182 so that in each of the switch 181 and the switch 182, any one of the supplied signals is selected.

The high-speed data line interface 253 constituting the sink apparatus includes: a converting unit 184; the switch 135; a switch 185; a switch 186; the decoding unit 136; a switching control unit 172; and the switching control unit 124.

The converting unit 184 is configured by a differential amplifier, for example, and the converting unit 184 is supplied with the Rx data. The converting unit 184 converts the supplied Rx data into a differential signal composed of two partial signals, and transmits the differential signal obtained by the conversion to the source apparatus via the SDA line 191 and the SCL line 192. That is, the converting unit 184 transmits one partial signal constituting the differential signal obtained by the conversion to the source apparatus via the switch 185, and transmits the other partial signal constituting the differential signal to the source apparatus via the switch 186.

At a timing of data transmission, the switch 185 is supplied with either the partial signal constituting the differential signal corresponding to Rx data from the converting unit 184 or the SDA signal from the control unit (CPU) of the sink apparatus, and at a timing of data reception, the switch 185 is supplied with the SDA signal from the source apparatus. On the basis of control from the switching control unit 172, the switch 185 selects either the SDA signal from the control unit (CPU) or the SDA signal from the source apparatus, or the partial signal constituting the differential signal corresponding to the Rx data, and outputs the selected signal.

That is, at a timing at which the sink apparatus receives the data transmitted from the source apparatus, the switch 185 receives the SDA signal transmitted from the source apparatus via the SDA line 191, and supplies the received SDA signal to the control unit (CPU). Alternatively, the switch 185 receives no signal.

At a timing at which the sink apparatus transmits the data to the source apparatus, the switch 185 transmits either the SDA signal supplied from the control unit (CPU) or the partial signal supplied from the converting unit 184 to the source apparatus via the SDA line 191.

At a timing of data transmission, the switch 186 is supplied with the partial signal, from the converting unit 184, constituting the differential signal corresponding to the Rx data, and at a timing of data reception, the switch 186 is supplied with the SCL signal from the source apparatus. On the basis of control from the switching control unit 172, the switch 186 selects any one of the partial signal constituting the differential signal corresponding to Rx data and the SCL signal, and outputs the selected signal.

That is, at a timing at which the sink apparatus receives the data transmitted from the source apparatus, the switch 186 receives the SCL signal transmitted from the source apparatus via the SCL line 192, and supplies the received SCL signal to the control unit (CPU). Alternatively, the switch 182 receives no signal.

At a timing at which the sink apparatus transmits the data to the source apparatus, the switch 186 transmits to the source apparatus via the SCL line 192 the partial signal supplied from the converting unit 184. Alternatively, the switch 186 transmits no signal.

The switching control unit 172 controls the switch 185 and the switch 186 so that in each of the switch 185 and the switch 186, any one of the supplied signals is selected.

When the source apparatus and the sink apparatus perform the IP communication, whether the half duplex communication is possible or whether the full duplex communication is possible is determined by the respective configurations of the source apparatus and the sink apparatus. Therefore, the source apparatus determines whether to perform either the half duplex communication or the full duplex communication by referring to the E-EDID received from the sink apparatus, or the bi-directional communication based on the transmission/reception of the CEC signal.

Figure 24:
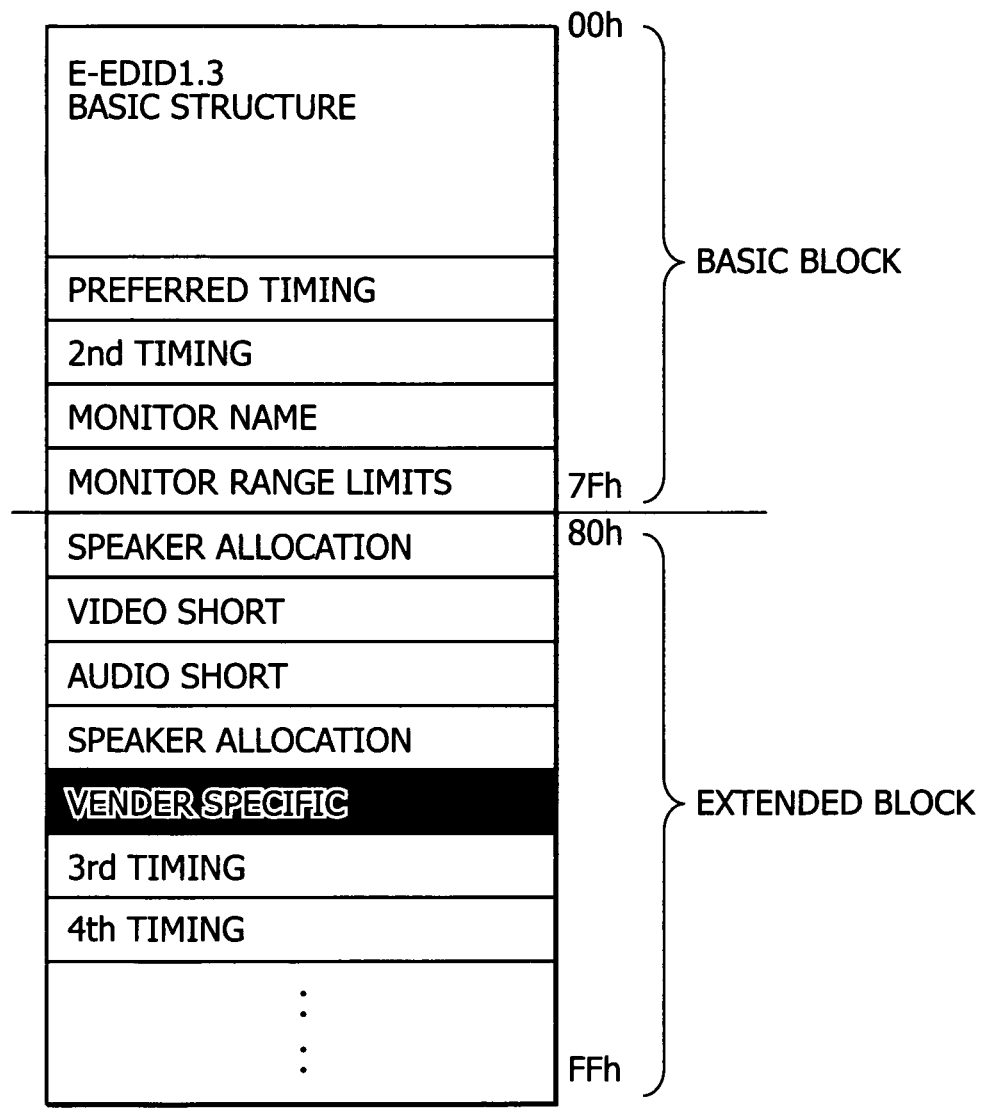
FIG. 24 is a diagram showing a structure of E-EDID received by the source apparatus.

The E-EDID that the source apparatus receives is formed of a basic block and an extended block, as shown in FIG. 24, for example.

At a head of the basic block of the E-EDID, data which is represented by "E-EDID 1.3 Basic Structure" and which is defined by an E-EDID 1.3 standard is placed. In continuation, timing information for keeping compatibility with an existing EDID, represented by "Preferred timing"; and timing information, different from "Preferred timing", for keeping compatibility with the existing EDID, represented by "2nd timing", are placed.

In the basic block, following "2nd timing", information that is represented by "Monitor NAME" and indicates a name of the display device, and information, represented by "Monitor Range Limits", indicating a displayable pixel number about a case where aspect ratios are 4:3 and 16:9 are placed in order.

On the other hand, at a head of the extended block, information, represented by "Speaker Allocation", about right and left speakers is placed. Thereafter, data, represented by "VIDEO SHORT", in which a displayable image size, a frame rate, information indicating whether interlace or progressive, information about an aspect ratio, etc., are written; data, represented by "AUDIO SHORT", in which information on a reproducible audio codec system, a sampling frequency, a cut-off bandwidth, a codec bit number, etc., is written; and information, represented by "Speaker Allocation" about right and left speakers are placed in order.

In the extended block, following "Speaker Allocation", data, represented by "Vendor Specific", defined uniquely for each manufacturer; timing information, represented by "3rd timing", for keeping compatibility with an existing EDID; and timing information, represented by "4th timing", for keeping compatibility with an existing EDID are placed.

The data represented by "Vendor Specific" has a data structure shown in FIG. 25. That is, in the data represented by "Vendor Specific", a 0-th block to an N-th block, each of which is a 1-byte block, are arranged.

In the 0-th block placed at a head of the data represented by "Vendor Specific", a header, represented by "Vendor-Specific tag code (=3)", indicating a data region of the data "Vendor Specific", and information, represented by "Length (=N)", indicating a length of the data "Vendor Specific" are placed.

In the first block to the third block, information, represented by "24-bit IEEE Registration Identifier (0x000C03) LSB first", indicating a number "0x000C03" registered for HDMI (R) is placed. In the fourth block and the fifth block, information, each of which is represented by "A", "B", "C", and "D", indicating physical addresses of a 24-bit sink apparatus are placed.

In the sixth block, a flag, represented by "Supports-AI", indicating a function with which the sink apparatus is compatible; pieces of information, each of which is represented by each of "DC-48 bit", "DC-36 bit", and "DC-30 bit", designating a bit number per each pixel; a flag, represented by "DC-Y444", indicating whether the sink apparatus is compatible with a transport of an image of YCbCr 4:4:4; and a flag, represented by "DVI-Dual", indicating whether the sink apparatus is compatible with a dual DVI (Digital Visual Interface) are placed.

In the seventh block, information, represented by "Max-TMDS-Clock", indicating a maximum frequency of the pixel clock of TMDS is placed. In the eighth block, a flag, represented by "Latency", indicating presence or absence of delay information of the video and the audio; a full duplex flag, represented by "Full Duplex" indicating whether the full duplex communication is possible; and a half duplex communication flag, represented by "Half Duplex", indicating whether the half duplex communication is possible are placed.

Herein, for example, the set full duplex flag (for example, which is set to "1") indicates that the sink apparatus has a function of performing the full duplex communication, i.e., the sink apparatus is configured as shown in FIG. 23, and the reset full duplex flag (for example, which is set to "0") indicates that the sink apparatus does not have a function of performing the full duplex communication.

Similarly, the set half duplex flag (for example, which is set to "1") indicates that the sink apparatus has a function of performing the half duplex communication, i.e., the sink apparatus is configured as shown in FIG. 22, and the reset half duplex flag (for example, which is set to "0") indicates that the sink apparatus does not have a function of performing the half duplex communication.

In the ninth block of the data represented by "Vendor Specific", delay time data of a progressive video, represented by "Video Latency", is placed. In the tenth block, delay time data of the audio accompanying the progressive video, represented by "Audio Latency", is placed. In the 11th block, delay time data of the interlaced video, represented by "Interlaced Video Latency", is placed. In the 12th block, delay time data of the audio accompanying the interlaced video, represented by "Interlaced Audio Latency" is placed.

The source apparatus determines whether to perform either the half duplex communication or the full duplex communication on the basis of the full duplex flag and the half duplex flag included in the E-EDID received from the sink apparatus, or the bi-directional communication based on the transmission/reception of the CEC signals, and according to the determination result, the source apparatus performs the two-way communication with the sink apparatus.

For example, when the source apparatus is configured as shown in FIG. 22, the source apparatus is able to perform the half duplex communication with the sink apparatus shown in FIG. 22 but is not able to perform the half duplex communication with the sink apparatus shown in FIG. 23. Therefore, the source apparatus starts a communication processing when a power supply of the source apparatus is turned on, and performs the two-way communication corresponding to the function provided in the sink apparatus connected to the source apparatus.

Figure 26:
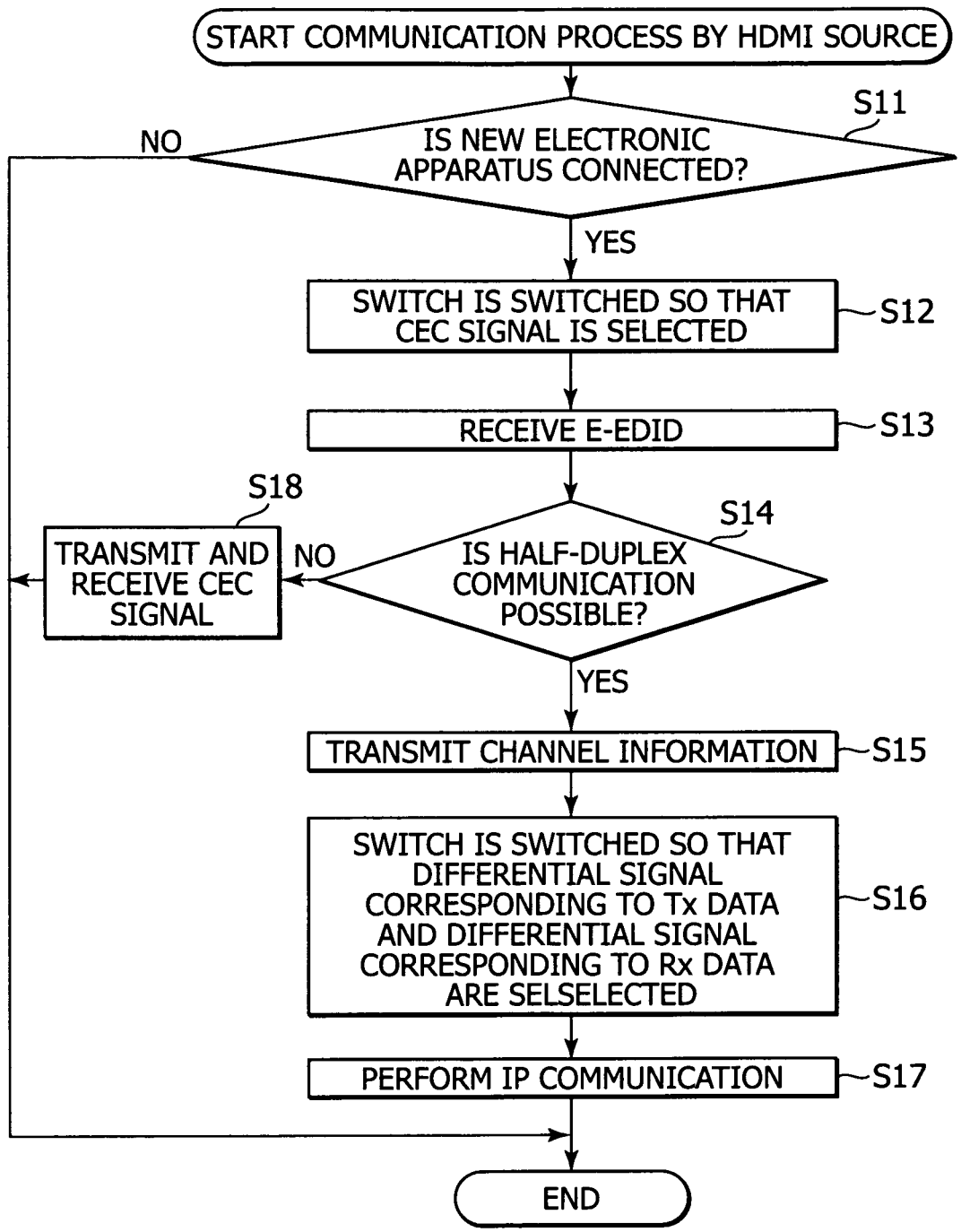
FIG. 26 is a flowchart for describing a communication process by the source apparatus.

Hereinafter, with reference to a flowchart in FIG. 26, the communication processing by the source apparatus shown in FIG. 22 is described.

In step S11, the source apparatus determines whether a new electronic apparatus is connected to the source apparatus. For example, on the basis of a magnitude of voltage added to a pin called a "Hot Plug Detect" connected with the HPD line 86, the source apparatus determines whether the new electronic apparatus (sink apparatus) is connected.

In step S11, when it is determined that the new electronic apparatus is not connected, no communication is performed, and thus the communication processing is ended. On the other hand, when it is determined in step S11 that the new electronic apparatus is connected, the switching control unit 121 controls the switch 133 in step S12 so that the CEC signal from the control unit (CPU) of the source apparatus is selected at a timing of data transmission and the CEC signal from the sink apparatus is selected at a timing of data reception.

In step S13, the source apparatus receives the E-EDID transmitted from the sink apparatus via the DDC 83. That is, upon detection of the connection of the source apparatus, the sink apparatus reads out the E-EDID from EDIDROM 85 and transmits the read E-EDID to the source apparatus via the DDC 83, and thus the source apparatus receives the E-EDID transmitted from the sink apparatus.

In step S14, the source apparatus determines whether the half duplex communication is possible with the sink apparatus. That is, the source apparatus refers to the E-EDID received from the sink apparatus to determine whether the half duplex flag "HalfDuplex" in FIG. 25 is set. When the half duplex flag is set, for example, the source apparatus determines that the two-way IP communication according to the half duplex communication mode, i.e., the half duplex communication communication, is possible.

When it is determined in the step S14 that the half duplex communication is possible, the source apparatus transmits in step S15, as channel information indicating a channel used for the two-way communication, a signal indicating that the IP communication according to the half duplex communication mode using the CEC line 84 and the reserve line 88 is performed, to the sink apparatus via the switch 133 and the CEC line 84.

That is, when the half duplex flag is set, the source apparatus is able to recognize that the sink apparatus is configured as shown in FIG. 22 and the half duplex communication using the CEC line 84 and the reserve line 88 is possible, and thus the source apparatus transmits the channel information to the sink apparatus to notify that the half duplex communication is performed.

In step S16, the switching control unit 121 controls the switch 133 so that the differential signal corresponding to the Tx data from the converting unit 131 is selected at the time of data transmission and the differential signal corresponding to the Rx data from the sink apparatus is selected at the time of data reception.

In step S17, each component of the source apparatus performs the two-way IP communication with the sink apparatus according to the half duplex communication mode, and thus the communication processing is ended. That is, at the time of data transmission, the converting unit 131 converts the Tx data supplied from the control unit (CPU) into the differential signal, supplies the switch 133 with one partial signal constituting the differential signal obtained by the conversion, and transmits the other partial signal to the sink apparatus via the reserve line 88. The switch 133 transmits the partial signal supplied from the converting unit 131 to the sink apparatus via the CEC line 84. Thus, the differential signal corresponding to the Tx data is transmitted from the source apparatus to the sink apparatus.

At the time of data reception, the decoding unit 132 receives the differential signal corresponding to the Rx data transmitted from the sink apparatus. That is, the switch 133 receives the partial signal of the differential signal which is transmitted from the sink apparatus via the CEC line 84 and which corresponds to the Rx data, and supplies the received partial signal to the decoding unit 132. The decoding unit 132 decodes, on the basis of the control of the timing control unit 122, the differential signal composed of the partial signal supplied from the switch 133 and the partial signal supplied from the sink apparatus via the reserve line 88 into the RX data which is the original data, and outputs the Rx data to the control unit (CPU).

Thus, the source apparatus transmits and receives various data such as the control data, the pixel data, and the audio data, to and from the sink apparatus.

In the step S14, when it is determined that the half duplex communication is not possible, the source apparatus transmits and receives the CEC signal in step S18 thereby to perform the two-way communication with the sink apparatus, and then, the communication process is ended.

That is, at the time of data transmission, the source apparatus transmits the CEC signal to the sink apparatus via the switch 133 and the CEC line 84, and at the time of data reception, the source apparatus receives the CEC signal transmitted from the sink apparatus via the switch 133 and the CEC line 84 to transmit and receive the control data to and from the sink apparatus.

In this way, the source apparatus refers to the half duplex flag to perform the half duplex communication by using the CEC line 84 and the reserve line 88, with the sink apparatus capable of performing the half duplex communication.

Thus, the switch 133 is switched to select the transmitted data and the received data, and thereby performing the half duplex communication by using the CEC line 84 and the reserve line 88, i.e., the IP communication according to the half duplex communication mode, with the sink apparatus. In this way, a high-speed bi-directional communication can be performed while maintaining compatibility with the existing HDMI.

As in the case of the source apparatus, when the power supply is turned on, the sink apparatus also starts the communication process to perform the two-way communication with the source apparatus.

Figure 27:
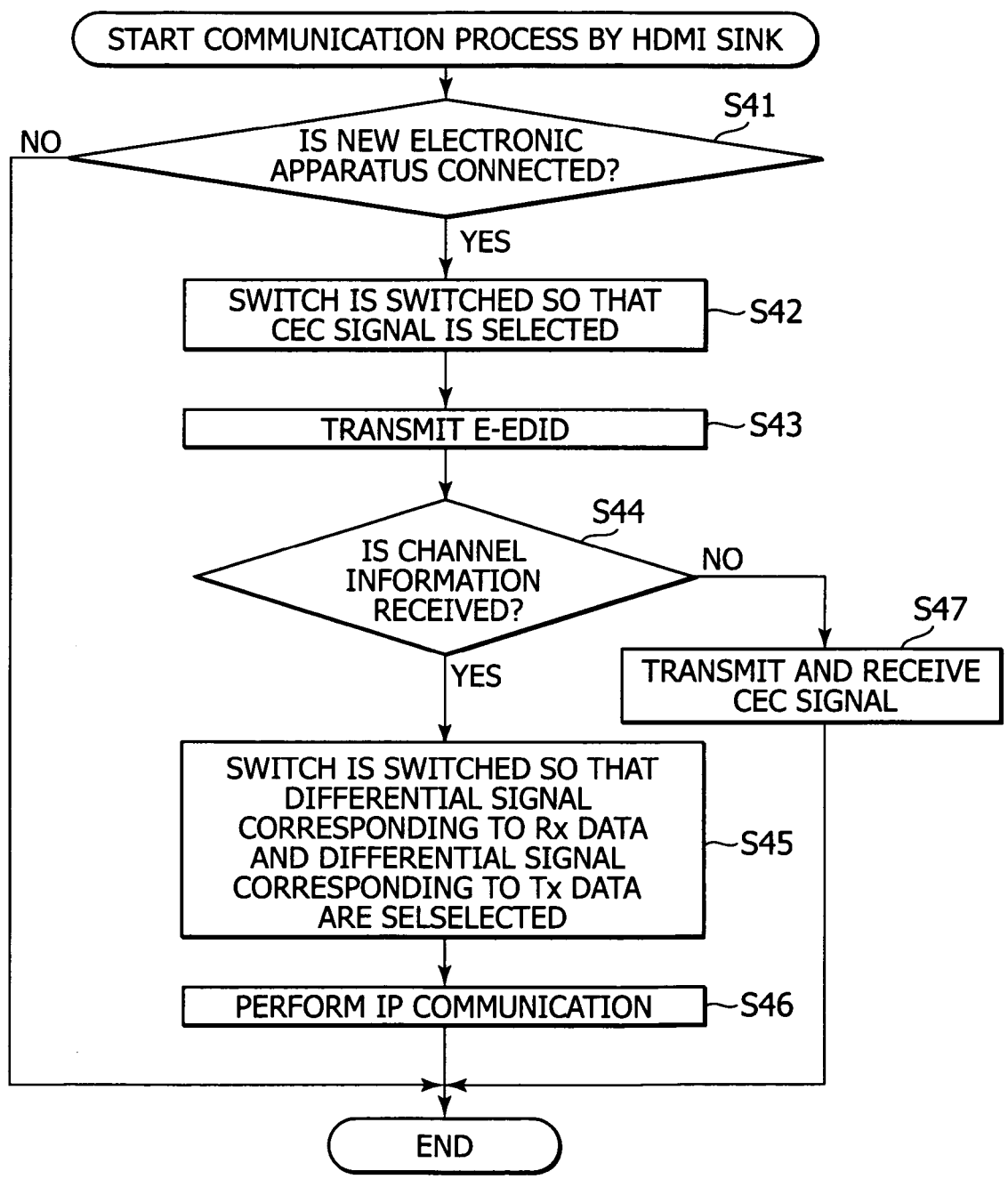
FIG. 27 is a flowchart for describing a communication process by the sink apparatus.

Hereinafter, with reference to a flowchart in FIG. 27, the communication processing by the sink apparatus shown in FIG. 22 is described.

In step S41, the sink apparatus determines whether the sink apparatus is connected with a new electronic apparatus (source apparatus). For example, the sink apparatus determines whether the new electronic apparatus is connected, on the basis of a magnitude of voltage added to a pin called a Hot Plug Detect connected with the HPD line 86.

In the step S41, when it is determined that the new electronic apparatus is not connected, no communication is performed, and thus the communication process is ended. On the other hand, when it is determined in the step S41 that the new electronic apparatus is connected, the switching control unit 124 controls the switch 135 in step S42 so that at the time of data transmission, the CEC signal from the control unit (CPU) of the sink apparatus is selected, and at the time of data reception, the CEC signal from the source apparatus is selected.

In step S43, the sink apparatus reads out the E-EDID from the EDIDROM 85, and transmits the read E-EDID to the source apparatus via the DDC 83.

In step S44, the sink apparatus determines whether the channel information transmitted from the source apparatus is received.

That is, from the source apparatus, the channel information indicating a channel of the two-way communication is transmitted according to a function provided in the source apparatus and the sink apparatus. For example, when the source apparatus is configured as shown in FIG. 22, the source apparatus and the sink apparatus are capable of performing the half duplex communication using the CEC line 84 and the reserve line 88. Accordingly, from the source apparatus to the sink apparatus, the channel information indicating that IP communication using the CEC line 84 and the reserve line 88 is performed is transmitted. As a result, the sink apparatus receives the channel information transmitted from the source apparatus via the switch 135 and the CEC line 84, and determines that the channel information is received.

On the other hand, when the source apparatus is not provided with the function of performing the half duplex communication, the channel information is not transmitted from the source apparatus to the sink apparatus, and thus the sink apparatus determines that the channel information is not received.

In the step S44, when it is determined that the channel information is received, the processing proceeds to step S45 in which the switching control unit 124 controls the switch 135. As a result, the switch 135 is switched so that at the time of data transmission, the differential signal corresponding to the Rx data from the converting unit 134 is selected, and at the time of data reception, the differential signal corresponding to the Tx data from the source apparatus is selected.

In step S46, the sink apparatus performs the two-way IP communication with the source apparatus according to the half duplex communication mode, and the communication processing is ended. That is, at the time of data transmission, the converting unit 134 converts the Rx data supplied from the control unit (CPU) of the sink apparatus into the differential signal, on the basis of the control of the timing control unit 123, supplies one partial signal constituting the differential signal obtained by the conversion to the switch 135, and transmits the other partial signal to the source apparatus via the reserve line 88. The switch 135 transmits the partial signal supplied from the converting unit 134 to the source apparatus via the CEC line 84. Thus, the differential signal corresponding to the Rx data is transmitted from the sink apparatus to the source apparatus.

At the time of data reception, the decoding unit 136 receives the differential signal which is transmitted from the source apparatus and which corresponds to Tx data. That is, the switch 135 receives the partial signal of the differential signal which is transmitted from the source apparatus via the CEC line 84 and which corresponds to the Tx data, and supplies the received partial signal to the decoding unit 136. The decoding unit 136 decodes the differential signal composed of the partial signal supplied from the switch 135 and the partial signal supplied from the source apparatus via the reserve line 88, into the TX data which is the original data, and outputs the Tx data to the control unit (CPU).

Thus, the sink apparatus transmits and receives various data such as the control data, the pixel data, and the audio data, to and from the source apparatus.

In step S44, when it is determined that the channel information is not received, the sink apparatus transmits and receives the CEC signal to perform the two-way communication with the source apparatus in step S47, and the communication processing is ended.

That is, at the time of data transmission, the sink apparatus transmits the CEC signal to the source apparatus via the switch 135 and the CEC line 84, and at the time of data reception, the sink apparatus receives the CEC signal transmitted from the source apparatus via the switch 135 and the CEC line 84 to transmit and receive the control data to and from the source apparatus.

In this way, upon receiving the channel information, the sink apparatus performs the half duplex communication with the sink apparatus by using the CEC line 84 and the reserve line 88.

Thus, when the sink apparatus switches the switch 135 to select the transmitted data and the received data, and thereby performing the half duplex communication using the CEC line 84 and the reserve line 88, with the source apparatus. As a result, a high-speed bi-directional communication can be performed while maintaining compatibility with the existing HDMI.

When the source apparatus is configured as shown in FIG. 23, the source apparatus determines in the communication processing on the basis of the full duplex flag included in the E-EDID whether the sink apparatus has the function of performing the full duplex communication, and performs a two-way communication corresponding to the determination result.

Figure 28:
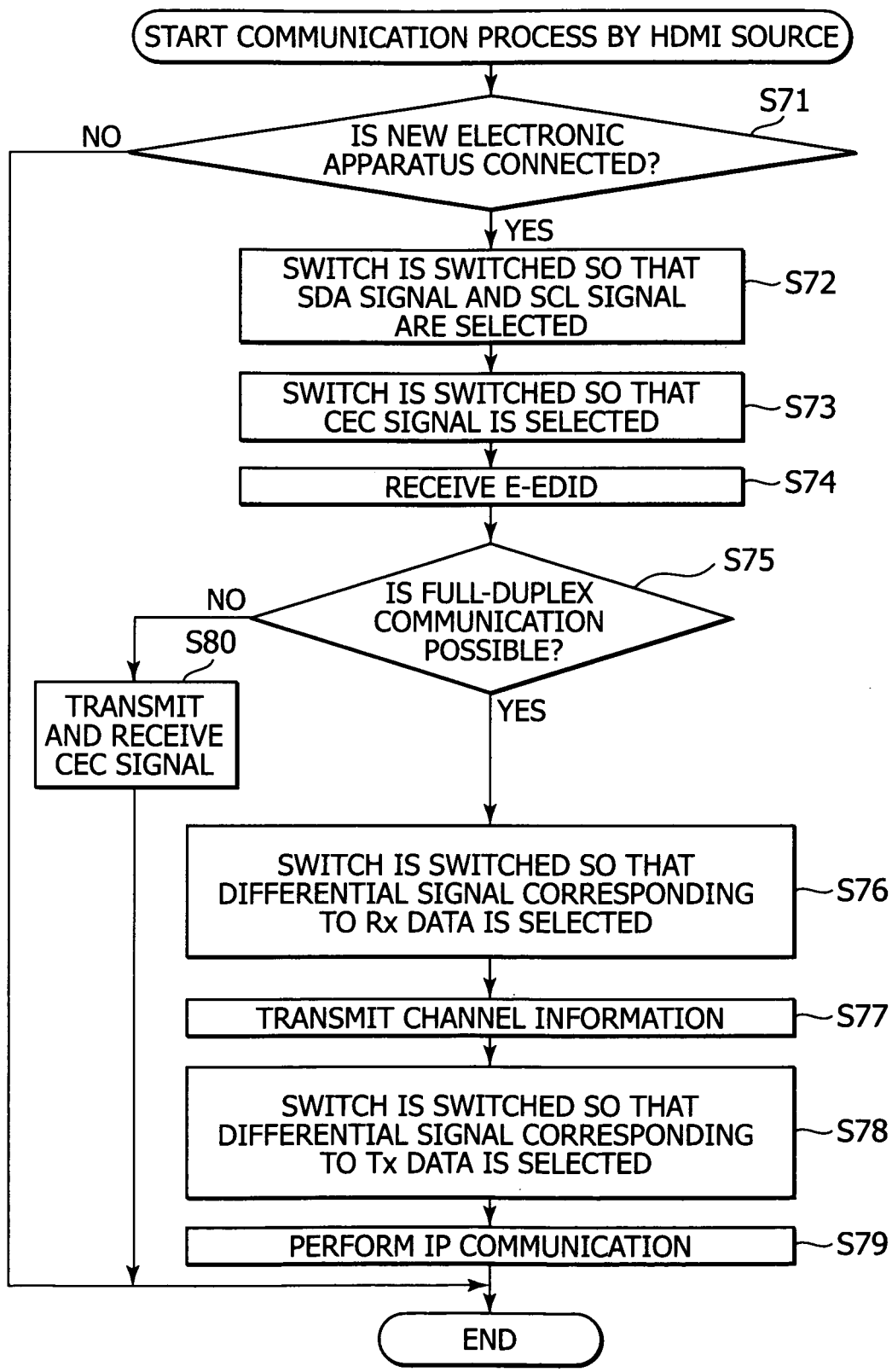
FIG. 28 is a flowchart for describing a communication process by the source apparatus.

Hereinafter, with reference to a flowchart in FIG. 28, the communication processing by the source apparatus shown in FIG. 23 is described.

In step S71, the source apparatus determines whether a new electronic apparatus is connected to the source apparatus. In step S71, when it is determined that the new electronic apparatus is not connected, no communication is performed, and thus the communication process is ended.

On the other hand, when it is determined in the step S71 that the new electronic apparatus is connected, the switching control unit 171 controls the switch 181 and the switch 182 in step S72 so that at the time of data transmission, the SDA signal from the control unit (CPU) of the source apparatus is selected by the switch 181 and the SCL signal from the control unit (CPU) of the source apparatus is selected by the switch 182, and at the time of data reception, the SDA signal from the sink apparatus is selected by the switch 181.

In step S73, the switching control unit 121 controls the switch 133 so that at the time of data transmission, the CEC signal from the control unit (CPU) of the source apparatus is selected, and at the time of data reception, the CEC signal from the sink apparatus is selected.

In step S74, the source apparatus receives the E-EDID transmitted from the sink apparatus via the SDA line 191 of the DDC 83. That is, upon detection of the connection of the source apparatus, the sink apparatus reads out the E-EDID from EDIDROM 85 and transmits the read E-EDID to the source apparatus via the SDA line 191 of the DDC 83, and thus the source apparatus receives the E-EDID transmitted from the sink apparatus.

In step S75, the source apparatus determines whether the full duplex communication with the sink apparatus is possible. That is, the source apparatus refers to the E-EDID received from the sink apparatus to determine whether the full duplex flag "Full Duplex" in FIG. 25 is set, and for example, when the full duplex flag is set, the source apparatus determines that the two-way IP communication according to the full duplex communication mode, i.e., the full duplex communication, is possible.

When it is determined in the step S75 that the full duplex is possible, the switching control unit 171 controls the switch 181 and the switch 182 in step S76 so that the differential signal corresponding to the Rx data from the sink apparatus is selected at the time of data reception.

That is, at the time of data reception, the switching control unit 171 switches the switch 181 and the switch 182 so that out of the partial signal constituting the differential signal which is transmitted from the sink apparatus and which corresponds to the Rx data, the partial signal transmitted via the SDA line 191 is selected by the switch 181 and the partial signal transmitted via the SCL line 192 is selected by the switch 182.

The SDA line 191 and the SCL line 192 constituting the DDC 83 are not utilized after the E-EDID is transmitted from the sink apparatus to the source apparatus, i.e., transmitting and receiving the SDA signal and the SCL signal via the SDA line 191 and the SCL line 192 is not performed. Thus, the switch 181 and the switch 182 are switched, and thereby, the SDA line 191 and the SCL line 192 can be utilized as a transmission path of the Rx data according to the full duplex communication.

In step S77, the source apparatus transmits a signal, as the channel information indicating the two-way communication path, indicating that the IP communication according to the full duplex mode by using the CEC line 84 and the reserve line 88, together with the SDA line 191 and the SCL line 192, is performed, to the sink apparatus via the switch 133 and the CEC line 84.

That is, when the full duplex flag is set, the source apparatus is able to recognize that the sink apparatus is configured as shown in FIG. 23 and the full duplex communication by using the CEC line 84 and the reserve line 88, together with the SDA line 191 and the SCL line 192, is possible. Thus, the source apparatus transmits the channel information to the sink apparatus to notify that the full duplex communication is performed.

In step S78, the switching control unit 121 controls the switch 133 so that the differential signal corresponding to the Tx data from the converting unit 131 is selected at the time of data transmission. That is, the switching control unit 121 switches the switch 133 so that the partial signal of the differential signal which is supplied from the converting unit 131 to the switch 133 and which corresponds to the Tx data is selected.

In step S79, the source apparatus performs the two-way IP communication with the sink apparatus according to the full duplex mode, and the communicating processing is ended. That is, at the time of data transmission, the converting unit 131 converts the Tx data supplied from the control unit (CPU) of the source apparatus into the differential signal, supplies the switch 133 with one partial signal constituting the differential signal obtained by the conversion, and transmits the other partial signal to the sink apparatus via the reserve line 88. The switch 133 transmits the partial signal supplied from the converting unit 131 to the sink apparatus via the CEC line 84. Thus, the differential signal corresponding to the Tx data is transmitted from the source apparatus to the sink apparatus.

At the time of data reception, the decoding unit 183 receives the differential signal corresponding to the Rx data transmitted from the sink apparatus. That is, the switch 181 receives the partial signal of the differential signal which is transmitted from the sink apparatus via the SDA line 191 and which corresponds to the Rx data, and supplies the received partial signal to the decoding unit 183. The switch 182 receives the other partial signal of the differential signal which is transmitted from the sink apparatus via the SCL line 192 and which corresponds to the Rx data, and supplies the received partial signal to the decoding unit 183. The decoding unit 183 decodes the differential signal composed of the partial signals supplied from the switch 181 and the switch 182 into the Rx data which is the original data, and outputs the Rx data to the control unit (CPU).

Thus, the source apparatus transmits and receives various data such as the control data, the pixel data, and the audio data, to and from the sink apparatus.

When it is determined in the step S75 that the full duplex communication is not possible, the source apparatus transmits and receives the CEC signal in step S80 thereby to perform the two-way communication with the sink apparatus, and then, the communicating processing is ended.

That is, at the time of data transmission, the source apparatus transmits the CEC signal to the sink apparatus via the switch 133 and the CEC line 84, and at the time of data reception, the source apparatus receives the CEC signal transmitted from the sink apparatus via the switch 133 and the CEC line 84 to transmit and received the control data to and from the sink apparatus.

In this way, the source apparatus refers to the full duplex flag to perform the full duplex communication by using the CEC line 84 and the reserve line 88, together with the SDA line 191 and the SCL line 192, with the sink apparatus capable of performing the full duplex communication.

Thus, the switch 133, the switch 181, and the switch 182 are switched to select the transmitted data and the received data, thereby performing the full duplex communication using the CEC line 84 and the reserve line 88, together with the SDA line 191 and the SCL line 192, with the sink apparatus. In this way, a high-speed bi-directional communication can be performed while maintaining compatibility with the existing HDMI.

Also when the sink apparatus is configured as shown in FIG. 23, as in the case of sink apparatus shown in FIG. 22, the sink apparatus performs the communication processing to perform the two-way communication with the source apparatus.

Figure 29:
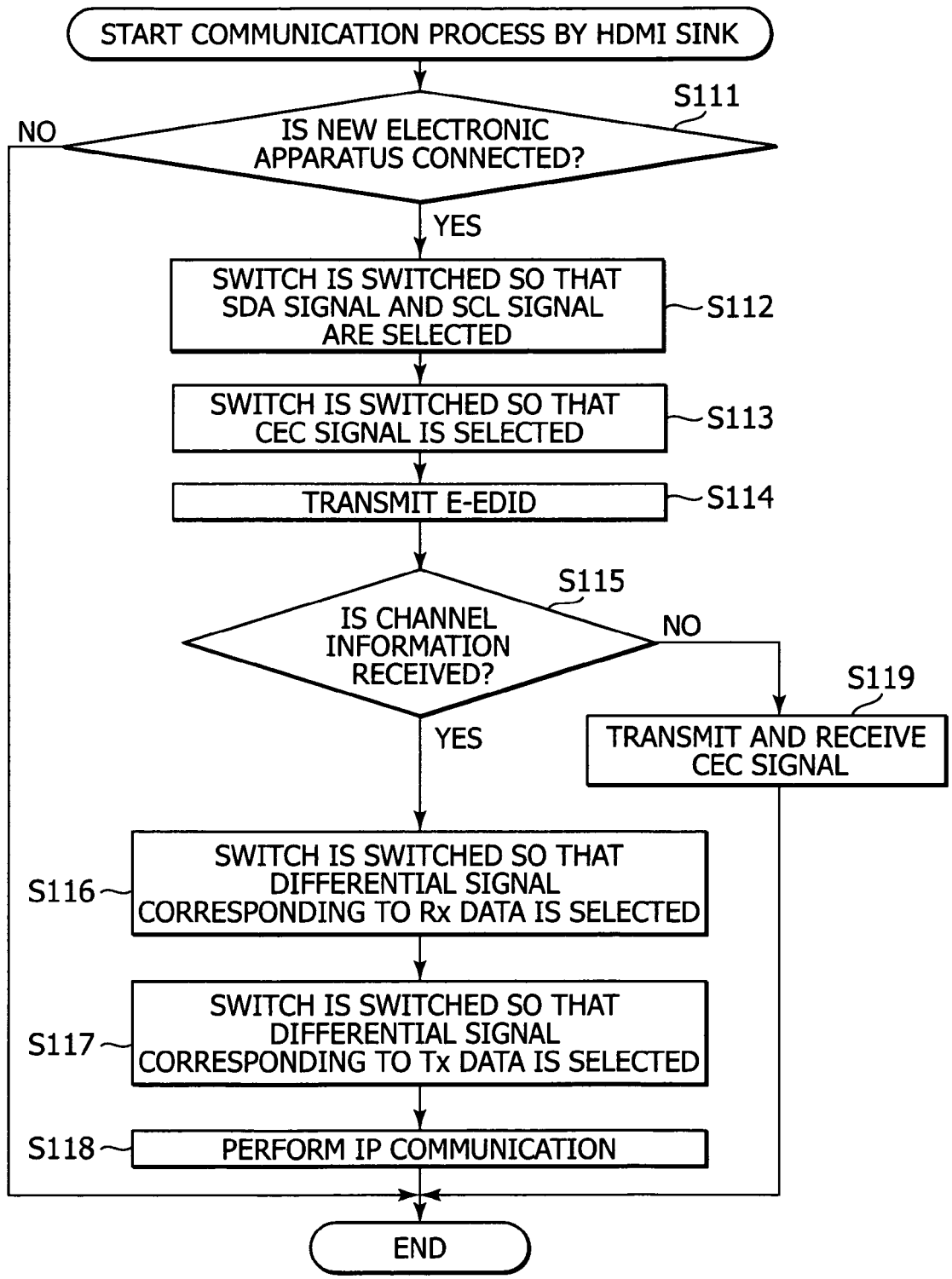
FIG. 29 is a flowchart for describing a communication process by the sink apparatus.

Hereinafter, with reference to a flowchart in FIG. 29, the communication processing by the sink apparatus shown in FIG. 23 is described.

In step S111, the sink apparatus determines whether the sink apparatus is connected with a new electronic apparatus (source apparatus). In step S111, when it is determined that the new electronic apparatus is not connected, no communication is performed, and thus the communication process is ended.

On the other hand, when it is determined in the step Sill that the new electronic apparatus is connected, the switching control unit 172 controls the switch 185 and the switch 186 in step S112 so that at the time of data transmission, the SDA signal from the control unit (CPU) of the sink apparatus is selected by the switch 185, and at the time of data reception, the SDA signal from the source apparatus is selected by the switch 185 and the SCL signal from the source apparatus is selected by the switch 186.

In step S113, the switching control unit 124 controls the switch 135 so that at the time of data transmission, the CEC signal from the control unit (CPU) of the sink apparatus is selected, and at the time of data reception, the CEC signal from the source apparatus is selected.

In step S114, the sink apparatus reads out the E-EDID from the EDIDROM 85, and transmits the read E-EDID to the source apparatus via the switch 185 and the SDA line 191 of the DDC 83.

In step S115, the sink apparatus determines whether the channel information transmitted from the source apparatus is received.

That is, from the source apparatus, the channel information indicating a channel of the two-way communication is transmitted according to a function provided in the source apparatus and the sink apparatus. For example, when the source apparatus is configured as shown in FIG. 23, the source apparatus and the sink apparatus are capable of performing the full duplex communication, and thus the channel information indicating that the IP communication according to the full duplex mode, using the CEC line 84 and the reserve line 88, together with the SDA line 191 and the SCL line 192, is performed is transmitted from the source apparatus to the sink apparatus. As a result, the sink apparatus receives the channel information transmitted from the source apparatus via the switch 135 and the CEC line 84, and determines that the channel information is received.

On the other hand, when the source apparatus is not provided with the function of performing the full duplex, the channel information is not transmitted from the source apparatus to the sink apparatus, and thus the sink apparatus determines that the channel information is not received.

When it is determined in step S115 that the channel information is received, the processing proceeds to step S116 in which the switching control unit 172 controls the switch 185 and the switch 186 so that at the time of data transmission, the differential signal corresponding to the Rx data from the converting unit 184 is selected.

In step S117, the switching control unit 124 controls the switch 135 so that at the time of data reception, the differential signal corresponding to the Tx data from the source apparatus is selected.

In step S118, the sink apparatus performs the two-way IP communication according to the full duplex mode, with the source apparatus, and thus the communication processing is ended. That is, at the time of data transmission, the converting unit 184 converts the Rx data supplied from the control unit (CPU) of the sink apparatus into the differential signal, supplies one partial signal constituting the differential signal obtained by the conversion to the switch 185, and supplies the other partial signal to the switch 186. The switch 185 and the switch 186 transmit the partial signal supplied from the converting unit 184 to the source apparatus via the SDA line 191 and the SCL line 192. Thus, the differential signal corresponding to the Rx data is transmitted from the sink apparatus to the source apparatus.

At the time of data reception, the decoding unit 136 receives the differential signal which is transmitted from the source apparatus and which corresponds to Tx data. That is, the switch 135 receives the partial signal of the differential signal which is transmitted from the source apparatus via the CEC line 84 and which corresponds to the Tx data, and supplies the received partial signal to the decoding unit 136. The decoding unit 136 decodes the differential signal composed of the partial signal supplied from the switch 135 and the partial signal supplied from the source apparatus via the reserve line 88, into the TX data which is the original data, and outputs the Tx data to the control unit (CPU).

Thus, the sink apparatus transmits and receives various data such as the control data, the pixel data, and the audio data, to and from the source apparatus.

When it is determined in the step S115 that the channel information is not received, the sink apparatus transmits and receives the CEC signal to perform the two-way communication with the source apparatus in step S119, and the communication process is ended.

In this way, upon receipt of the channel information, the sink apparatus uses the CEC line 84 and the reserve line 88, together with the SDA line 191 and the SCL line 192, to perform the full duplex communication with the sink apparatus.

Thus, when the sink apparatus switches the switch 135, the switch 185, and the switch 186 to select the transmitted data and the received data, thereby performing the full duplex communication by using the CEC line 84 and the reserve line 88, together with the SDA line 191 and the SCL line 192, with the source apparatus. In this way, a high-speed bi-directional communication can be performed while maintaining compatibility with the existing HDMI.

In an example in FIG. 23, the source apparatus is configured so that the CEC line 84 and the reserve line 88 are connected with the converting unit 131, and the SDA line 191 and the SCL line 192 are connected with the decoding unit 183. However, the source apparatus may be configured so that the CEC line 84 and the reserve line 88 are connected with the decoding unit 183, and the SDA line 191 and the SCL line 192 are connected with the converting unit 131.

In such a case, the switch 181 and the switch 182 are connected to the CEC line 84 and the reserve line 88, and connected also to the decoding unit 183. The switch 133 is connected to the SDA line 191, and connected also to the converting unit 131.

Likewise, the sink apparatus in FIG. 23 may also be configured so that the CEC line 84 and the reserve line 88 are connected with the converting unit 184, and the SDA line 191 and SCL line 192 are connected with the decoding unit 136. In such a case, the switch 185 and the switch 186 are connected to the CEC line 84 and the reserve line 88, and connected also to the converting unit 184. The switch 135 is connected to the SDA line 191, and connected also to the decoding unit 136.

Further, in FIG. 22, the CEC line 84 and the reserve line 88 may be the SDA line 191 and the SCL line 192. That is, the converting unit 131 and the decoding unit 132 of the source apparatus, and the converting unit 134 and the decoding unit 136 of the sink apparatus may be connected to the SDA line 191 and the SCL line 192, and whereby, the source apparatus and the sink apparatus may perform the IP communication according to the half duplex communication mode. Further, in this case, the reserve line 88 may be used to detect the connection of the electronic apparatus.

The source apparatus and the sink apparatus each may have both functions of performing the half duplex communication and performing the full duplex communication. In such a case, according to the function provided in the connected electronic apparatus, the source apparatus and the sink apparatus may be able to perform the IP communication according to either the half duplex communication mode or the full duplex communication mode.

Figure 30:
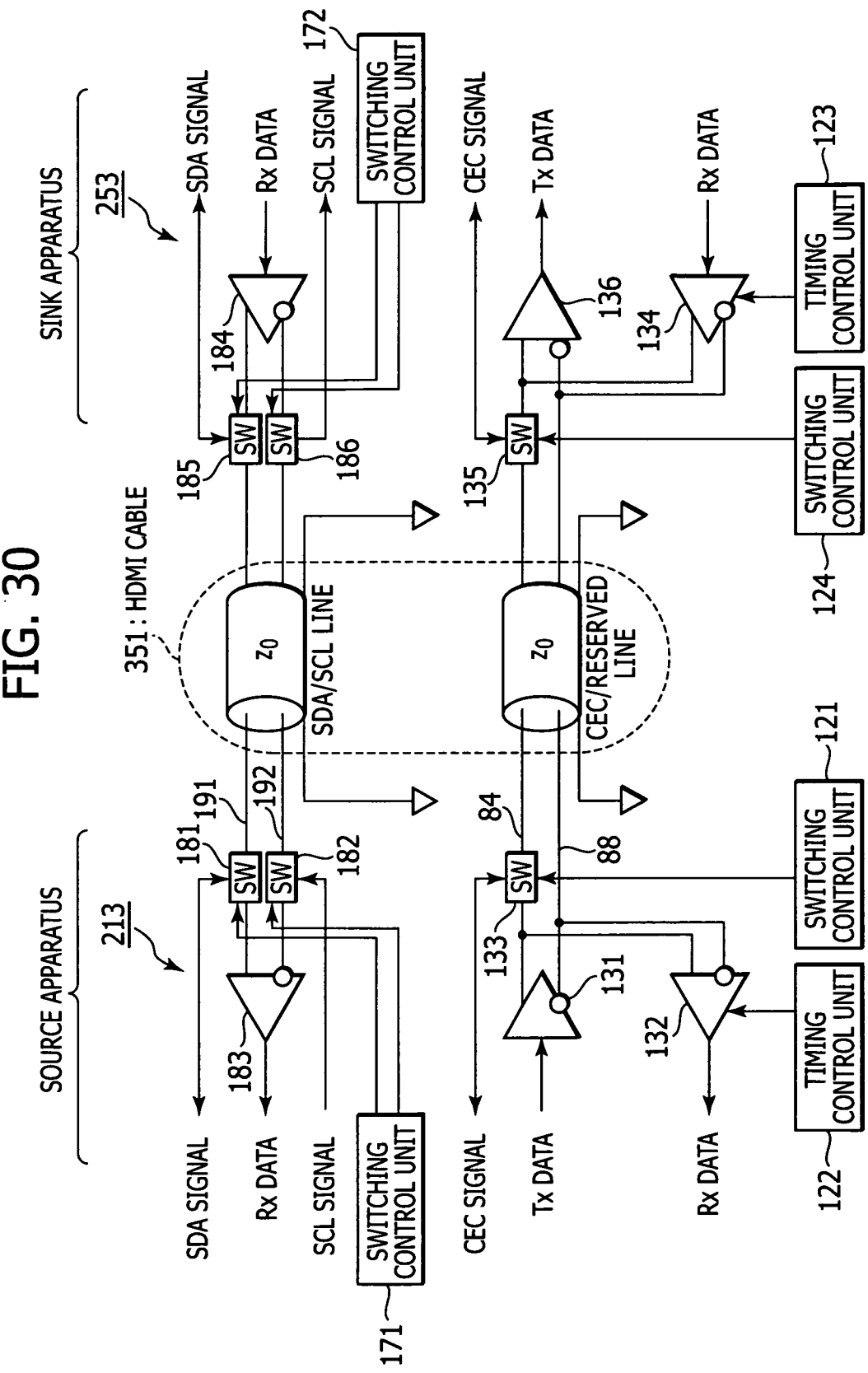
FIG. 30 is a connection diagram showing another configuration example of a high-speed data line interface between a video camera recorder and a television receiver.

When the source apparatus and the sink apparatus each has both functions of performing the half duplex communication and performing the full duplex communication, the source apparatus and the sink apparatus are configured as shown in FIG. 30, for example. In FIG. 30, portions corresponding to those in FIG. 22 or FIG. 23 are assigned with the same numerals, and the description is omitted, where appropriate.

The high-speed data line interface 213 of the source apparatus shown in FIG. 30 includes: the converting unit 131; the decoding unit 132; the switch 133; the switch 181; the switch 182; the decoding unit 183; the switching control unit 121; the timing control unit 122; and the switching control unit 171. That is, the high-speed data line interface 213 in the source apparatus in FIG. 30 is configured so that the high-speed data line interface 213 in the source apparatus shown in FIG. 23 is further provided with the timing control unit 122 and the decoding unit 132 in FIG. 22.

The high-speed data line interface 253 in the sink apparatus shown in FIG. 30 includes: the converting unit 134; the switch 135; the decoding unit 136; the converting unit 184; the switch 185; the switch 186; the timing control unit 123; the switching control unit 124; and the switching control unit 172. That is, the high-speed data line interface 253 in the sink apparatus in FIG. 30 is configured so that the high-speed data line interface 253 in the sink apparatus shown in FIG. 23 is further provided with the timing control unit 123 and the converting unit 134 in FIG. 22.

Subsequently, a communication processing by the source apparatus and the sink apparatus shown in FIG. 30 is described.

Figure 31:
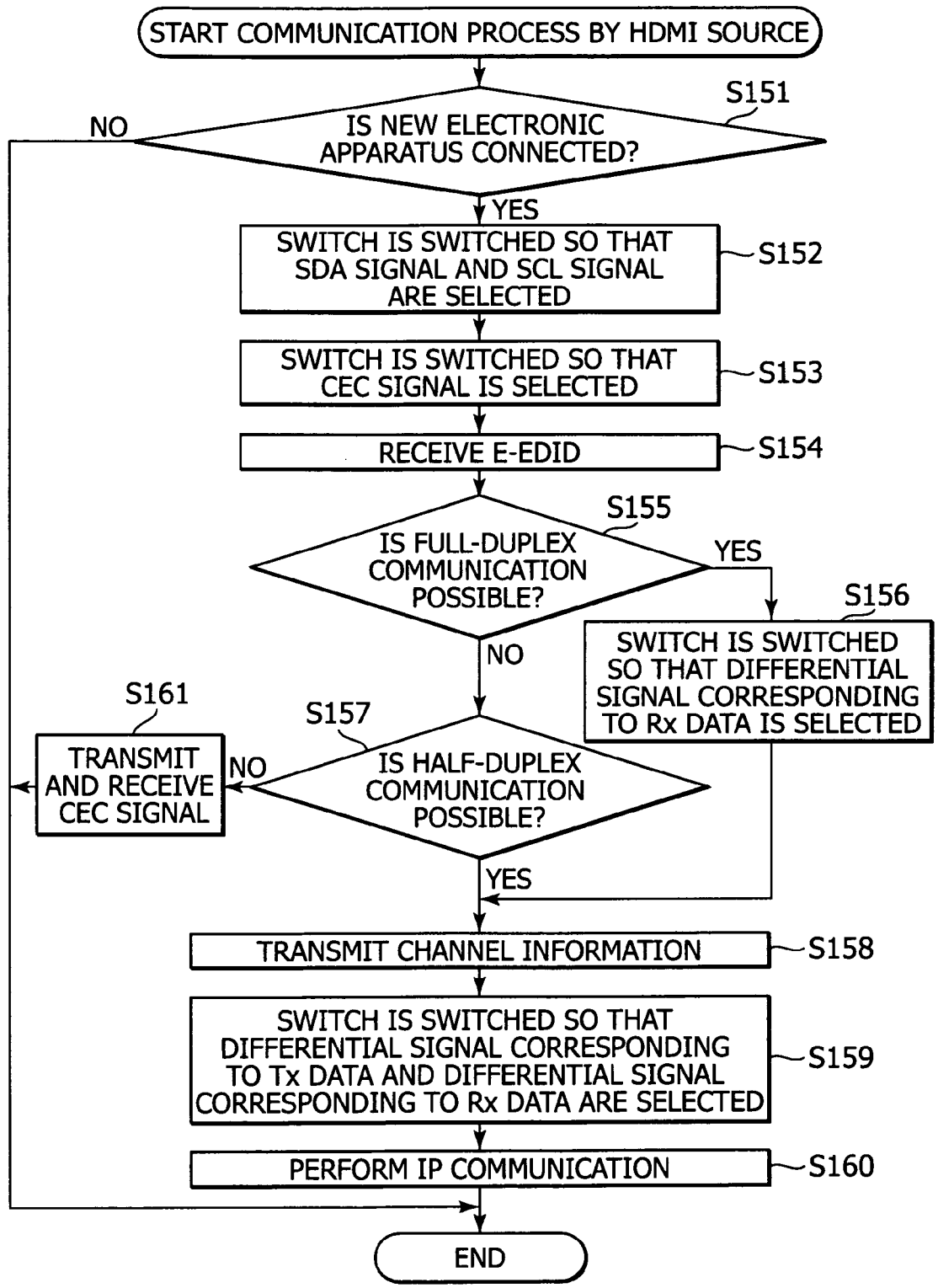
FIG. 31 is a flowchart for describing a communication process by the source apparatus.

Firstly, with reference to a flowchart in FIG. 31, the communication processing by the source apparatus in FIG. 30 is described. Processings from the step S151 to the step S154 are the same as those from the step S71 to the step S74 in FIG. 28, respectively, and thus the description is omitted.

In step S155, the source apparatus determines whether the full duplex communication with the sink apparatus is possible. That is, the source apparatus refers to the E-EDID received from the sink apparatus to determine whether the full duplex flag "Full Duplex" in FIG. 25 is set.

When it is determined in step S155 that the full duplex communication is possible, i.e., when the sink apparatus shown in FIG. 30 or FIG. 23 is connected to the source apparatus, the switching control unit 171 controls the switch 181 and the switch 182 in step S156 so that at the time of data reception, the differential signal corresponding to the Rx data from the sink apparatus is selected.

On the other hand, when it is determined in step S155 that the full duplex communication is not possible, the source apparatus determines in step S157 whether the half duplex communication is possible. That is, the source apparatus refers to the received E-EDID to determine whether the half duplex flag "Half Duplex" in FIG. 25 is set. In other words, the source apparatus determines whether the sink apparatus shown in FIG. 22 is connected to the source apparatus.

When it is determined in step S157 that the half duplex communication is possible, or when the switch 181 and the switch 182 are switched in step S156, the source apparatus transmits the channel information to the sink apparatus via the switch 133 and the CEC line 84 in step S158.

Herein, when it is determined in the step S155 that the full duplex communication is possible, since the sink apparatus has the function of performing the full duplex communication, the source apparatus transmits, as the channel information, the signal indicating that the IP communication using the CEC line 84 and the reserve line 88, together with the SDA line 191 and the SCL line 192, is performed, to the sink apparatus via the switch 133 and the CEC line 84.

When it is determined in step S157 that the half duplex communication is possible, since the sink apparatus does not have the function of performing the full duplex communication but has the function of performing the half duplex communication, the source apparatus transmits, as the channel information, the signal indicating that the IP communication using the CEC line 84 and the reserve line 88 is performed, to the sink apparatus via the switch 133 and the CEC line 84.

In step S159, the switching control unit 121 controls the switch 133 so that at the time of data transmission, the differential signal corresponding to the Tx data from the converting unit 131 is selected, and at the time of data reception, the differential signal corresponding to the Rx data transmitted from the sink apparatus is selected. When the source apparatus and the sink apparatus perform the full duplex communication, at the time of data reception in the source apparatus, the differential signal corresponding to the Rx data is not transmitted via the CEC line 84 and the reserve line 88 from the sink apparatus. Thus, the differential signal corresponding to the Rx data is not supplied to the decoding unit 132.

In step S160, the source apparatus performs the two-way IP communication with the sink apparatus, and the communicating processing is ended. That is, when the source apparatus performs the full duplex communication with the sink apparatus and when the source apparatus performs the half duplex communication with the sink apparatus, the converting unit 131 converts the Tx data supplied from the control unit (CPU) of the source apparatus into the differential signal at the time of data transmission, transmits one partial signal constituting the differential signal obtained by the conversion to the sink apparatus via the switch 133 and the CEC line 84, and transmits the other partial signal to the sink apparatus via the reserve line 88.

When the source apparatus performs the full duplex communication with the sink apparatus, the decoding unit 183 receives the differential signal corresponding to the Rx data transmitted from the sink apparatus at the time of data reception, decodes the received differential signal into the Rx data which is the original data, and outputs the Rx data to the control unit (CPU).

On the other hand, when the source apparatus performs the half duplex communication with the sink apparatus, the decoding unit 132 receives the differential signal corresponding to the Rx data transmitted from the sink apparatus at a data receiving time, on the basis of the control of the timing control unit 122, decodes the received differential signal into the Rx data which is the original data, and outputs the Rx data to the control unit (CPU).

Thus, the source apparatus transmits and receives various data such as the control data, the pixel data, and the audio data, to and from the sink apparatus.

When it is determined in step S157 that the half duplex communication is not possible, the source apparatus transmits and receives the CEC signal via the CEC line 84 in step S161 thereby to perform the two-way communication with the sink apparatus, and then, the communicating processing is ended.

In this way, the source apparatus refers to the full duplex flag and the half duplex flag to perform either the full duplex communication or the half duplex communication according to the function provided in the sink apparatus which is a communication partner.

Thus, according to the function provided in the sink apparatus which is the communication partner, the switch 133, the switch 181, and the switch 182 are switched to select the transmitted data and the received data, thereby performing either the full duplex communication or the half duplex communication. As a result, a more appropriate communicating method is selected while maintaining compatibility with the existing HDMI, and a high-speed bi-directional communication can be performed.

Figure 32:
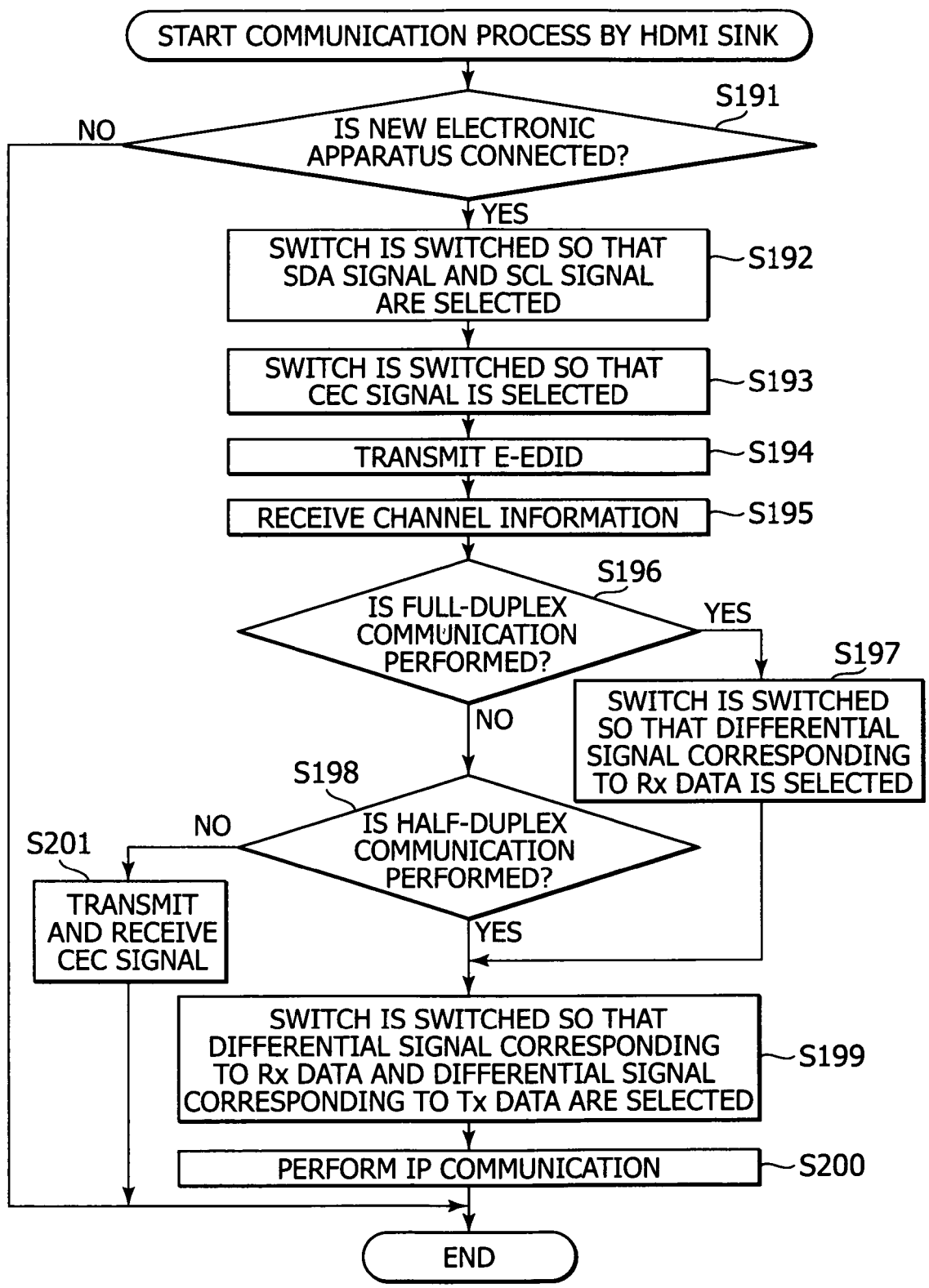
FIG. 32 is a flowchart for describing a communication process by the sink apparatus.

Subsequently, with reference to a flowchart in FIG. 32, the communication processing by the sink apparatus in FIG. 30 is described. Processings from the step S191 to the step S194 are the same as those from the step S111 to the step S114 in FIG. 29, respectively, and thus the description is omitted.

In step S195, the sink apparatus receives the channel information transmitted from the source apparatus via the switch 135 and the CEC line 84. When the source apparatus connected to the sink apparatus has neither function of performing the full duplex communication nor that of performing the half duplex communication, no channel information is transmitted from the source apparatus to the sink apparatus, and thus the sink apparatus does not receive the channel information.

In step S196, the sink apparatus determines whether to perform the full duplex communication on the basis of the received channel information. For example, upon receipt of the channel information indicating that the IP communication using the CEC line 84 and the reserve line 88, together with the SDA line 191 and the SCL line 192, is performed, the sink apparatus determines that the full duplex communication is performed.

When it is determined in the step S196 that the full duplex communication is performed, the switching control unit 172 controls the switch 185 and the switch 186 in the step S197 so that at the time of data transmission, the differential signal corresponding to the Rx data from the converting unit 184 is selected.

When it is determined in the step S196 that the full duplex communication is not performed, the sink apparatus determines whether to perform the half duplex communication on the basis of the received channel information in step S198. For example, upon receipt of the channel information indicating that the IP communication using the CEC line 84 and the reserve line 88 is performed, the sink apparatus determines that the half duplex communication is performed.

When it is determined in the step S198 that the half duplex communication is performed or when the switch 185 and the switch 186 are switched in the step S197, the switching control unit 124 controls the switch 135 in step S199 so that at the time of data transmission, the differential signal corresponding to the Rx data from the converting unit 134 is selected, and at the time of data reception, the differential signal corresponding to Tx data from the source apparatus is selected.

When the source apparatus and the sink apparatus perform the full duplex communication, the differential signal corresponding to the Rx data is not transmitted from the converting unit 134 to the transmitter 81 at the time of data transmission in the sink apparatus, and thus the differential signal corresponding to the Rx data is not supplied to the switch 135.

In step S200, the sink apparatus performs the two-way IP communication with the source apparatus, and thus the communication processing is ended.

That is, when the sink apparatus performs the full duplex communication with the source apparatus, the converting unit 184 converts at the time of data transmission the Rx data supplied from the control unit (CPU) of the sink apparatus into the differential signal, transmits one partial signal constituting the differential signal obtained by the conversion to the source apparatus via the switch 185 and the SDA line 191, and transmits the other partial signal to the source apparatus via the switch 186 and the SCL line 192.

When the sink apparatus performs the half duplex communication with the source apparatus, the converting unit 134 converts, at the time of data transmission, the Rx data supplied from the control unit (CPU) of the sink apparatus into the differential signal, transmits one partial signal constituting the differential signal obtained by the conversion to the transmitter 81 via the switch 135 and the CEC line 84, and transmits the other partial signal to the source apparatus via the reserve line 88.

When the sink apparatus performs the full duplex communication with the source apparatus and performs the half duplex communication, the decoding unit 136 receives, at the time of data reception, the differential signal corresponding to the Tx data transmitted from the source apparatus, decodes the received differential signal into the Tx data which is the original data, and outputs the Tx data to the control unit (CPU).

When it is determined in the step S198 that the half duplex communication is not performed, i.e., when the channel information is not transmitted, for example, the sink apparatus transmits and receives the CEC signal at step S201 to perform the two-way communication with the source apparatus, and then, the communication processing is ended.

In this way, the sink apparatus performs either the full duplex communication or the half duplex communication according to the received channel information, i.e., according to the function provided in the source apparatus which is a communication partner.

Thus, according to the function provided in the source apparatus which is the communication partner, the switch 135, the switch 185, and the switch 186 are switched to select the transmitted data and the received data, thereby performing either the full duplex or the half duplex communication. As a result, a more appropriate communicating method is selected while maintaining compatibility with the existing HDMI (R), and a high-speed bi-directional communication can be performed.

When the source apparatus and the sink apparatus are connected by the HDMI cable 351 including the CEC line 84 and the reserve line 88, each of which lines is shielded through differential-twist-pair coupling with each other and connected to a grounding line, and the SDA line 191 and the SCL line 192, each of which lines is shielded through differential-twist-pair coupling with each other and connected to a grounding line, the high-speed two-way IP communication according to either the half duplex communication mode or the full duplex communication mode can be performed while maintaining compatibility with the existing HDMI cable.

Subsequently, a series of above-described processings may be performed not only by dedicated hardware but also by software. When the series of processings are performed by the software, a program constituting the software is installed to a microcomputer, etc., which controls the source apparatus and the sink apparatus, for example.

Figure 33:
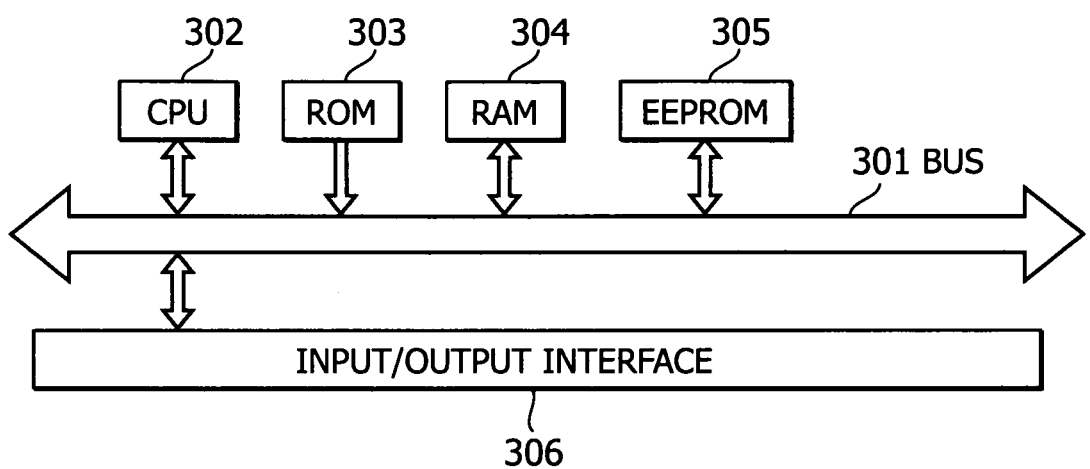
FIG. 33 is a block diagram showing a configuration example of a computer in which the present invention is applied.

Consequently, FIG. 33 shows a configuration example of one embodiment of a computer in which the program for executing a series of above-described processings is installed.

The program may be previously recorded in EEPROM (Electrically Erasable Programmable Read-only Memory) 305 or ROM 303, as a recording medium contained in the computer.

Alternately, the program may be stored (recorded) temporarily or eternally in a removable recording medium such as a flexible disk, a CD-ROM (Compact Disc Read Only Memory), an MO (Magneto Optical) disc, a DVD (Digital Versatile Disc), a magnetic disk, and a semiconductor memory. Such a removable recording medium may be provided as so-called package software.

The program may not only be installed from the above-described removable recording medium into the computer but also be installed as follows: from a download site via an artificial satellite for a digital satellite broadcast, the program is wirelessly transferred to the computer, or the program is transferred to the computer by wire via a network such as a LAN and the Internet, and in this state, the computer receives the program thus transferred by the input/output interface 360 so that the program may be installed in the contained EEPROM 305.

The computer contains the central processing unit (CPU) 302. The CPU 302 is connected with the input/output interface 306 via a bus 301, and the CPU 302 loads the program stored in the ROM (Read Only Memory) 303 or the EEPROM 305 into the RAM (Random Access Memory) 304, and executes the loaded program. Thus, the CPU 302 performs the processing according to the above-described flowchart, and alternatively, the processing performed by the configuration shown in the above-described block diagram.

Processing steps setting forth a program for causing the computer to perform various kinds of processing are not always required to be carried out in a time sequential order set forth in the flowchart in the present specification. The processing steps may be carried out in a parallel manner or separately (for example, they may include parallel processing or processing using objects). Furthermore, the program may be processed by means of a single computer, and alternatively, implemented as distributed processing by means of a plurality of computers.

Figure 34:
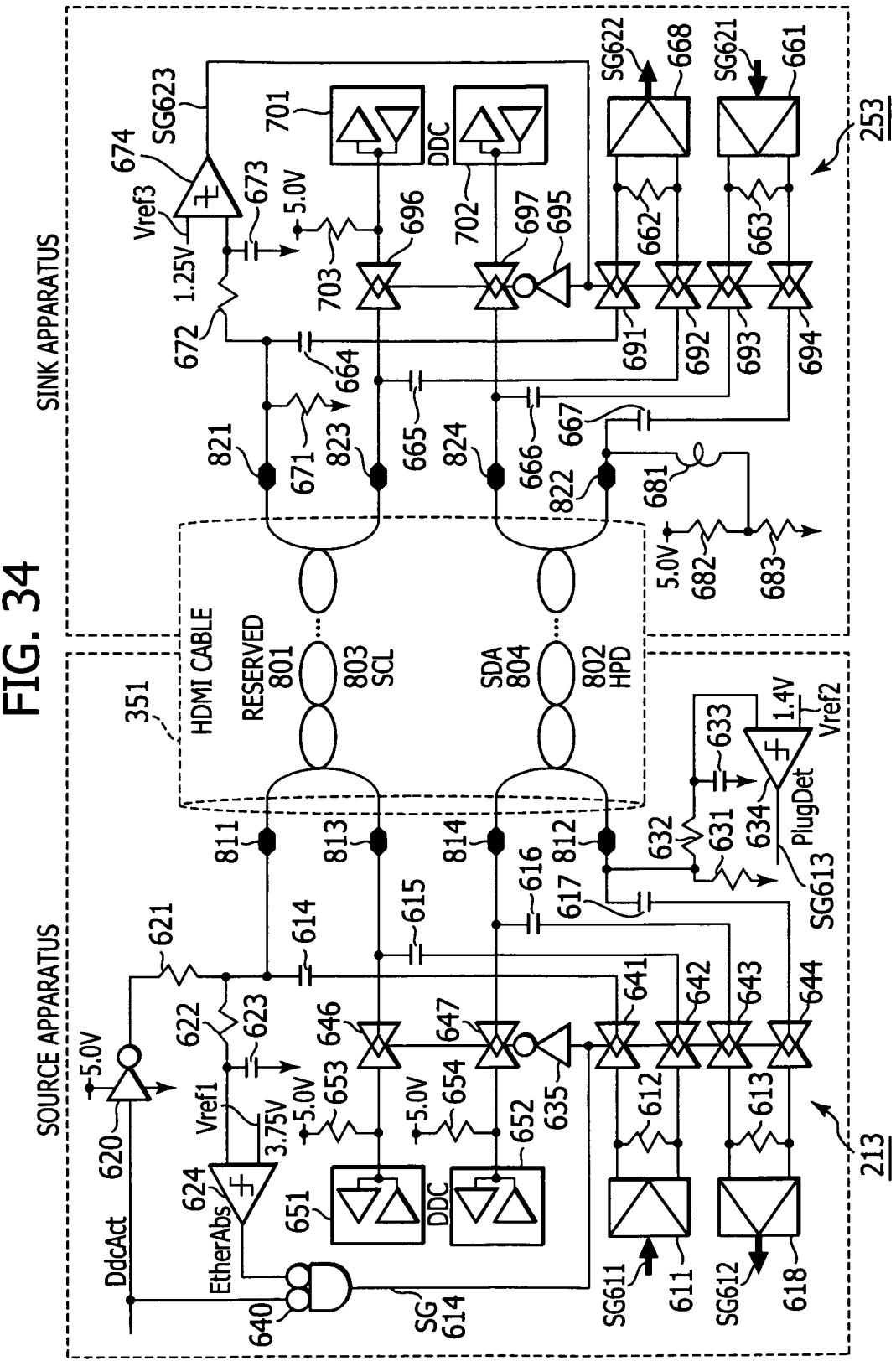
FIG. 34 is a connection diagram showing still another configuration example of a high-speed data line interface between a video camera recorder and a television receiver.

In the configuration example shown in FIG. 9, it may be possible to form a circuit for the LAN communication irrespective of an electrical specification regulated about the DDC. However, FIG. 34 shows another configuration example having a similar effect.

This example shows an interface for performing a data transmission of video and audio, an exchange and verification of connection-apparatus information, a communication of apparatus control data, and a LAN communication, by a single cable. The interface is characterized in that: the LAN communication is performed by a single-direction communication via two pairs of differential transmission paths; there is provided a configuration such that by at least one DC bias potential of the transmission path, a connection state of the interface is notified; and at least two transmission paths are used for a communication for exchanging and verifying the connection-apparatus information in a time division manner with the LAN communication.

The source apparatus includes: a LAN signal transmitting circuit 611; end-terminal resistances 612 and 613; AC-coupling capacitances 614 to 617; a LAN signal receiving circuit 618; an inverter 620; a resistance 621; a resistance 622 and capacitance 623 which constitute a low-pass filter; a comparator 624; a pull-down resistance 631; a resistance 632 and a capacitance 633 which constitute a low-pass filter; a comparator 634; a NOR gate 640; analog switches 641 to 644; an inverter 645; analog switches 646 and 747; DDC transceivers 651 and 652; and pull-up resistances 653 and 654.

The sink apparatus 602 includes: a LAN signal transmitting circuit 661; end-terminal resistances 662 and 663; AC-coupling capacitances 664 to 667; a LAN signal receiving circuit 668; a pull-down resistance 671; a resistance 672 and a capacitance 673 which constitute a low-pass filter; a comparator 674; a choke coil 681; resistances 682 and 683 connected in series between a power supply potential and a reference potential; analog switches 691 to 694; an inverter 695; analog switches 696 and 697; DDC transceivers 701 and 702; and pull-up resistances 703 and 704.

In the HDMI cable 351, there are a differential transmission path formed of a reserve line 801 and an SCL line 803 and a differential transmission path formed of an SDA line 804 and an HPD line 802. Source-side terminals 811 to 814 and sink-side terminals 821 to 824 are formed.

The reserve line 801 and the SCL line 803, together with the SDA line 804 and the HPD line 802, are coupled as a differential twisted pair.

In the source apparatus, the terminals 811 and 813 are connected via the AC-coupling capacitances 614 and 605 and the analog switches 641 and 642 to a transmitting circuit 611 for transmitting a LAN transmission signal SG611 to the sink apparatus and the end-terminal resistance 612. The terminals 814 and 812 are connected, via the AC-coupling capacitances 616 and 617 and the analog switches 643 and 644, to a receiving circuit 618 for receiving the LAN signal from the sink apparatus and the end-terminal resistance 613.

In the sink apparatus, the terminals 821 to 824 are connected, via the AC-coupling capacitances 664, 665, 666, and 667 and the analog switches 691 to 694, to the transmitting circuit 661, the receiving circuit 668, and the end-terminal resistances 662 and 663. When the LAN communication is performed, the analog switches 641 to 644 and 691 to 694 are conductive, and when the DDC communication is performed, these switches are opened.

In the source apparatus, the terminal 813 and the terminal 814 are connected, via the other analog switches 646 and 647, to the DDC transceivers 651 and 652 and the pull-up resistances 653 and 654.

In the sink apparatus, the terminal 823 and the terminal 824 are connected, via the analog switches 696 and 697, to the DDC transceivers 701 and 702 and the pull-up resistance 703. When the DDC communication is performed, the analog switches 646 and 647 are conductive, and when the LAN communication is performed, these switches are opened.

A verification scheme of the e-HDMI compatible apparatus by the potential of the reserve line 801 is basically similar to the example shown in FIG. 9 except that the resistance 62 of the source apparatus 601 is driven to the inverter 620.

When input of the inverter 620 is HIGH, the resistance 621 becomes a pull-down resistance, and thus, as viewed from the sink apparatus, a 0-V state similar to a case where the e-HDMI non-compatible apparatus is connected is established. As a result, a signal SG623 indicating an e-HDMI compatible distinguishing result of the sink apparatus becomes LOW, and thus the analog switches 691 to 694 controlled by the signal SG623 are opened, and the analog switches 696 and 697 controlled by a signal obtained by inverting the signal SG623 by the inverter 695 are conductive. As a result, the sink apparatus 602 detaches the SCL line 803 and the SDA line 804 from a LAN transmitting and receiving device, thereby establishing a state of being connected to a DDC transmitting and receiving device.

On the other hand, in the source apparatus, an input of the inverter 620 is inputted also to the NOR gates 640, and an output SG614 thereof is rendered LOW. The analog switches 641 to 644 controlled by the output signal SG614 of the NOR gates 640 are opened, and the analog switches 646 and 647 controlled by a signal obtained by inverting the signal SG614 by the inverter 645 are conductive. As a result, also the source apparatus 601 detaches the SCL line 803 and the SDA line 804 from the LAN transmitting and receiving device, thereby establishing a state of being connected to the DDC transmitting and receiving device.

In contrast, when the input of the inverter 620 is LOW, both the source apparatus and the sink apparatus detaches keep the SCL line 803 and the SDA line 804 from the DDC transmitting and receiving device, thereby establishing a state of being connected to the LAN transmitting and receiving device.

The circuits 631 to 634 and 681 to 683 for verifying the connection by a DC bias potential of the HPD line 802 have a function similar to that in the example shown in FIG. 9. That is, the HPD line 802 notifies the source apparatus of a connection of the cable 351 to the sink apparatus by a DC bias level, besides the above-described LAN communication. When the cable 351 is connected to the sink apparatus, the resistances 682 and 683 and the choke coil 681 within the sink apparatus bias the HPD line 802 to about 4V via the terminal 822.

The source apparatus extracts the DC bias of the HPD line 802 by the low-pass filter formed of the resistance 632 and the capacitance 633, and compares the extracted DC bias with a reference potential Vref2 (for example, 1.4V) in the comparator 634. Unless the cable 351 is connected to the sink apparatus, the potential of the terminal 812 is lower than the reference potential Vref2 because of the pull-down resistance 631, and when the cable 351 is connected, the potential thereof is higher than the reference potential Vref2. Accordingly, when an output signal SG613 of the comparator 634 is HIGH, it indicates that the cable 351 and the sink apparatus are connected. On the other hand, when the output signal SG613 of the comparator 634 is LOW, it indicates that the cable 351 and the sink apparatus are not connected.

Thus, according to the configuration example shown in FIG. 34, in an interface for performing a data transmission of video and audio, an exchange and verification of connection-apparatus information, a communication of apparatus control data, and a LAN communication, by a single cable, in which the interface is configured so that: the LAN communication is performed by a single-direction communication via two pairs of differential transmission paths; there is provided a configuration such that by at least one DC bias potential of the transmission path, a connection state of the interface is notified; and at least two transmission paths are used for a communication for exchanging and verifying the connection-apparatus information in a time division manner with the LAN communication. Thus, a time division for dividing into a time zone in which the SCL line and the SDA line are connected to the LAN communication circuit by the switch and a time zone in which these lines are connected to the DDC circuit can be performed. This division allows the circuit for the LAN communication to be formed irrespective of an electrical specification regulated about the DDC, so that a stable and ensured LAN communication can be achieved at a low cost.

Further, the resistance 621 shown in FIG. 34 may be provided within the HDMI cable 351 not within the source apparatus. In such a case, the terminals of the resistance 621 are connected to, out of the lines arranged within the HDMI cable 351, the reserve line 801 and the line (signal line) connected to the power supply (power supply potential), respectively.

Further, the pull-down resistance 671 and the resistance 683 shown in FIG. 34 may be provided within the HDMI cable 351 not within the sink apparatus. In such a case, the terminals of the pull-down resistance 671 are connected to, out of the lines arranged within the HDMI cable 351, the reserve line 801 and the line (grounding line) connected to a ground (reference potential), respectively. Further, the terminals of the resistance 683 are connected to, out of the lines arranged within the HDMI cable 351, the HPD line 802 and the line (grounding line) connected to a ground (reference potential), respectively.

The SDA and the SCL are those for performing a pull-down communication in which H is a 1.5-KΩ pull-up and L is a low impedance. The CEC also is that for performing a pull-down communication in which H is a 27-KΩ pull-up and L is a low impedance. When these functions are held to maintain compatibility with the existing HDMI, it may probably become difficult to share a function of the LAN for performing a high-speed data communication in which end terminals of a transmission line channel need to be matched and terminated.

In the configuration examples in FIG. 9 and FIG. 34, such a problem can be avoided. That is, the configuration example in FIG. 9 is configured so that the use of the SDA, SCL, and CEC lines is avoided, and the reserve line and the HPD line are used as a differential pair to perform the full duplex communication according to a 1-pair bi-directional communication. The configuration example in FIG. 34 is configured to perform a 2-pair full duplex in which the HPD line and the SDA line, together with the SCL line and the reserve line, are used to form two sets of differentials pairs to perform a single-direction communication in each of the pairs.

FIGS. 35A to 35E show bi-directional communication waveforms in the configuration example in FIG. 9 or that in FIG. 34.

FIG. 35A shows a waveform of a signal sent from the source apparatus; FIG. 35B shows a waveform of a signal received by the sink apparatus; FIG. 35C shows a waveform of a signal passing through a cable; FIG. 35D shows a waveform of a signal received by the source apparatus; and FIG. 35E shows a waveform of a signal transmitted from the source apparatus, respectively. As is apparent from FIG. 35, according to the configuration example in FIG. 9 or FIG. 34, a good bi-directional communication can be achieved.

In the embodiment, for the transmission path that connects each apparatus, the description is made on assumption of the interface that complies with an HDMI standard. However, the present invention may be applicable to other similar transmission standards. For the source apparatus, the video camera recorder and the personal computer are used, and for the sink apparatus, the television receiver is used. However, the present invention may be similarly applied to other devices that use an electronic apparatuses having a similar function.

In the embodiments, the electronic apparatuses are connected with each other by the HDMI cable. However, the present invention is similarly applicable to a case where the electronic apparatuses are wirelessly connected with each other.

The present invention is to allow the user to easily perform the operations of the transmitting device, such as the video camera recorder and the personal computer, connected to the receiving device, such as the television receiver, by the operations on the display screen of the receiving device. The present invention may be applied to the AV system formed so that the television receiver is connected with the video camera recorder, the personal computer, etc.

What is claimed is:

1. A transmitting device, comprising:
 a video-signal output unit configured to superimpose a display signal for a graphical user interface screen onto a video signal and to output the video signal superimposed with the display signal for the graphical user interface screen, the graphical user interface screen for controlling operation of the transmitting device, the video signal corresponding to a captured image of a subject, the captured image of the subject being obtained either (i) by capturing the image of the subject or (ii) by capturing the image of the subject, then recording the captured image of the subject in a recording medium, and thereafter reproducing the captured image of the subject from the recording medium;
 an image displaying unit configured to display, on a display screen of a first image display element of the transmitting device, an image based on the outputted video signal superimposed with the display signal for the graphical user interface screen, the displayed image including the graphical user interface screen;

a signal transmitting unit configured to transmit the outputted video signal superimposed with the display signal for the graphical user interface screen to an external apparatus via a transmission path for display of the image including the graphical user interface screen on a display screen of a second image display element of the external apparatus;

an information receiving unit configured to receive operational information transmitted from the external apparatus, the operational information being associated with a user-controlled operation on the graphical user interface screen displayed on the display screen of the second image display element of the external apparatus; and a controller configured to control at least an operation of the video-signal output unit based on the received operational information.

2. The transmitting device according to claim 1, further comprising:

an image-capturing unit configured to capture the image of the subject to obtain a captured video signal corresponding to the subject; and a recording and reproducing unit configured to record the captured video signal obtained by the image-capturing unit in the recording medium and to reproduce the recorded video signal from the recording medium, wherein the video-signal output unit superimposes the display signal for the graphical user interface screen onto either the captured video signal obtained by the image-capturing unit or the reproduced video signal reproduced by the recording and reproducing unit.

3. The transmitting device according to claim 1, wherein the signal transmitting unit transmits the video signal by a differential signal through a plurality of channels, to the external apparatus via the transmission path.

4. The transmitting device according to claim 1, wherein the information receiving unit receives the operational information transmitted from the external apparatus via a bi-directional communication path configured by either a control data line constituting the transmission path or a predetermined line of the transmission path.

5. The transmitting device according to claim 4, wherein: the transmission path is an HDMI cable, and the predetermined line is the HDMI cable including a reserve line and an HPD line.

6. The transmitting device according to claim 1, wherein the information receiving unit receives reception information including coordinate information representing a position on the display screen of the second image display element, and further comprising a coordinate-information converting unit for converting the coordinate information representing the position on the display screen of the second image display element into coordinate information representing a position on the display screen of the first image display element, wherein the controller performs a control using the coordinate information converted by the coordinate-information converting unit.

7. A receiving device, comprising:

a signal receiving unit configured to receive, via a transmission path from an external apparatus, a video signal superimposed with a display signal for a graphical user interface screen for controlling operation of the external apparatus, an image based on the video signal superimposed with the display signal for the graphical user interface screen also being displayed on a display screen of an image display element of the external apparatus the video signal being superimposed with the display signal for the graphical user interface screen by the external apparatus, the video signal corresponding to a captured image of a subject, the captured image of the subject being obtained either (i) by capturing the image of the subject or (ii) by capturing the image of the subject, recording the captured image of the subject in a recording medium and reproducing from the recording medium;

an image displaying unit configured to display an image based on the received video signal superimposed with the display signal for the graphical user interface screen on a display screen of an image display element of the receiving device, the displayed image including the graphical user interface screen;

a user operation unit configured to perform a user-controlled operation on the graphical user interface screen displayed on the display screen of the image display element of the receiving device and to generate operational information for controlling the operation of the external apparatus based on the user-controlled operation; and an information transmitting unit configured to transmit the generated operational information of the user operation unit to the external apparatus to control the operation of the external apparatus.

8. The receiving device according to claim 7, further comprising:

a display signal generating unit configured to generate a display signal for displaying a cursor at a position on the display screen of the image display operated by the user operation unit; and a signal processing unit configured to superimpose the display signal generated by the display signal generating unit on the video signal received by the signal receiving unit.

9. The receiving device according to claim 8, wherein in response to a click operation being performed in the user operation unit, the display signal generating unit generates a display signal for causing a display mode of the cursor to change.

10. The receiving device according to claim 7, wherein the signal receiving unit receives the video signal via the transmission path from the external apparatus by a differential signal through a plurality of channels.

11. The receiving device according to claim 7, wherein the information transmitting unit transmits the operational information to the external apparatus via a bi-directional communication path configured by either a control data line constituting the transmission path or a predetermined line of the transmission path.

12. The receiving device according to claim 11, wherein the transmission path is an HDMI cable, and the predetermined lines is the HDMI cable including a reserve line and an HPD line.

13. A method of providing operational information for controlling operation of an external apparatus transmitted using a receiving device, the method comprising:

receiving, at the receiving device from an external apparatus via a transmission path, a video signal superimposed with a display signal for a graphical user interface screen for controlling operation of the external apparatus, an image based on the video signal superimposed with the display signal for the graphical user interface screen also being displayed on a display screen of an image display element of the external apparatus the video signal being superimposed with the display signal for the graphical user interface screen by the external apparatus, the video signal corresponding to a captured image of a subject, the captured image of the subject being obtained either (i) by capturing the image of the subject or (ii) by capturing the image of the subject, recording the captured image of the subject in a recording medium and reproducing from the recording medium;

displaying an image based on the received video signal superimposed with the display signal for the graphical user interface screen on an image display element of the receiving device, the displayed image including the graphical user interface screen;

performing a user-controlled operation on the graphical user interface screen displayed on the display screen of the image display element of the receiving device;

generating the operational information for controlling the operation of the external apparatus based on the user-controlled operation; and transmitting the generated operational information to the external apparatus to control the operation of the external apparatus.

14. The method of providing operational information according to claim 13, wherein the transmitting step transmits the generated operational information to the external apparatus via a bi-directional communication path configured by either a control data line constituting the transmission path or a predetermined line of the transmission path.

15. The receiving device according to claim 7, wherein the information transmitting unit transmits reception information including coordinate information representing a position on the display screen of the second image display element.

16. The receiving device according to claim 8, wherein the information transmitting unit transmits reception information including coordinate information representing the position of the cursor on the display screen of the second image display element.

17. The method of providing operational information according to claim 13, further comprising:

generating a display signal for displaying a cursor at a position on the display screen of the image display operated by the user operation unit; and superimposing the display signal generated by the display signal generating unit on the video signal received by the signal receiving unit.

18. The method of providing operational information according to claim 17, further comprising:

generating, in response to a click operation being performed, a display signal for causing a display mode of the cursor to change.

19. The method of providing operational information according to claim 17, further comprising:

transmitting reception information including coordinate information representing the position of the cursor on the display screen of the second image display element.

20. The method of providing operational information according to claim 13, further comprising:

transmitting reception information including coordinate information representing a position on the display screen of the second image display element.

* * * * *